US008727244B2

(12) United States Patent
Bernstein et al.

(10) Patent No.: US 8,727,244 B2

(45) Date of Patent: May 20, 2014

(54) FLUID CONTAINER AND SUPPORT BRACKET THEREFOR

(75) Inventors: Bruce Bernstein, Tampa, FL (US); Rebecca Bernstein, Tampa, FL (US); David McDonald, Merrimack, NH (US); Jonathan Marks, Somerville, MA (US); Jon Dixon, Nashua, NH (US)

(73) Assignee: Relaj Inc., Tampa, FL (US)

(*) Notice: Subject to any disclaimer, the term of this patent is extended or adjusted under 35 U.S.C. 154(b) by 282 days.

(21) Appl. No.: 12/807,289

(22) Filed: Aug. 31, 2010

(65) Prior Publication Data

US 2011/0155750 A1 Jun. 30, 2011

Related U.S. Application Data

(60) Provisional application No. 61/275,601, filed on Aug. 31, 2009, provisional application No. 61/277,318, filed on Sep. 23, 2009.

(51) Int. Cl.

| | |
|---|---|
| ***B05B 1/00*** | (2006.01) |
| ***B65D 1/32*** | (2006.01) |
| ***B05B 1/34*** | (2006.01) |
| ***B65D 37/00*** | (2006.01) |
| ***B65D 5/72*** | (2006.01) |
| ***B65D 25/40*** | (2006.01) |
| ***B65D 35/38*** | (2006.01) |

(52) U.S. Cl.

USPC ........... 239/602; 239/327; 239/487; 222/215; 222/490

(58) Field of Classification Search

USPC ......... 239/327, 328, 486, 487, 490, 501, 518, 239/139, 128, 602; 222/206, 215, 146.6, 222/146.1, 146.2, 490, 494, 564, 547, 548

See application file for complete search history.

(56) References Cited

U.S. PATENT DOCUMENTS

| | | | | | |
|---|---|---|---|---|---|
| 581,767 | A | | 5/1897 | Powers | |
| 596,998 | A | | 1/1898 | Hawkins et al. | |
| 1,748,681 | A | * | 2/1930 | Smith | 222/490 |
| 2,710,108 | A | | 6/1955 | Zarre | |
| 3,143,429 | A | * | 8/1964 | Swanson et al. | 426/117 |
| 3,147,888 | A | * | 9/1964 | Mooney | 222/130 |
| 3,840,153 | A | | 10/1974 | Devlin | |
| 4,095,812 | A | | 6/1978 | Rowe | |
| 4,147,184 | A | | 4/1979 | Jess | |
| 4,244,477 | A | | 1/1981 | Seel | |
| 4,274,566 | A | | 6/1981 | Rowe | |
| 4,345,704 | A | | 8/1982 | Boughton | |
| 4,366,922 | A | | 1/1983 | Levine et al. | |
| 4,386,721 | A | | 6/1983 | Shimano | |
| D271,852 | S | | 12/1983 | Kimura | |
| 4,437,596 | A | | 3/1984 | Shook | |
| 4,441,638 | A | | 4/1984 | Shimano | |
| 4,544,077 | A | | 10/1985 | Rucker | |
| D285,186 | S | | 8/1986 | Sinyard | |
| 4,629,098 | A | | 12/1986 | Eger | |

(Continued)

*Primary Examiner* — Len Tran

*Assistant Examiner* — Chee-Chong Lee

(74) *Attorney, Agent, or Firm* — Frijouf, Rust & Pyle, P.A.

(57) ABSTRACT

A fluid container is disclosed for retaining and dispensing a fluid into the mouth of an individual. The fluid container comprises a deformable body and defining an exterior surface and an interior chamber. An output end has an output orifice for positioning the fluid exterior to the interior chamber. A valve engages the output orifice for controlling the fluid flowing through the output orifice.

8 Claims, 43 Drawing Sheets

(56) References Cited

U.S. PATENT DOCUMENTS

| | | | |
|---|---|---|---|
| 4,640,449 | A | 2/1987 | Blackburn |
| 4,684,032 | A | 8/1987 | Tsay |
| 4,815,635 | A | 3/1989 | Porter |
| 4,830,240 | A | 5/1989 | Tackles et al. |
| 4,852,781 | A | 8/1989 | Shurnick et al. |
| 4,911,339 | A | 3/1990 | Cushing |
| 4,955,516 | A | 9/1990 | Satterfield |
| 4,957,227 | A | 9/1990 | Trimble |
| 4,976,364 | A | 12/1990 | Solomon |
| 4,998,652 | A | 3/1991 | Champagne |
| D316,389 | S | 4/1991 | Wood et al. |
| D317,146 | S | 5/1991 | Runkol |
| 5,024,358 | A | 6/1991 | Reichert et al. |
| D319,421 | S | 8/1991 | Kerezman |
| 5,040,709 | A | 8/1991 | Neugent |
| 5,048,705 | A | 9/1991 | Lynd et al. |
| 5,060,832 | A | 10/1991 | Link |
| 5,065,909 | A | 11/1991 | Pino et al. |
| 5,104,016 | A | 4/1992 | Runkel |
| 5,105,956 | A | 4/1992 | Tarng-Lin |
| 5,105,958 | A | 4/1992 | Patton |
| 5,109,995 | A | 5/1992 | Lou |
| 5,115,952 | A | 5/1992 | Jenkins |
| 5,117,993 | A * | 6/1992 | Vesborg ........................ 215/382 |
| 5,119,978 | A | 6/1992 | Kalamaras et al. |
| D329,628 | S | 9/1992 | Runkel |
| 5,145,138 | A | 9/1992 | Schlanger et al. |
| 5,150,815 | A | 9/1992 | Saklad |
| 5,158,218 | A | 10/1992 | Wery |
| 5,170,981 | A | 12/1992 | Lin |
| 5,178,308 | A | 1/1993 | Endre |
| 5,215,231 | A | 6/1993 | Paczonay |
| D340,217 | S | 10/1993 | Delage et al. |
| 5,249,702 | A | 10/1993 | Topp et al. |
| 5,251,777 | A | 10/1993 | McMahon |
| 5,282,541 | A | 2/1994 | Chen |
| D345,134 | S | 3/1994 | Meaker |
| 5,299,720 | A | 4/1994 | Koch, III |
| 5,301,858 | A | 4/1994 | Hollander |
| 5,301,860 | A | 4/1994 | Paczonay |
| 5,320,231 | A | 6/1994 | Iodice |
| D348,641 | S | 7/1994 | Tsushi |
| 5,326,006 | A | 7/1994 | Giard, Jr. |
| 5,337,918 | A | 8/1994 | Wang |
| 5,344,055 | A | 9/1994 | Edwards |
| 5,353,955 | A | 10/1994 | Kaufman et al. |
| 5,358,142 | A | 10/1994 | Holmes |
| 5,388,712 | A | 2/1995 | Brody |
| 5,390,836 | A | 2/1995 | Faulds |
| D356,542 | S | 3/1995 | Finkiewicz et al. |
| 5,423,509 | A | 6/1995 | LaPorte et al. |
| 5,437,389 | A | 8/1995 | Kaufman et al. |
| 5,484,128 | A | 1/1996 | Franco, Sr. |
| 5,497,920 | A | 3/1996 | Moeller et al. |
| 5,513,762 | A | 5/1996 | Janani |
| 5,579,948 | A | 12/1996 | Lin |
| 5,582,320 | A | 12/1996 | Lin |
| 5,588,548 | A * | 12/1996 | Brankley ...................... 215/388 |
| 5,624,064 | A | 4/1997 | McGee, Jr. |
| 5,651,471 | A | 7/1997 | Green |
| 5,676,285 | A | 10/1997 | Vinarsky |
| 5,687,861 | A * | 11/1997 | Wiedemann ................. 215/11.3 |
| 5,704,525 | A | 1/1998 | Barro |
| D391,222 | S | 2/1998 | Lenox |
| 5,755,368 | A | 5/1998 | Bekkedahl |
| 5,788,134 | A | 8/1998 | Matic, Jr. |
| 5,803,328 | A | 9/1998 | Nakahara |
| 5,810,228 | A | 9/1998 | Brokering |
| 5,839,632 | A | 11/1998 | Koday |
| 5,878,898 | A | 3/1999 | Shefflin |
| 5,887,774 | A | 3/1999 | Bethune |
| 5,901,882 | A | 5/1999 | Siegel |
| 6,032,841 | A | 3/2000 | Johnson |
| 6,050,433 | A | 4/2000 | Russell et al. |
| 6,050,444 | A | 4/2000 | Sugg |
| 6,059,245 | A | 5/2000 | Hermansen et al. |
| 6,123,065 | A * | 9/2000 | Teglbjarg ................. 126/263.09 |
| 6,179,146 | B1 | 1/2001 | Betras |
| 6,196,413 | B1 | 3/2001 | Tung |
| 6,216,929 | B1 | 4/2001 | Bonard et al. |
| 6,273,283 | B1 | 8/2001 | Terrana et al. |
| D455,707 | S | 4/2002 | Sartore |
| 6,401,997 | B1 | 6/2002 | Smerdon, Jr. |
| 6,427,890 | B1 | 8/2002 | Meng |
| 6,427,928 | B1 | 8/2002 | Horota et al. |
| 6,457,691 | B1 | 10/2002 | Kao |
| 6,499,615 | B1 | 12/2002 | Szieff et al. |
| 6,543,660 | B2 | 4/2003 | Young et al. |
| 6,616,021 | B1 | 9/2003 | Shih |
| 6,837,407 | B1 | 1/2005 | Towers et al. |
| 6,854,629 | B1 | 2/2005 | Sartore |
| 6,860,404 | B2 | 3/2005 | Duqueroie |
| 6,929,135 | B1 | 8/2005 | Hajianpour |
| 6,932,255 | B2 | 8/2005 | Van Houtte |
| 6,953,135 | B2 | 10/2005 | Litton et al. |
| D529,859 | S | 10/2006 | Irvine |
| D530,261 | S | 10/2006 | Irvine |
| 7,140,509 | B2 | 11/2006 | Yang |
| 7,204,382 | B2 | 4/2007 | Cezwaux |
| D557,653 | S | 12/2007 | Meggiolan |
| 7,320,410 | B2 | 1/2008 | Ver Hage |
| 7,331,489 | B2 | 2/2008 | Glynn et al. |
| 7,413,244 | B2 | 8/2008 | Tanaka et al. |
| 2002/0030059 | A1 | 3/2002 | Hirota et al. |
| 2003/0094556 | A1 | 5/2003 | Meggiolan |
| 2003/0098324 | A1 | 5/2003 | Litton et al. |
| 2003/0102318 | A1 | 6/2003 | Lee |
| 2004/0164047 | A1 | 8/2004 | White et al. |
| 2004/0256428 | A1 | 12/2004 | Meggiolan |
| 2005/0156001 | A1 | 7/2005 | Dal Pra et al. |
| 2005/0279792 | A1 | 12/2005 | Batchelor |
| 2006/0086758 | A1 | 4/2006 | Coles |
| 2006/0131255 | A1 | 6/2006 | Blondeel |
| 2006/0186076 | A1 | 8/2006 | Shiloni |
| 2007/0012740 | A1 | 1/2007 | Montgomery |
| 2007/0034594 | A1 | 2/2007 | Doucet et al. |
| 2007/0062973 | A1 | 3/2007 | Sochacki |
| 2007/0075094 | A1 | 4/2007 | Brown |
| 2007/0175852 | A1 | 8/2007 | Hage |
| 2007/0278273 | A1 | 12/2007 | Hollis |
| 2008/0087270 | A1 | 4/2008 | Shaikh et al. |
| 2008/0116238 | A1 | 5/2008 | Tseng |
| 2008/0237233 | A1 | 10/2008 | Choi et al. |
| 2008/0251492 | A1 | 10/2008 | Shi |
| 2010/0084362 | A1 | 4/2010 | Letchinger et al. |
| 2010/0288723 | A1 | 11/2010 | Mayer |

* cited by examiner

FLUID CONTAINER AND SUPPORT BRACKET THEREFOR

CROSS-REFERENCE TO RELATED APPLICATIONS

This application claims benefit of U.S. Patent Provisional application No. 61/275,601 filed Aug. 31, 2009. This application claims benefit of U.S. Patent Provisional application No. 61/277,318 filed Sep. 23, 2009. All subject matter set forth in provisional application No. 61/275,601 filed Aug. 31, 2009 and provisional application No. 61/277,318 filed Sep. 23, 2009 are hereby incorporated by reference into the present application as if fully set forth herein.

BACKGROUND OF THE INVENTION

1. Field of The Invention

This invention relates to containers and more particularly to the retaining and dispensing of a fluid from a fluid container.

2. Background of the Invention

Proper hydration is necessary in the transportation of body nutrients, facilitating digestion, and the elimination of waste products. Hydration is crucial when one is involved in exercise of all types. Lubrication of joints and body temperature regulation are facilitated by proper hydration. Sustained exercise such as running and bicycling can easily result in loss of a few percent of body weight due to sweating. This results in a drop in blood volume, causing the heart to work harder, which can lead to dizziness, muscle cramps fatigue, and in some extreme cases heat exhaustion or heat stroke.

Runners and bicyclists must therefore be especially concerned about maintaining proper hydration regimens while pursuing their activities. The primary concern to the runner is the ability to hydrate while maintaining eye contact with the ground surface and other objects. The primary concern to the bicyclist is the ability to hydrate while maintaining eye contact with the ground surface and concentrating on riding and controlling the bicycle. A few of the many requirements of a hydration bottle include the ability of the runner and the rider to drink without tilting the head or taking his eyes off the road, thereby maintaining better aerodynamic positioning; easy opening and closing of the container; and controlling the temperature of the hydration fluid. Some examples of the attempts of the prior art to solve these problems include the following.

U.S. Pat. No. 2,710,108 to Zarra discloses beverage containers, and more particularly to an improved beverage flask or bottle which can be opened or closed by a simple movement of one hand.

U.S. Pat. No. 3,840,153 to Devlin discloses a drinking utensil including a container having flexible walls and a conduit extending into the container. A valve is applied to the conduit to control the flow of a beverage which is dispensed when a pressure is applied to the flexible walls of the container. A capsule that contains a refrigerant is insertable in the container to keep the liquid contents of the container cool. The capsule is removable from the utensil for freezing the refrigerant.

U.S. Pat. No. 4,095,812 to Rowe discloses an apparatus installed on a bicycle to permit the rider to drink water or other liquid while riding. The apparatus comprises an extensible drinking straw which communicates with a water bottle. In a preferred form, the straw is a flexible tube coiled in a retracting reel mounted on the upper horizontal bar of the bicycle frame, with the water bottle mounted below the saddle. A form of retracting reel is shown which requires no rotating seal, but permits the flexible tubing to remain in one continuous length. An alternative form comprises a length of retractile coiled tubing in a lidded container mounted within reach of the rider. Another form employs a telescoping drinking straw of rigid tubing.

U.S. Pat. No. 4,244,477 to Seel discloses a container for a potable liquid in the form of an elongated cylinder having a screw cap with two holes secured to the top of the cylinder. The cylinder is double walled and includes an insulating material disposed between the two walls. A drinking straw passes from the liquid through one of the holes, forms a loop outside the container, and the outer end of the straw is insertable into the second hole. An annular sealing ring is provided in each hole so that the straw fits snugly in the two holes in a manner such that the loop can serve as a handle for carrying the container.

U.S. Pat. No. 4,274,566 to Rowe discloses an improvement in the subject of U.S. Pat. No. 4,095,812, and relates to an apparatus installable on a bicycle or other vehicle to enable the rider to drink water or other liquid while riding and without distracting his attention. A flexible drinking tube is retained on an improved retracting reel mechanism in a housing preferably attached to the upper horizontal frame member of a bicycle. The tube is continuous, with no rotary joints. The fixed inner end of the flexible tube is connected to a rigid or semi-rigid supply tube which extends into a water bottle mounted separately from the reel housing. In the improved retracting reel mechanism, the flexible drinking tube passes around two spaced sheaves. One sheave is guided for displacement in translation against the urging of a tension spring. When the rider pulls out the mouthpiece end of the drinking tube, this sheave moves linearly in the manner of a block-and-tackle to a degree, e.g., half the extension of the drinking tube. When the mouthpiece is released, the spring, via this sheave, automatically retracts the drinking tube. The axis of the other sheave is preferably fixed at an angle to permit the tube to clear the frame member. A check valve at the submerged end of the supply tube operates to keep the tubing system full of liquid.

U.S. Pat. No. 4,345,704 to Boughton discloses a bottle mount and a bottle for bicycles comprising a mount for attachment to the bicycle. The mount has a concave surface that is a segment of a surface of revolution of a substantially straight line of not more than about 180 degrees in circumferential extent and a bottle having an external surface that is complementary to a concave surface of the mount. The concave surface of the mount and the complementary surface of the bottle have hook and loop cloth fastener elements affixed to them. A beverage in the bottle is discharged through a valved dispenser that is designed to be opened using the teeth.

U.S. Pat. No. 4,386,721 to Shimano discloses discloses a fixture for mounting a water bottle on a bicycle frame which is provided with a fixing member fixed to the frame and a support member. The fixing member is provided with a pair of skirts which contact with both lateral sides of the water bottle supported by the support member and with both lateral sides of the frame, to cover gaps produced between the water bottle and the frame.

U.S. Pat. No. 4,441,638 to Shimano discloses a water-bottle mounted along the bicycle frame. The body is of a block-like shape and thin, a pair of side walls extends longitudinally and vertically. The interval between the outer surfaces of side walls gradually decreases from the front surface portion to the rear surface portion, and the rear surface portion is formed in a circular arc smaller in a curvature than the surface of a circular arc of the frame, so that the body is formed to be streamlined together with the frame.

U.S. Pat. No. 4,544,077 to Rucker discloses a liquid container having a container body provided with an open top. A slot extends through the side wall of the container body, and a liner of liquid absorbing material surrounds the outer surface of the container body and covers the slot. A top cover is removably mounted on the container body in covering relationship to the open top thereof, the top cover having a liquid outlet which the liquid in the container can be removed therefrom. The top cover has a leg depending therefrom and movable into and out of closing relationship to the slot so that liquid from the container body can be adjustably allowed to pass through the slot from the container body and into contact with the inner surface of the liner. When the ambient air and the container move relative to each other, evaporative cooling occurs which causes the liquid in the container body to be cooled.

U.S. Pat. No. 4,629,098 to Eger discloses a portable liquid dispenser suitable for use by persons while performing an activity comprising a thermally-insulated container for liquids having a fastener for releasably attaching the same for access by the user. A single flexible dispensing tube having a pair of parallel longitudinal passages is connected at one end connected to the filling cap of the container and at the other end to a dispensing valve for discharging liquids from the container. The container is pressurized by a compressible bulb sealed end around the distal end of the dispensing tube in communication with the interior of the container through one longitudinal passage in the tube. A check valve is disposed in the air inlet of the fitting and another check valve is disposed in the air inlet of the dispensing valve which cooperate with the bulb to force air into the container. A number of compressions of the bulb forces air into the container to pressurize the liquid therein which flows through the other longitudinal passage on demand of the user by pressing a plunger on the dispensing valve.

U.S. Pat. No. 4,684,032 to Tsay discloses a portable thermos bottle with retractable suction tube. The bottle comprises a case, a cup cover, an inner cover with a sliding slot, a slide block capable of sliding up and down on the sliding slot. A spiral reel is fitted in the inner cover and has a helical groove, a projecting helical rib, an upper journal and a holed lower journal. Two coiled springs are fitted on the upper and lower journals. A flexible sucker has one end coming out of the slide block and another extending through the lower journal hole into the bottle so that it is easier to suck the liquid or beverage in the bottle with the retractable suction tube.

U.S. Pat. No. 4,815,635 to Porter discloses a water supply apparatus utilized in conjunction with a bicycle to enable a rider to receive either a spray of cooling water or a stream for drinking purposes. A diaphragm-type pump supplies the water. Plural reservoirs enable a plurality of liquids to be transported and utilized, such as water for cooling the rider and a sucrose solution for energy.

U.S. Pat. No. 4,852,781 to Shurnick, et al. discloses a runner's portable water supply. The supply comprises a water bottle with a special cap and sipping tube. The sipping tube is curved and only slightly flexible so that it can be bent, but retains its shape if the wearer does not bend it. The cap fits into the bottle neck in a liquid tight coupling and has a first interior surface slideably mating with the tube in a substantially liquid tight coupling and has a second interior tunnel permitting gas to enter the bottle but deflecting liquid so that liquid cannot splash out of the bottle. The bottle is coupled to a selected part of the wearer's body with the upper end of the tube near the wearer's mouth and the lower end of the tube near the bottom interior surface of the bottle. Air flows into the bottle as liquid is sipped out. The bottle need not be held.

U.S. Pat. No. 4,911,339 to Cushing discloses a liquid dispensing apparatus, suitable for mounting on a bicycle. The apparatus safely provides the rider of the bicycle a way to refresh himself without having to stop and dismount the bicycle. In a preferred embodiment, the apparatus generally includes a cylindrical housing containing a supply of liquid. The liquid is dispensed through an unrestricted length of flexible tubing, leading from the housing to a nozzle which is disposed on the handle bars of the bicycle. A pleated bellows is disposed at the bottom of the housing and forms a chamber for holding compressed air. Each inward stroke of the bellows forces air into the chamber so as to hold the contents under pressure. Adjacent the nozzle, and integrally connected thereto is a hand operated valve which, in its normal state is closed. Depressing the valve forces the liquid out of the container, through the tubing and nozzle, to the rider.

U.S. Pat. No. 4,976,364 to Solomon discloses an improved cap and straw assembly for use with a water bottle or the like, wherein a bottle cap of the type having a poppet valve is equipped with a drinking straw for facilitated dispensing or drinking of a beverage from the bottle. The poppet valve includes a valve member adapted for movement to a position defining an open outlet port through which the bottle contents can be dispensed. The drinking straw has an upper end carried by the cap in surrounding relation to the outlet port, and a lower end terminating within the bottle near a bottle wall thereof. When the valve member is open, the straw permits the beverage to be sucked through the straw and poppet valve, thereby permitting beverage dispensing without requiring bottle inversion.

U.S. Pat. No. 5,024,358 to Reichert, et al. discloses a liquid bottle efficiently carried by a bicycle having a tubular frame. The frame includes a forwardly extending first tube projecting forwardly from near the seat to the steering column, and a second tube projecting downwardly and rearwardly from the steering column at an angle alpha. relative to the first tube and toward the pedal rotor bearing. The two tubes define an upright frame plane that extends forwardly. The liquid bottle apparatus has substantially flat, relatively narrow, opposite side walls which are substantially parallel and adapted to extend in parallel relation to the frame plane when the bottle is positioned between the first and second tubes. The bottle has a forwardly elongated upper side adapted to extend parallel to and beneath the first tube. The bottle has a forwardly and upwardly elongated lower side adapted to extend parallel to and above the second tube. A first snap connector integral with the bottle and projecting above the upper side thereof is provided to snap connect to the first tube, and a second snap connector integral with the bottle and projecting forwardly and downwardly below the lower side thereof is provided to snap connect to the second tube. A duct means extends within the bottle interior and to the upper exterior of the bottle so that a bicyclist can insert the upper end of the duct means into his mouth to withdraw liquid from the bottle while riding. The external body of the bottle is made of a suitable FDA approved foamed plastic to provide such bottle with thermal-insulating properties U.S. Pat. No. 5,040,709 to Neugent discloses an articulated expandable cage for a bicycle water bottle including two clamp parts. One clamp part can be pivoted and displaced with respect to the other to enlarge the clamp opening for reception of the oversize bottom of a bottle having an intermediate section that is snugly received by the clamp when the two clamp parts are moved together. The oversize bottle bottom is too large to pass through the closed clamp opening, but the bottle can be removed by tilting it to pivotally and translationally separate the two clamp parts against the action of a closing spring.

U.S. Pat. No. 5,048,705 to Lynd, et al. discloses a bottle and drinking tube assembly for dispensing of liquids. The bottle has an open top body formed from a resilient plastic material and is adapted to be collapsed upon application of moderate hand pressure and a cap for closing the top through which the bottle is filled. An aperture is formed in the cap for receiving an elongated drinking tube that extends to the bottom of the bottle and has an end exterior of the bottle from which the liquid is discharged. A fluid seal is formed between the cap and tube. A selectively operable venting valve is also provided in the cap to alternatively permit airflow into the bottle enabling the user to sip the liquid through the tube or to prevent fluid outflow from the bottle when the bottle is collapsed to forcibly expel liquid through the tube.

U.S. Pat. No. 5,065,909 to Pino, et al. discloses a cover for an open standard beverage can, or a container of similar end configuration, including a cap having an outlet passage and a vent, and a valve received in the cap with a snap-in assembly. The valve has a tubular lever that can be put in communication with the outlet passage to form a mouthpiece. Under this condition, the valve also opens the vent.

U.S. Pat. No. 5,104,016 to Runkel discloses a drinking system for a rider of a bicycle characterized by inflatable bladder with suitable conduit and valves for conveying the potable beverage stored in the inflatable bladder to the drinker on the bicycle so the bicycle rider can drink a potable beverage without having to stop the bicycle. Also disclosed are specific preferred embodiments.

U.S. Pat. No. 5,105,956 to Tarng-Lin discloses a nursing bottle having a nipple to be connected with an extension hose. It includes a nipple which is able to be connected with an extension hose and extend through a fixing component and a bottle cap into the bottle. A grip jaw is provided on the fixing component which will be contracted in a reception trough or hole on the top of the bottle while the fixing component is screwed on the bottle cap to tightly grip the extension hose. The length of the extension hose is able to be adjusted to extend out of the bottle to facilitate the nursing bottle to be used in offering the nipple to the baby or child for sucking and placing the bottle at a distance and without the need of the nurser or the baby or child having to hold the bottle.

U.S. Pat. No. 5,105,958 to Patton discloses a water bottle and support assembly for a golf bag including a retainer bracket, a hanger strap and retaining belt for mounting the retainer bracket on the golf bag, and a water bottle supported by the bracket. The retainer bracket has a front surface provided with a vertically extending dovetail groove, and the water bottle has a corresponding dovetail tongue thereon sized to fit within the groove, so that the bottle can be easily and quickly installed or removed.

U.S. Pat. No. 5,109,995 to Lou discloses a beverage serving set comprising a drinking straw and beverage container combination wherein the drinking straw is L-shaped having long and short parts, and the container has a guiding structure for maintaining the long part vertical in the container and the short part parallel to the lid of the container. The long part is slidable and rotatable in the guiding structure which may be an adapter depending from the lid or a guiding tube attached to the container wall. A clip is provided on the lid to securely hold the short part of the straw for storage, and in addition a cap may be provided at the clip for capping the end of the short part of the straw.

U.S. Pat. No. 5,115,952 to Jenkins discloses a container clamped to a forward bicycle frame member and containing at least one liquid replacer, a container cap having one tube inserted therein and extending interiorly of the container to the bottom thereof. The one tube is positioned within said cap so that the tube interior end is positioned within the container to maximize the intake of the liquid positioned within the container. The tube extends from the container to and through a clamp on the bicycle handlebars. The tube terminates above the handlebars in a mouthpiece which aids in drawing the at least one liquid from the container by the cyclist. In a multiple compartment container a multipler way valve connects the tubes within the container to the single tube extending from the container to the mouthpiece.

U.S. Pat. No. 5,119,978 to Kalamaras, et al. discloses a drinking reservoir for a bicycle and the like consisting of a housing having at least one compartment for storing a drinkable liquid therein. A mechanism is provided for securing the housing to a portion of the bicycle and another mechanism is provided for extracting the drinkable liquid from the at least one compartment in the housing so that a cyclist can consume the drinkable liquid contained therein without removing his hands from the control of the bicycle. A straw and a tube extend from the compartment enabling the cyclist to drink liquid through the straw and to blow into the tube to spray liquid out of the straw to cool off, alternately. One embodiment allows for rapid emptying and cleaning with a brush that can be easily brought into contact with an entire internal surface of the compartment when inserted therein.

U.S. Pat. No. 5,150,815 to Saklad discloses a drink container having spaced apart transparent shells with the intervening space containing a liquid and floatable and sinkable objects. A cap and cover on the container open top are rotatable between a drinking position where a sipping straw extends upwardly for use and a non-drinking position where the straw is moved within the cover and pinched off to prevent leakage.

U.S. Pat. No. 5,158,218 to Wery discloses a pressurized fluid dispensing device for storing and dispensing pressurized fluid, such as water, to athletes during the performance of their particular activity, particularly endurance events such as a bicycle tour, biathlon, triathlon and the like. The pressurized fluid dispensing device may be mounted to the frame of a bicycle between the vertical and diagonal supports above the center bracket or crank assembly to provide as low as possible center of gravity. The device includes a support cage, fluid vessel, tubing and an actuateable valve. The fluid vessel may be pressurized and slidingly inserted into the support cage to supply fluid through the tubing to the valve. A check valve extends from the bottom of the vessel which is sealingly engageable with a recess formed in the bottom of the support cage through which the fluid may flow. The actuateable valve is actuated to dispense fluid by being bitten. In addition, the actuateable valve may be actuated by hand to spray fluid therefrom to refresh the rider.

U.S. Pat. No. 5,178,308 to Endre discloses a curved food container having a cylindrical body portion, a curved extension portion and a mouth portion. The mouth is covered by a removable closure in order to retain the contents. The body portion includes an indentation for positioning, orienting and securing the container to a holder attached to a bicycle frame such that the mouth of the container extends away from the indentation and frame.

U.S. Pat. No. 5,249,702 to Topp, et al. discloses a beverage container including a cylindrical container formed with a mounting bracket fixedly secured to a wall of the container for securement to a support plate portion. The support plate portion includes a mounting head received within the bracket. A modification of the invention includes a lid structure arranged to receive the cylinder formed with a matrix of apertures directed therethrough. A saturated sponge includes a nutrient fluid contained therewithin to permit the nutrient fluid to be directed into a surrounding drinking fluid within the container. A plurality of such nutrient cylinders are arranged for mounting within an associated support container arranged for transport by an individual in association with the drinking container of the invention.

U.S. Pat. No. 5,251,777 to McMahon discloses a bottle and bracket apparatus including a mounting plate and a device for fixing the mounting plate to a rail. A bracket is provided for supporting a bottle with the bracket being mounted to the mounting plate in a manner enabling rotation and selective fixing of the bracket at various angular positions. A bottle is provided for both preventing selection of the various angular positions when the bottle is supported by said bracket and for containing a liquid.

U.S. Pat. No. 5,282,541 to Chen discloses a cap locking device for a water bottle comprising a bottle cap threadably closing an inner bottle, a push button and a nipple pusher. The bottle cap is shaped like a shell head having a diametric opening, a tubular post in the opening for a nipple fixed on top of a drinking tube extending vertically in the inner bottle to fit therein. A push button is pivotally fitted in one side portion of the opening and the liftable nipple pusher is pivotally fitted in another side portion of the opening. The liftable nipple pusher is pushed down to close the opening or raised up to open the opening by pushing the push button for the nipple exposed for sucking the content of the inner bottle contained in an outer bottle.

U.S. Pat. No. 5,301,858 to Hollander discloses a recreational water bottle system which including a primary vessel for holding liquids, a watertight cap having a bottle tube extending therethrough into the primary vessel, a drinking tube for delivering liquids to a user, and an oversleeve adapter disposed between the bottle tube and the drinking tube for passing liquids and for selectively holding the bottle tube and the drinking tube in structural alignment. The system is adapted to be selectively mounted onto the frame of a bicycle or onto the body of an athlete, or used as a hand held sport bottle.

U.S. Pat. No. 5,301,860 to Paczonay discloses an apparatus for dispensing liquid into the mouth of a bicyclist. The apparatus includes a container with a flexible wall, an adjustable holder for holding the container on a bicycle, a liquid delivery tube extending from the container, and at least one compressor arm actuatable by the bicyclist for compressing the container wall and forcing liquid into the liquid delivery tube. Valves connected to the liquid delivery tube prevent back flow of liquid in the direction of the container.

U.S. Pat. No. 5,320,231 to Iodice discloses a multi-purpose plastic bottle for adult personal care use in containing and dispensing liquid. The bottle has a generally cylindrical shape and tubular segments that define an aperture through the bottle so that it may be easily grasped by an adult. The bottle has a screw-type cap whereby its opening may be selectively closed or opened for dispensing liquid from the bottle.

U.S. Pat. No. 5,326,006 to Giard, Jr. discloses a plastic bottle and bottle holder for mounting on bicycles. The holder has an enclosure section with pincer arms which encircle the bottle and cooperate with grooves in the bottle to releasably retain the bottle on the bicycle.

U.S. Pat. No. 5,337,918 to Wang discloses a water bottle including a container, a cap mounted to an upper end of the container and has two holes therein, and a cover which is mounted around the cap and is rotatable between first and second positions. When the cover is in the first position, a straw mounted on the cap is hidden inside the cover while the holes are blocked. When the cover is in the second position, the straw is rotated to extend through an opening in the cover and the holes are open to allow continuous suction of the user.

U.S. Pat. No. 5,353,955 to Kaufinan, et al. discloses unitary beverage containers including a main body defining a container volume. A flexible conduit or straw is fluidly connected at a proximal end with the volume adjacent the bottom or top of the main body. The conduit or straw also includes a distal end which is preferably in the form of some shape of hollow mouthpiece having a central aperture therein with the mouthpiece is located adjacent the top of the main body. A connection or closing mechanism removably attaches a hollow member to the distal end of the flexible straw or conduit and closes the aperture of the distal end. The mechanism includes a short hollow bridge extending from the aperture at the distal end of the flexible straw or conduit which is broken during removal of the hollow member to uncover the aperture prior to use. The hollow member is otherwise isolated fluidly from the container volume. A indentation in which the mouthpiece and hollow member are received is provided at the top. A second attaching mechanism in some embodiments removably attaches the flexible straw or conduit to the main body.

U.S. Pat. No. 5,358,142 to Holmes discloses a mouth-pressurized drinking bag comprising a collapsible inner bladder for holding a beverage, such as water. A long tube has a proximal end communicably attached to the lowest portion of the bladder, and a distal end extending away from the dispenser. A closure clamp is disposed near the distal end of the tube. A highly elastic outer case substantially and snugly surrounds the bladder. The bladder can be filled through a funnel temporarily disposed at the distal end of the tube. The filled bladder can be pressurized by blowing air through the tube, so that the bladder and the elastic outer case are expanded. After the bag is filled and pressurized, the clamp is closed. When a drink is desired, the clamp is released so that the beverage will be automatically forced by the pressurized inner bladder to flow outwardly through the tube and to the user's lips.

U.S. Pat. No. 5,388,172 to Brody discloses a molded plastic container top having an upper surface from which extends an extensible dispensing tube with a liquid dispensing orifice. The orifice is closed by a removable closure in the form of a cap-like, hollow, open-ended body. A plug is formed integrally with the upper surface and extends upwardly therefrom. Extending upwardly from the plug is an integral, cylindrical, rod-like stopper extension. In the preferred embodiment, the plug is axially fluted, with three radial vanes, dimensioned to be received into the interior of the closure to retain the closure thereon with a frictional fit. The stopper extension is dimensioned to be received within dispensing orifice with a fluid-tight fit, so as to provide an alternative closure for the orifice when the dispensing tube is extended to bring the orifice into the proximity of the stopper extension. The maximum thickness of the vanes is less than or equal to the thickness of the top at the upper surface, so that the formation of the plug does not leave a significant "sink mark" on the underside of the top, opposite the plug. The ratio of the maximum thickness of the vanes to the thickness of the top at the upper surface is advantageously in the range of about 1:3 to about 3:4, with a specific preferred embodiment having a ratio of about 2:3. Other ratios, less than or equal to 1:1, should provide satisfactory results, depending on the type of material used, and the thickness of the top at the upper surface.

U.S. Pat. No. 5,390,836 to Faulds discloses a combination unit of at least one canister and a mount. The novel mount includes at least two laterally-spaced apart a base for securement to a selected surface. The base includes at least two laterally-spaced part angularly-upwardly-projecting support arms projecting from the base, and an upper, pivotally mounted, resiliently-sprung, e.g. spring biased lid. The receptacle is provided with two laterally-spaced apart depression slots which are adapted to mate with the two laterally-spaced apart support arms. A dispensing opening in the receptacle is adapted to be sealed automatically upon fitment of the receptacle with respect to the mount by actuated pivoting of the lid with respect to the mount by contact of a surface on the receptacle with a depending lever on the lid.

U.S. Pat. No. 5,437,389 to Kaufinan, et al. discloses a unitary beverage container including a main body defining a container volume. A flexible straw is fluidly connected at a proximal end with the volume adjacent the bottom of the main body. The flexible straw also includes a distal end in the form of a hollow mouthpiece having a central aperture therein with the mouthpiece is located adjacent the top of the main body. In many configurations of the mouthpiece, the mouthpiece includes a cylindrical base portion from which levers extend. An attaching mechanism removably attaches the mouthpiece of the flexible straw to the top of main body and closes the aperture of the mouthpiece. The attaching mechanism includes a short hollow bridge extending from the aperture at the distal end of the flexible straw which is broken during removal of the flexible straw to uncover the aperture prior to use. The hollow bridge is connected to a hollow chamber which is attached to the top. A concavity in which the mouthpiece is received is provided at the top. The hollow chamber is permanently attached in some embodiments and removably attached in others. Various different configurations of the mouthpiece are provided for use with the various embodiments.

U.S. Pat. No. 5,484,128 to Franco, Sr. discloses a beverage retaining apparatus for attachment to a part of a structure. The part has a part outer surface and a certain outer surface shape and size, including a beverage retaining vessel having a vessel wall and a bracket for fitting around the part. The bracket includes a part encompassing member having an inner member surface and sized so that the inner member surface is larger than and spaced apart from the part outer surface. A deformable gripping material is provided for filling the space between the inner member surface and the part outer surface and for deforming to fit the certain shape and size of the part outer surface, and an interconnection structure for connecting the vessel to the bracket. The encompassing member preferably includes a strap member having two strap ends and being longitudinally bent end to end to form a loop configuration for encompassing the part outer surface. The interconnection structure preferably removably connects the vessel to the bracket. The interconnection structure preferably includes a channel recessed into the vessel wall having a channel open end, and a projection extending from the encompassing member and sized for sliding axial insertion into the channel through the channel open end, where the channel laterally surrounds the projection to a sufficient extent for the channel to retain the projection against lateral removal of the projection from the channel.

U.S. Pat. No. 5,497,920 to Moeller, et al. discloses a sports bottle including a generally cylindrical hollow vessel having a liquid chamber formed therein and a closed end bottom. The generally cylindrical vessel further defines a reduced diameter neck portion and an upper chamber terminating in an upwardly facing mouth. The upper chamber supports a porous antisplash element preferably formed of a coarse porous foam material plastic or the like. An elongated tubular straw extends from the bottom surface within the vessel upwardly through the neck portion and through the antisplash element and beyond the mouth to form an upwardly extending end which receives a flexible mouth tube which is preferably curved toward the user when the sports bottle is secured to a conventional bicycle. In alternate embodiments, the antisplash element within the upper chamber of the vessel is formed of a plurality of tubular members defining passages therethrough and grouped together to form a generally cylindrical multipassage combination. In still further alternate embodiments, a flexible planar member having a plurality of flexible generally triangular segments is secured to the mouth portion of the vessel to provide an antisplash element. In a still further alternate embodiment, a generally planar valve member is pivotally supported within the mouth portion of the vessel and is pivoted to an open position as liquid is poured into the vessel mouth.

U.S. Pat. No. 5,513,762 to Janani discloses a drinking container such as a water bottle with a pair of telescoping straws, one of which is attached to a lid for the container and the other of which is threaded on a nut mounted on the lid for longitudinally sliding the second straw in the first straw when the nut is rotated and blocking an airway when the second straw is retracted.

U.S. Pat. No. 5,579,948 to Lin discloses a beverage container with a rotatable dome and an extendable drinking upper straw. The container comprises an open ended body closed by a removable cap, upper straw means linearly movably fitted on the cap, a dome rotatably fitted on the cap for rotation movement relative to the cap, and link means for translating the rotational movement of the dome into the linear movement of the upper straw means on the cap. The rotation of the dome causes the upper straw means to linearly move on the cap between a first position wherein the tube section of the upper straw means extends through the lateral opening of the cap and the elongate slot of the dome and is in liquid communication with the nipple of the cap, and a second position wherein the tube section of the upper straw means is withdrawn within the dome and is not in liquid communication with the nipple of the cap.

U.S. Pat. No. 5,582,320 to Lin discloses a beverage container including a rotatable cover and an automatically extendable drinking straw. The container includes an open ended body closed by a removable cap. A cover is fit onto the cap and is rotatable to a drinking position where a first straw section extends in an inclined manner upwardly through a yoke on the cap and a slot on the cover. The cover also may be rotated to a non-drinking position where the first straw section is moved within the cover and is pinched off to prevent leakage. The slot on the cover is closed by a curved member projecting from the top surface of the cap. A second straw section extends downwardly from the cap into the beverage container body U.S. Pat. No. 5,624,064 to McGee, Jr. discloses a fluid-holding container and a member for mounting the container to an object. The fluid-holding container is formed to have a concave bottom portion and sidewalls connected to the bottom portion. At the center of the bottom portion, a channel extends into the interior of the fluid-holding container. The channel is adapted to engage with a securing post of a mounting member. The mounting member includes a base portion that is attached to the object. The distance between the sidewalls and the center axis of the fluid-holding container is substantially equal to the distance between the center of the securing post and the base portion, thus assuring a secure attachment of the container to the mounting member. The present invention is suitable for use in mounting a water bottle to a bicycle.

U.S. Pat. No. 5,651,471 to Green discloses a removable top for use with drinking bottles having a first opening with a pop-up valve and a second opening for receiving a straw. This allows the user to either drink directly through the pop-up valve, or through a straw inserted through the straw opening with the pop-up valve serving as a vent. A removable cap can be used to seal the straw opening when it is not in use. The cap is tethered by a flexible strap to a ring around the base of the pop-up valve. The cap can be secured to a detent in the top for temporary storage when it is not being used to cover the straw opening. In one embodiment, the top is domed with the pop-up valve located at the top of the dome. The straw opening passes through a second raised collar extending upward to an elevation substantially in line with the base of the collar around the central opening. The detent is formed in the top surface of a third raised collar that also extends upward to an elevation substantially in line with the base of the collar around the central opening. This embodiment allows the cap to be easily rotated between the straw opening and the detent for storage.

U.S. Pat. No. 5,676,285 to Vinarsky discloses a sports bottle accessory to be coupled to the sports bottle when the cap for the bottle is connected in place to close the bottle. The accessory has a ring structure suited to fit around the fill opening neck and be trapped in place under the closure cap when secured on the bottle, or via a connection with the closure cap itself. A hook formed off of accessory and open generally toward the bottle bottom is sized to be fitted over exercise equipment, to allow the bottle to be suspended vertically upright from exercise equipment within reach of the exerciser. A flexible accessory web overlies the side of the bottle below the cap, and clip means coupled to the web spaced from the cap can releasibly hold a towel or the like relative to the bottle.

U.S. Pat. No. 5,704,525 to Barro discloses a flask holder for bicycles having a shape and dimensions equivalent to known flask type holders. A first part is formed by a length of metal rod bent in a U shape, and two longitudinal tracks which are parallel, between which a plate is welded for fixture to the bicycle. A second part, also made of a metal rod bent such as to form an arced track, from ends of which two longitudinal tracks depart perpendicularly. The lower ends of the longitudinal tracks, respective of the first part and the second part, are interconnected by a special elastic element such as a helix spring or the like. The second part can be spread for inserting and/or removing a flask which, when inserted, is gripped by the second part which is biased against the flask by elastic element U.S. Pat. No. 5,755,368 to Bekkedahl discloses a liquid dispensing apparatus installed on a bicycle for use by a person operating the bicycle or a liquid dispensing apparatus installed on a person for use by a person operating inline skates. In the preferred embodiment a carbonated drink in a container is shaken by the bouncing of the bicycle while moving which pressurizes the container. A tube leading from the container to a mouthpiece allows a person to take a drink. Another embodiment provides a pumping bulb to supply the pressure while a third embodiment uses a co.sub.2 cartridge to supply the pressure. Another installation shows a person using inline skates. The inline skate installation uses a carbonated drink in a container being shaken by the skater to supply the pressure which forces the liquid to the mouthpiece thereby allowing a person using inline skates to take a drink.

U.S. Pat. No. 5,788,134 to Matic, Jr. discloses a liquid carrying apparatus for use on a bicycle frame. The frame has a base and first and second frame members operatively interconnected adjacent the base. The apparatus comprises a liquid holding tank including frame-member-confronting sides. The tank is designed to be directly anchored to the first and second frame members. The tank is operatively connected to a hose. The base includes a hose holder that grips the hose adjacent its said second end, the holder having a user manipulable handle sized to receive and encircle a finger of a rider's hand, and a handlebar clasp which is oriented so as to be removably attachable to the handlebar.

U.S. Pat. No. 5,878,898 to Shefflin discloses an overcap assembly for a fluid container, such as a baby bottle, protects the nipple, or other fluid dispenser, from contamination and from leaking when the overcap is in the protective, covering position. The overcap has an opening in its top through which the nipple extends once a lid has been removed and the overcap has been shifted from a stable protective position surrounding the nipple to a stable enabling position exposing the nipple for use without removing the overcap from the collar. The lid is preferably tethered, hinged or otherwise connected to the overcap.

U.S. Pat. No. 5,887,774 to Bethune discloses an exercise fluid bottle which contains a liquid nourishment and which is used by a user during a strenuous physical activity. The exercise fluid bottle includes an integral container formed out of a plastic material and a dispensing cap for retaining and dispensing the liquid nourishment. The integral container has a first portion which is a hollow cylinder with an enclosed end and a partially enclosed end and a second portion which is a hollow cylinder with an enclosed end and a partially enclosed end. The integral container also has a handle portion which is a hollow cylinder which has corrugated ribbing axially aligned therewith so that the user can more comfortably grip the exercise fluid bottle and which is disposed adjacent to the partially enclosed ends of the first and second portions. The dispensing cap is fluidly and mechanically coupled to the enclosed end of the first portion. Each of the first and second portions has a first groove of a first diameter, which is equal to the diameter of a ski pole in order to receive the ski pole and a second groove of a second diameter, which is equal to the diameter of a boom of a wind-surfing apparatus in order to receive either the frame pipe or the boom. A VELCRO strap fixedly, but detachably, couples the exercise fluid bottle to either the ski pole or the boom.

U.S. Pat. No. 5,901,882 to Siegel discloses a squeezable, insulated drink bottle including a flexible, semi-rigid, plastic beverage container that fits inside of and in spaced relationship to a flexible, semi-rigid plastic housing. An inwardly oriented flange around a top opening of the housing locks into a groove under a cover shoulder of the beverage container. Recesses in the housing facilitate gripping of drink bottle.

U.S. Pat. No. 6,050,433 to Russell, et al. discloses a container closure including an access, which can receive a drinking straw, which is able to be folded down into a groove by the pivotal movement of member, which closes off the drinking straw by engaging it across an upstanding flange or projection.

U.S. Pat. No. 6,050,444 to Sugg discloses a consumable beverage dispenser having a collapsible beverage container, a valve assembly, and a flexible tube or straw. The collapsible beverage container has at least one opening and the valve assembly is secured to the container at the opening. The valve assembly includes a flexible diaphragm disposed across the flow path such that beverage flow is permitted only outwardly from the container. The flexible tube extends outwardly from the valve assembly. When a user exerts sucking action on the end of the flexible tube, beverage is made to flow from the container out through the one-way valve assembly and into the flexible tube. As beverage is withdrawn, the container collapses and, when the user stops drinking, the flexible diaphragm closes to prevent air and back flow from entering the container. In one embodiment, the flexible tube is slidable within the valve assembly between an open and a closed position. In the closed position, the flexible tube secures the flexible diaphragm to the valve seat and thereby prevents fluid flow through the valve assembly. In the open position, the flexible tube is spaced from the flexible diaphragm and thus beverage can flow through the valve assembly and out through the flexible tube in response to sucking action exerted on the end of the flexible tube by a user.

U.S. Pat. No. 6,176,146 to Betras discloses a container having first and second hollow chambers attached to a top. The first chamber has a helical surface that can be placed adjacent to a corresponding helical surface of the second chamber. The top can include a pair of apertures for receiving a straw such that one aperture resides above each chamber. A straw can be placed into one of the apertures when one desires to drink from the container. The drinking container can further include an attachment device for better attaching the helical chambers.

U.S. Pat. No. 6,196,413 to Tung discloses a water bottle-straw assembly comprising a screw-threaded cap base including a lift-lower cap attached at one side thereof and a through hole in which a suction base is inserted. The suction base has a protruding suction end having a valve and a flange providing an air guiding groove. A straw is inserted into the suction base and a flexible tube is telescopically connected to the lower end of the straw to allow use with containers of varying sizes.

U.S. Pat. No. 6,273,283 to Terrana, et al. discloses a bottle, preferably made of plastic, including a body of generally cylindrical external configuration and a clip joined to the body. The body has a closed lower end and an open upper end adapted to receive a cap. The clip is disposed within the cylindrical external configuration of the body and is spaced from a wall of the body by a slot having an open slot end disposed along the exterior of the bottle by which part of a support structure is insertable between the clip and the body wall to support the bottle upon the support structure.

U.S. Pat. No. 6,401,997 to Smerdon, Jr. discloses a fluid storage and delivery system for bicyclists. In the preferred embodiment, the fluid is contained in a collapsible fluid container adapted to be removably inserted within the sides of a first support bracket mounted to the bicycle down tube frame member and a second support bracket mounted to the seat tube frame member. A conduit for delivering liquid to a cyclist extends from an inlet end within the fluid container to an outlet end accessible to the cyclist and may include a check valve at its inlet end. The conduit may also include a disconnection means to allow the conduit to be disconnected at the outlet side of the fluid container. Preferably the disconnection means is a quick disconnect tube connector with a flow shut-off capability oriented at the inlet side of the connection, so as to provide a seal against leakage from the fluid container when the connectors are disconnected. The support brackets have sides defining an open space between the sides and a central mounting plate to which the sides are attached, with the mounting plate having a series of apertures along its length and adapted for fastening the mounting plate to the threaded openings customarily used for mounting water bottle cages to bicycle seat and down tube frame members. A molded container adapted to be held within the sides of the support bracket is also disclosed.

U.S. Pat. No. 6,427,928 to Hirota, et al. discloses a straw comprising a cylindrical plug member having an opening at a top thereof, and a straw member which vertically extends through a bottom portion of the plug member and which is retractable in the longitudinal direction of the straw member. The straw is adapted to fit the plug member with a top of a mouth of a beverage container so as to retain in a state where the straw is inserted into the beverage container. The straw is also adapted to allow a top of the straw member to be protruded from the mouth of the beverage container by extending the straw member and to allow the top of the straw member to be contained within the plug member by retracting the straw member so as to attach a cap of the beverage container.

U.S. Pat. No. 6,860,404 to Duqueroie discloses a device for dispensing a fluid product including a reservoir configured to contain a fluid product and air, a spray orifice associated with the reservoir, and a dip tube. The reservoir may include at least one deformable zone having a predetermined threshold resistance to deformation. The deformable zone may be configured to deform in response to pressure exerted on the deformable zone so as to cause the product to be sprayed out from the orifice. When pressure exerted on the deformable zone is less than a threshold pressure P.sub.s sufficient to overcome the predetermined threshold resistance to deformation of the deformable zone, the internal volume of the reservoir is not substantially reduced.

U.S. Pat. No. 6,929,135 to Hajianpour discloses a bottle holding a beverage including a straw and stopper combination that is moved into a deployed position within the neck of the bottle after the cap of the bottle is removed. In this position, an air path through the stopper provides for air flow into the bottle when suction is applied through the straw. When suction is not applied, the air path is closed by a flexible member of the stopper, so that the beverage cannot leak outward through the air path or through the straw.

U.S. Pat. No. 6,953,135 to Litton et al. discloses a liquid delivery apparatus for a bicycle including a container adapted to contain a liquid and a tube having a first end and a second end. The container is releasably mountable to a selected one of a seat rail and a seat post of the bicycle. The container has a first opening and a second opening. The first opening is adapted to receive a liquid and is disposed above a normal liquid level line of the liquid when present in the container. The second opening is disposed below the normal liquid level line. The first end of the tube is attachable to the container in fluid communication with the second opening. The liquid when present in the container is delivered to a mouthpiece attached to the second end of the tube.

U.S. Pat. No. 7,140,509 to Yang discloses a suction hose stop valve of a water bag comprising a holder having a central passage, a swivel cap and a suction hose penetrating through the central passage. A retaining member is provided on both sides of the central hole. A locking bolt is provided in front and rear of the holder, and a hole in the swivel cap admits penetration of the suction hose for delivery the water. A press tab on each side of the hole is in the swivel cap, and a locking trough at lower edge of the press tab engages the retaining member to bend the suction hose to prevent delivery of water.

U.S. Pat. No. 7,204,382 to Cezeaux discloses a hydration system for carrying readily dispensable fluids, such as water. A removable cap having an annular valve covers a container. A flexible tube is disposed through the center of the annular valve and extends generally to near the bottom of the container. A bite valve is attached to the end of the tube that is external to the container. When the annular valve is closed, the hydration system is substantially closed, preventing fluid loss. When the annular valve is opened, an air channel is created that allows air to enter the container, facilitating the flow of fluid from the container through the flexible tube. The annular valve may be a poppet-type valve having a valve stem that is movable between the closed position and the open position. The hydration system is sufficiently compact to be utilized with narrow-mouthed bottles.

U.S. Pat. No. 7,320,410 to Ver Hage discloses a removable cap assembly including a cap having a curved side wall having an inner surface and an outer surface. A top portion extends from the curved side wall, a boss extends perpendicularly from the top portion. The boss has a bottom and a top, a first circumferential rib extending perpendicularly from the top of the boss and a second circumferential rib extending perpendicularly from the bottom of the boss. The boss and rib defining an opening in the cap, the opening has a width and a height. A stopper is dimensioned to seal the opening, the stopper has a hole therein configured to allow a fluid to flow therethrough. The stopper is maintained in the cap by the boss and second circumferential rib, the stopper includes a disc shaped base. A cylindrical wall portion extends from the base, a first groove in the base surrounding the wall portion. The first groove is dimensioned to receive the bottom of the boss and a second circumferential groove at a bottom of the wall dimensioned to receive the second circumferential rib.

U.S. Pat. No. 7,331,489 to Glynn, et al. discloses a liquid metered dispensing squeeze bottle including: a squeezable container having an opening for dispensing liquid therefrom at one end and a bottom at the other end. A nonflexible trap chamber of a predetermined volume, connected to the opening of the container; a dip tube, and a one way valve at the bottom of the dip tube. There is an inlet leg that freely rotates around the bottom of the dip tube and a drive mechanism, such as a counterweight or a float, to assure that the leg extends into an air pocket when the container is tilted for liquid squeeze dispensing.

United States Patent Application 2002/0030059 to Hirota, et al. discloses a straw comprising a straw member having an outer straw portion and an inner straw portion. The outer and inner straw portions are telescopingly fitted with each other. The inner straw portion includes an elastic upper section, and a cylindrical plug member has an opening at the upper end thereof. The inner straw portion is retained in the beverage container by mounting the plug member to the upper end of a mouth of the beverage container. The upper section of the inner straw portion is bent by pressing with a beverage container cap so as to attach the beverage container cap to the beverage container. The upper end of the inner straw portion is protruded from the upper end of the plug member by detaching the beverage container cap. A combination of straw and beverage container cap is also provided which can store the upper end of the inner straw portion, which protrudes from the upper end of the plug member. The straw storing portion is formed in a top plate of the cap of the beverage container to attach the cap of the beverage container.

United States Patent Application 2003/0102318 to Lee discloses a spout assembly having a plurality of fluid passages so as to enable easy and convenient drinking of liquid beverages contained in the container through an associated straw and easily dispense the liquid beverages into another container. The spout assembly includes a main body coupled on a top of a container, a fluid spout assembly having a first fluid passage through which the liquid beverage can flow out of the container in a state where the container is inclined and a second fluid passage through which the liquid beverage can be socked in a state where the container vertically stands; and a cap coupled to the fluid spouting assembly. The fluid spout assembly can be folded on a folding portion or be elected so that the user can drink or dispense the liquid beverages.

United States Patent Application 2005/0279792 to Batchelor discloses a machine for automatic water to biker. The bike rider only has to lean in to an extended small hose that is attached to the front and center of the bike, then can still focus on riding while depressing the button and the water will be pumped into his mouth, and water spayed on his face if he so desires a cooling of water instead of a drink.

United States Patent Application 2006/0086758 to Coles discloses a hydration system. One embodiment of the present invention relates to a universal hydration system for drinking fluid from an independent container. The universal hydration system includes a tube and a cap configured to couple with an independent container. The tube extends through the cap in a leak resistant manner and is disposed within the interior of the independent container. The other end of the tube may be coupled to a tube cap of some sort including a bite valve or a cover, or may be left exposed. The cap is coupled to the independent container using the independent container's coupling system. Additional caps configured for coupling to various containers may also be included with the system. In addition, the additional caps may be stored on the tube so as to create a one piece universal hydration system. Likewise, the full length of the tube can be extended into the container for storage purposes. Additional embodiments may also include the ability to pressurize the independent container via some form of pump and valve system.

United States Patent Application 2006/0131255 to Blondeel discloses a drinking element with passage for cooperation with a beverage container. The element comprises a coupling part for engaging an opening in the beverage container; an engaging part located at a distance from the coupling part, dimensioned so as to be enclosed by the lips of a user; and a passage opening provided through the coupling part and the engaging part for passing beverage from the beverage container through the drinking element to the user. The coupling part is designed to be fastened in and/or over the opening of a beverage container while forming a liquid-tight sealing between the drinking element and the beverage container.

United States Patent Application 2006/0186076 to Shiloni discloses a bottle cap, and a method for making it. The bottle cap includes a cap member having internal screw threads adapted for sealing engagement with a neck of a beverage bottle and a bi-directional tubing coupler integrally formed with the cap member. The tubing coupler includes a first coupling element for coupling a first tube inside the bottle and includes a second coupling element coupling a second tube outside the bottle, to permit drinking of a beverage from inside the bottle through the tubes and the tubing coupler.

United States Patent Application 2007/0012740 to Montgomery discloses an aerodynamic fluid holder for accepting fluid packs, such as water bottles, for mounting onto a bicycle is provided. According to one embodiment, the fluid holder comprises a first side, a second side, a stern, and a top. The first side can be connected to the second side along a lower edge and along a bow to define a hull. The stern can be connected to the hull at a distal end of the fluid holder and the top can be connected to the stern and the sides to define a cavity. One or more fluid packs can be housed within the cavity. The top has at least one aperture to accept at least one fluid pack.

United States Patent Application 2007/0034594 to Doucet discloses a vented bottle or bottle cap that typically includes two one-way valves. The first one-way valve vents the bottle while fluid exits the bottle, and the second one-way valve prevents spillage. The vented bottle or bottle cap may be configured for use with a conventional sports bottle, a conventional soft drink or water bottle, or a specially designed bottle with a vent tube near the bottom of the bottle. The vented bottle cap may also be used in conjunction with a pouch system that allows a user to fill a pouch with fluid while the pouch is securely supported within the bottle. In this manner, a user can carry pouches, such as foil or plastic pouches, with desired ingredients, such as a water purifying chemical, a flavor ingredient, electrolytes, medicines and so forth. A pump may be used to deliver water from a water supply into the pouch while the pouch is supported within the bottle.

United States Patent Application 2007/0062973 to Sochacki discloses a water bottle or liquid container that reduces aerodynamic drag. The liquid container comprises a surface with a plurality of dimples. The dimples comprises a number of different sized and shaped dimples.

United States Patent Application 2007/0175852 to Hage discloses a removable cap assembly having a cap with a curved side wall having an inner surface and an outer surface. A top portion extends from the side wall. A boss extends perpendicularly from the top portion in the shape of an inverted trapezoid, where the boss has a bottom and a top. A first circumferential rib extends perpendicularly from the top of the boss. A stopper is dimensioned to seal the opening, having an inverted trapezoidal shape complementary to the boss. The stopper is maintained in the cap by the inverted trapezoid shape of said boss. The stopper includes a disc shaped base, a cylindrical wall portion extending from the base, a first groove in the base surrounding the wall portion dimensioned to receive the bottom of the boss. An appliance member is adapted to be positioned within the hole and extending through the opening.

United States Patent Application 2007/0278273 to Hollis discloses an athletic hydration system for cyclists which includes up to four containers having inverted fluid-filled bottles contained therein. The containers are placed either within the frame of a bicycle or at the rear of the bicycle behind the bicycle seat. A system of valves determines whether a cyclist drinks from one, two, three or all four fluid-filled bottles simultaneously. The athletic hydration system is hygienic, versatile and flexible, and provides adequate hydration over extended periods of time in which quick removal and installation of hydration products are possible by the cyclist while maintaining the speed, cadence and aerodynamic posture of the cyclist.

United States Patent Application 2008/0116238 to Tseng discloses a kettle holder including an elongated plate adapted to be mounted on a bicycle frame. A holding arm integrally extends from one side of the elongated plate to be vertical to a longitudinal axis of the elongated plate for engagement with one side of a kettle. A helix arm integrally extends from the other side of the elongated plate to be opposite to the holding arm. The helix arm has a bend formed on a free end thereof so that a receiving space is defined among the holding arm, the helix arm and the bend for receiving therein the kettle. The helix arm is able to deform to provide clamping force for engagement with the kettle and when the kettle is removed, the helix arm returns to its original position.

United States Patent 2008/0237233 to Choi et al. discloses drink bottles, or drink containers with cap assemblies that include a drink spout. In some embodiments, the drink spout is pivotally coupled to a base of the cap assembly. In some embodiments, the drink spouts include mouthpieces, including self-sealing mouthpieces. In some embodiments, the cap assembly includes a handle, which may include at least one guard for the drink spout and/or mouthpiece. In some embodiments, the drink containers include a manual on/off valve. In some embodiments, the dispensing spout includes a mount for the mouthpiece and/or cooperates with the cap to provide a manual on/off valve to selectively restrict flow of drink fluid from the drink container regardless of the drink spout's and/or mouthpiece's configuration. In some embodiments, the drink containers include a drink tube extending from external of the drink containers and/or an air return system.

Although the aforementioned prior art have contributed to the development of the art of bicyclist hydration, none of these prior art patents have solved the needs of this art.

Therefore, it is an object of the present invention to provide an improved apparatus for easier drinking from the invention and enabling more aerodynamic positioning of the runner or bicyclist.

Another object of this invention is to provide an improved apparatus enabling the runner or bicyclist to drink from the invention without tilting his head or taking his eyes off the ground.

Another object of this invention is to provide an improved apparatus that is simple for the operator to use.

Another object of this invention is to provide an improved apparatus that enables the operator to maintain a grip on the invention, even when wet from condensation.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a fluid container for retaining and dispensing a fluid into the mouth of an individual. The fluid container comprises a deformable body extending from bottom end to a top end and defines an exterior surface and an interior chamber. The deformable body defines a general axis of symmetry. The top end has an output orifice for positioning the fluid exterior to the interior chamber. A valve engages the output orifice for controlling the fluid flowing through the output orifice. The valve defines a general line of symmetry.

In one embodiment, the general axis of symmetry and the general line of symmetry define a non-parallel orientation for positioning the deformable body in a generally vertical position and the mouth of the individual in a generally horizontal position during engaging between the mouth and the valve.

In another embodiment, the general axis of symmetry and the general line of symmetry define a parallel orientation for positioning the deformable body in a generally vertical position and the mouth of the individual in a generally horizontal position during engaging between the mouth and the valve.

In a more specific embodiment of the invention, the deformable body includes a generally cylindrical body portion and a generally conical body portion. The generally conical body portion defines a second general axis of symmetry. The second general axis of symmetry and the general line of symmetry define a generally parallel orientation for further positioning the deformable body in a generally vertical position and the mouth of the individual in a generally horizontal position during engaging between the mouth and the valve.

In one embodiment of the invention, the valve includes a port plug valve. The port plug valve has a valve body rotatably engaging within a cylindrical valve plug. The cylindrical valve plug engages the output orifice. The cylindrical valve plug includes a plug chamber interposed between a plug input and a plug passage traversing the cylindrical valve plug. The valve body includes a valve passage within the valve body. The valve body rotates upon the cylindrical valve plug for aligning the plug passage with the valve passage to permit the fluid through the port plug valve. The valve body rotates upon the cylindrical valve plug for separating the plug passage with the valve passage to terminate the fluid through the port plug valve. A flexible stem has a sphincter valve interposed between a valve body cavity and a discharge cavity. The valve body cavity engages over the valve body. The valve body cavity includes a stem passage within the valve body cavity. The stem passage is aligned with the valve passage to permit the fluid from the port plug valve and into the valve body cavity. The sphincter valve normally maintains a constriction to the fluid being discharged from the flexible stem absent pressurization of the fluid within the deformable body. A compressive force is applied to the deformable body for pressurizing the fluid and overcoming the constriction of the sphincter valve to permit discharge of the fluid from the flexible stem. The flexible stem defines multiple general lines of symmetry for altering the angular discharge of the fluid relative to the deformable body. A rotation force applied to the flexible stem causes valve body to rotate.

In another embodiment of the invention, the input orifice includes a male threading. The input closure includes a cap defining a cylindrical outer wall extending from a closure wall. The cylindrical outer wall includes a female threading for threadably engaging the male threading of the input orifice. The closure wall abuts the input orifice for sealing the input orifice. The closure wall includes a circular groove. A cage receives the deformable body for securing the deformable body to the object. The cage includes a concave plate extending between a first side, a second side, a bottom end and a top end. The first side and the second side define a first arcuate arm and a second arcuate arm respectively. The bottom end defines a mounting hook. The first arcuate arm and said second arcuate arm encircle the deformable body and the mounting hook engages the circular groove for retaining the deformable body within the cage.

In another embodiment of the invention, a flexible nozzle having a circular taper structure for propelling the fluid in a jet flow. The flexible nozzle has a circular groove for grasping and supporting said flexible nozzle with the teeth of the individual. The interior channel of the flexible nozzle includes a taper channel structure for propelling the fluid in a jet flow. The interior channel wall includes a plurality of conical channels for creating a vortex flow of the fluid within the interior channel and increasing the jet flow. The flexible nozzle is constructed from a transparent polymeric material for indicating the cleanliness of said flexible nozzle.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 119 is a view similar to FIG. 112 illustrating the container in a general vertical position with the port plug valve in an open position and the sphincter valve preventing the fluid from dispensing from the container;

FIG. 120 is a view similar to FIG. 85 illustrating the fluid expanding the sphincter valve for permitting the fluid to be dispensed from the container only upon a compressive force applied to the container;

Figure 87:
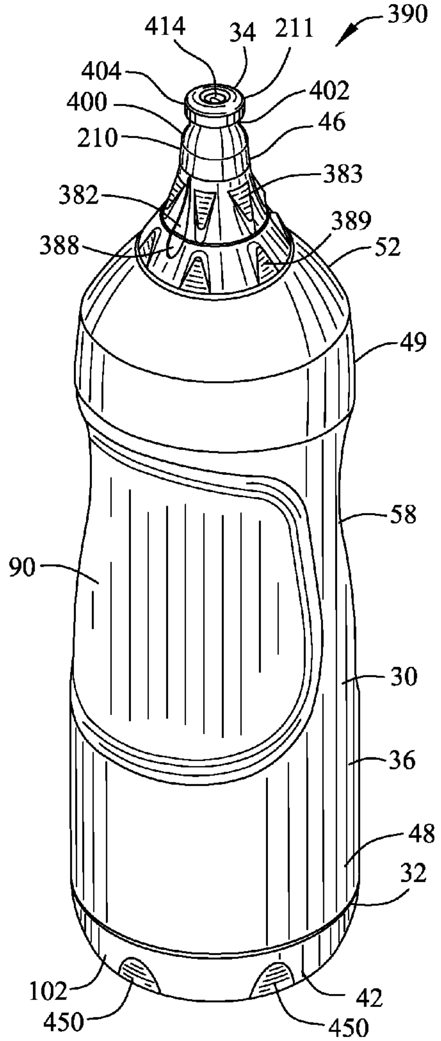
FIG. 87 is an isometric view of a third embodiment of a fluid container of the present invention.
Figure 88:
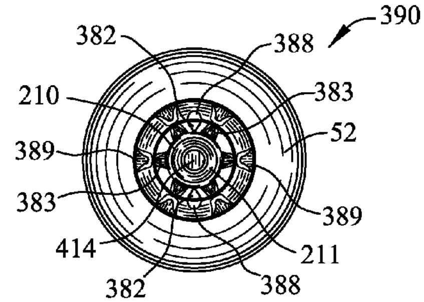
FIG. 88 is a top view of FIG. 87.
Figure 89:
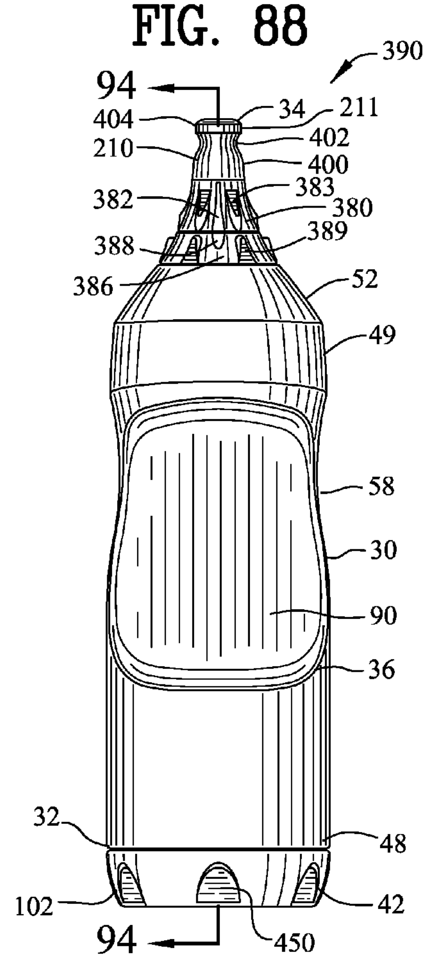
FIG. 89 is a front view of FIG. 87.
Figure 90:
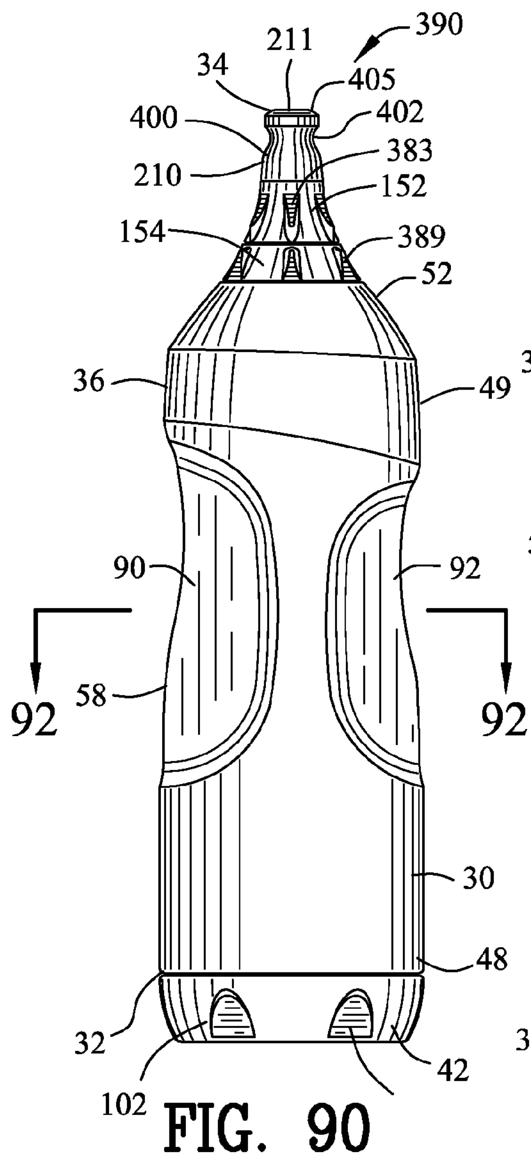
FIG. 90 is a side view of FIG. 87.
Figure 91:
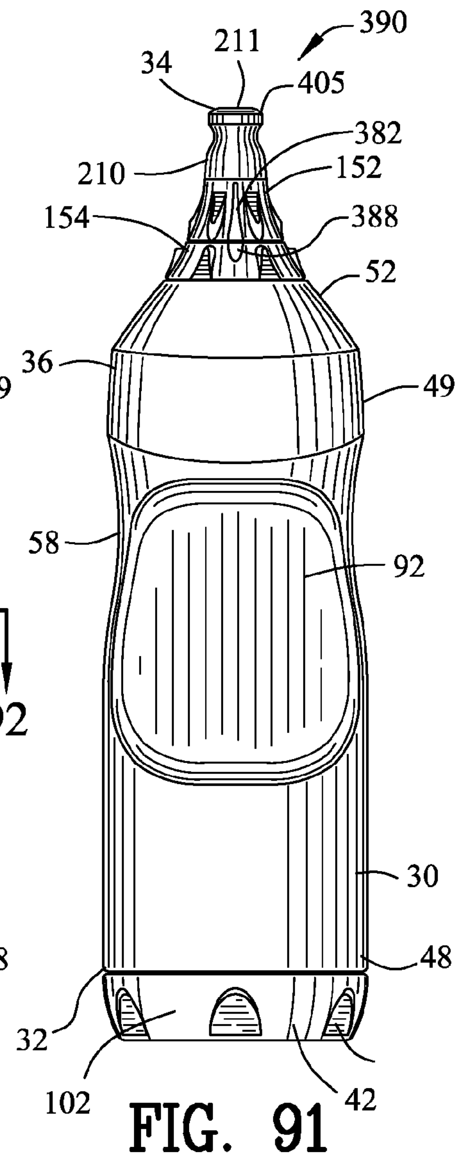
FIG. 91 is a rear view of FIG. 87.
Figure 92:
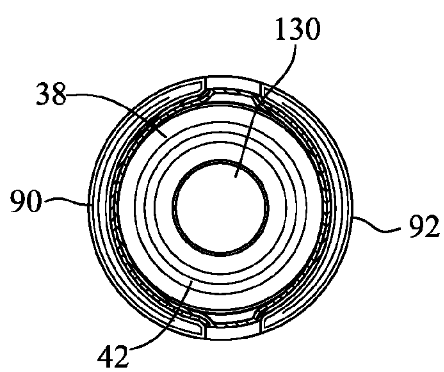
FIG. 92 is a sectional view along line 92-92 in FIG. 90.
Figure 93:
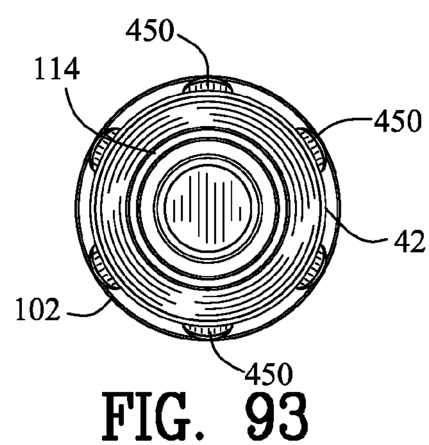
FIG. 93 is a bottom view of FIG. 87.
Figure 96:
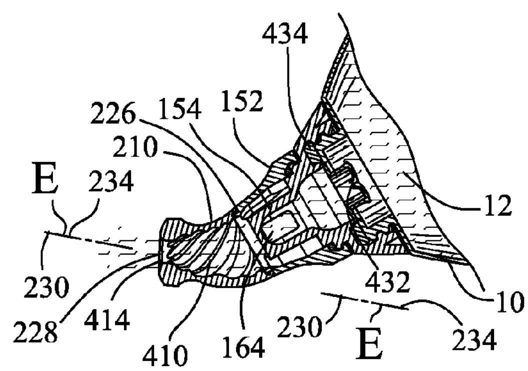
FIG. 96 is a view similar to FIG. 95 illustrating the flexible nozzle having a second general vector of symmetry (E)
Figure 97:
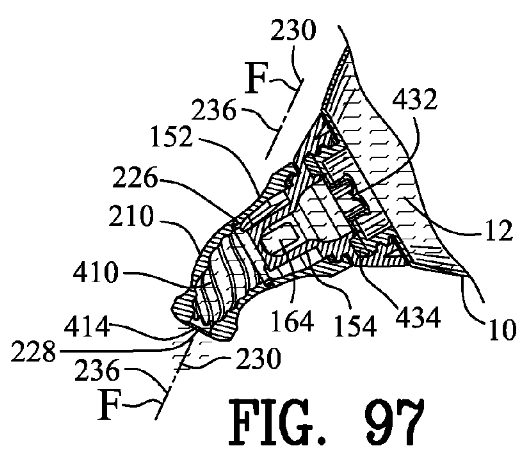
FIG. 97 is a view similar to FIG. 95 illustrating the flexible nozzle having a third general vector of symmetry (F)
Figure 121:
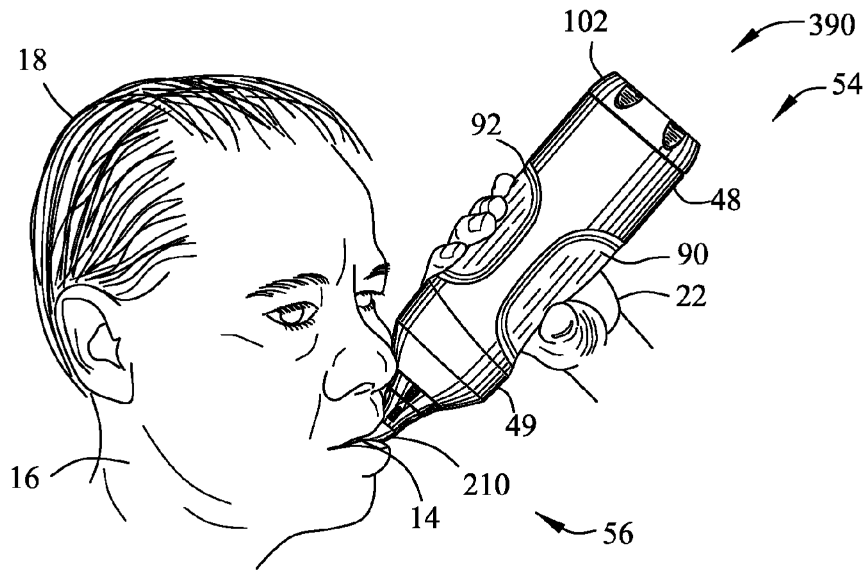
Figure 122:
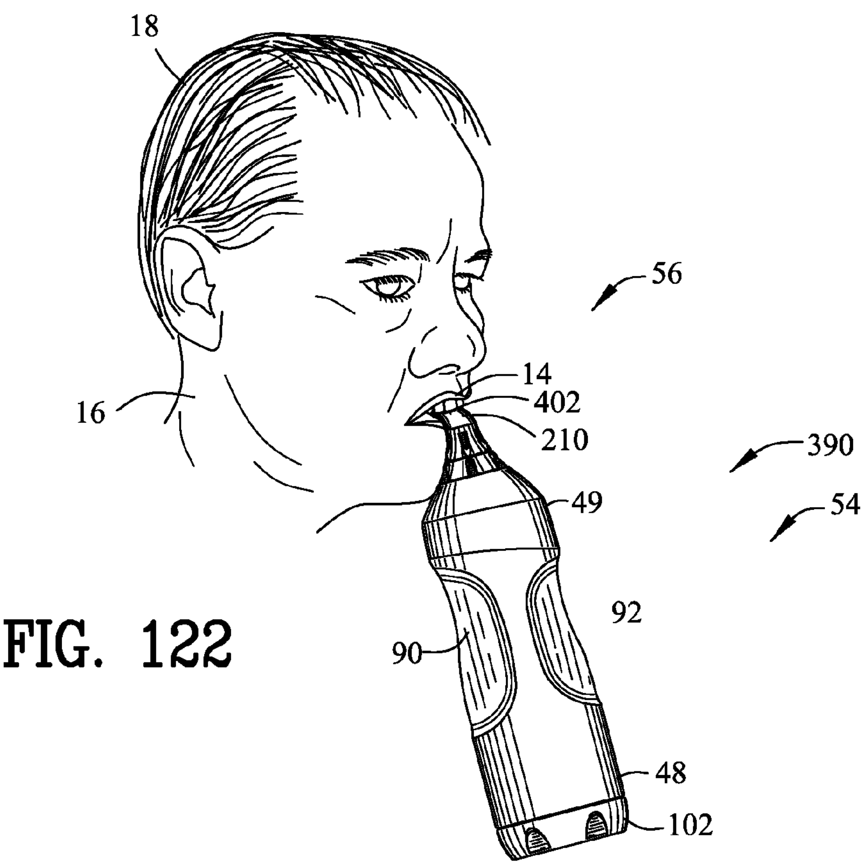

FIG. 121 is a view of the fluid container of FIG. 87 with the flexible nozzle of FIG. 96 with an individual grasping the fluid container with his hand and the flexible nozzle positioned in the mouth of the individual for permitting the individual's head to remain horizontal while receiving fluid from the container; and FIG. 122 is a view of the fluid container of FIG. 87 with the flexible nozzle of FIG. 97 with the individual grasping the fluid container with his teeth for permitting the individual's head to remain horizontal.

Similar reference characters refer to similar parts throughout the several Figures of the drawings.

DETAILED DISCUSSION

FIGS. 1-13 and 36-39 illustrate a first fluid container 10 for retaining and dispensing a fluid 12 into the mouth 14 of an individual 16. The fluid container 10 comprises a deformable body 30 extending from a bottom end 48 and a top end 49 and defining an exterior surface 36 and an interior chamber 38. The bottom end 48 may include an input end 32 and the top end 49 may include an output end 34. The input end 32 has an input orifice 40 for positioning the fluid 12 within the interior chamber 38. An input closure 42 engages the input orifice 40 for sealing the input orifice 40. The output end 34 has an output orifice 44 for positioning the fluid 12 exterior to the interior chamber 38. A valve 46 engages the output orifice 44 for controlling the fluid 12 flowing through the output orifice 44. The deformable body 30 includes a generally cylindrical body portion 50 and a generally conical body portion 52. The generally conical body portion 52 couples the valve 46 to the generally cylindrical body portion 50. The generally conical body portion 52 directs the fluid 12 from the interior chamber 38 to the valve 46 upon the deformable body 30 positioned in a generally vertical position 54 and the mouth 14 of the individual 16 in a generally horizontal position 56 during engaging between the mouth 14 and the valve 46.

As best seen in FIGS. 9 and 36-38, the deformable body 30 defines a general axis of symmetry 60 labeled "A" that extends from the input end 32 to the output end 34. The valve 46 defines a general line of symmetry labeled "B". The general axis of symmetry 60 and the general line of symmetry 62 define a non-parallel orientation 64 for positioning the deformable body 30 in a generally vertical position 54 and the mouth 14 of the individual 16 in a generally horizontal position 56 during engagement between the mouth 14 and the valve 46 of the fluid container 10. Furthermore, the generally conical body portion 52 defines a second general axis of symmetry 66 labeled "C". The second general axis of symmetry 66 and the general line of symmetry 62 define a generally parallel orientation 68 for further positioning the deformable body 30 in a generally vertical position 54 and the mouth 14 of the individual 16 in a generally horizontal position 56 during engaging between the mouth 14 and the valve 46 of the fluid container 10.

Both the general line of symmetry 62 and the second general axis of symmetry 66 form an acute angle 70 with the general axis of symmetry 60. Furthermore, the overall length 72 of the valve 46 and overall length 74 of the generally conical body portion 52 are substantially less than the overall length 76 of the generally cylindrical body portion 50. The acute angle 70 and overall lengths 72, 74 and 76 provide for the generally conical body 52 and the valve 46 extending exclusively above the deformable body 30 for defining a generally elongated cylindrical container 78.

FIGS. 35-39 illustrate the individual 16 positioned upon a bicycle 20. By positioning the deformable body 30 in a generally vertical position 54 and the mouth 14 of the individual 16 in a generally horizontal position 56 during engagement between the mouth 14 and the valve 46 of the fluid container 10, the individual 16 will more easily be able to completely empty the fluid 12 from the fluid container 10. The generally vertical position 54 and generally horizontal position 56 also alleviates the individual 16 from tilting the head 22 backwards in order to consume the fluid 12. The fact that the head 22 of the individual is retained within a horizontal position provides both an improved aerodynamic positioning of the head of the individual who is riding a bicycle and permits the individual to retain a front visual view.

As seen in FIGS. 8, 9, 13 and 35-38, the exterior surface 36 of the deformable body 30 may include a first contoured recess 80 and a second contoured recess 82. Preferably, the first contoured recess 80 and the second contoured recess layer 82 define an opposing side orientation 84 for facilitating a conforming engagement between the hand 22 of the individual 16 and the deformable body 30.

Figure 38:
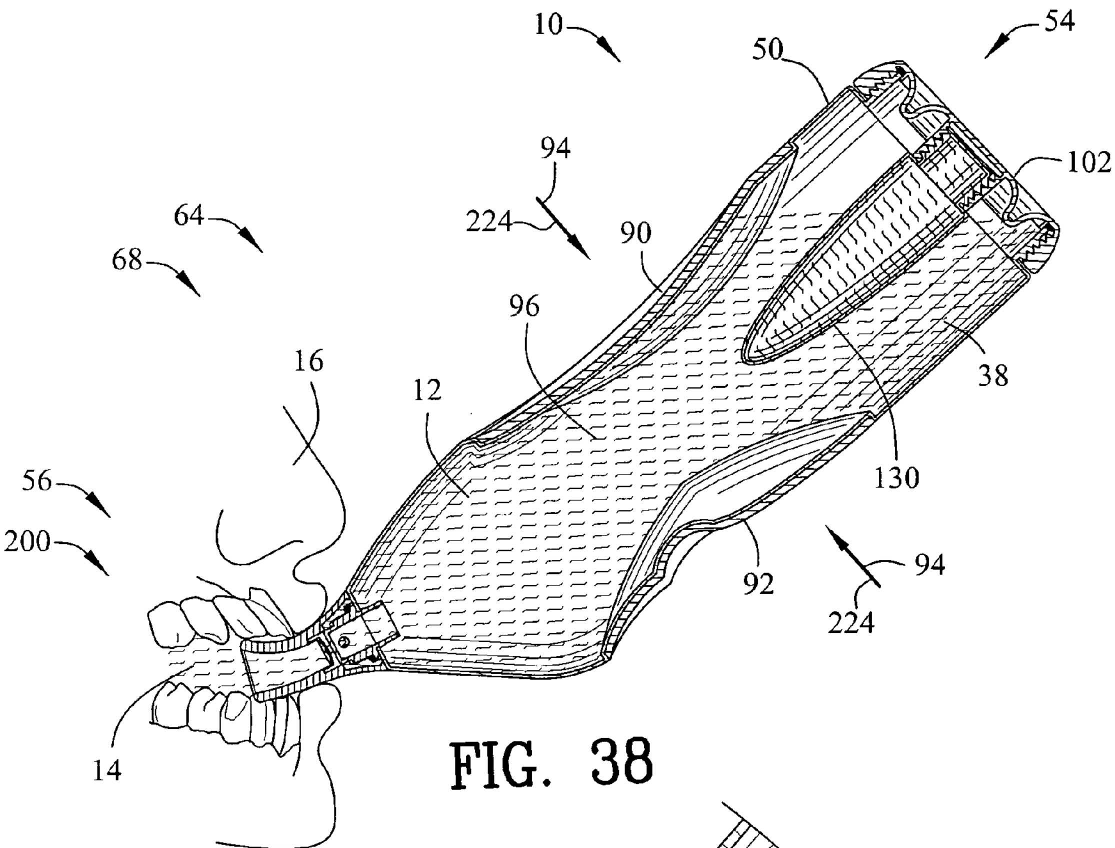
FIG. 38 is a view similar to FIG. 37 illustrating a compressive force applied to the container for discharging the fluid into the mount of the individual.
Figure 39:
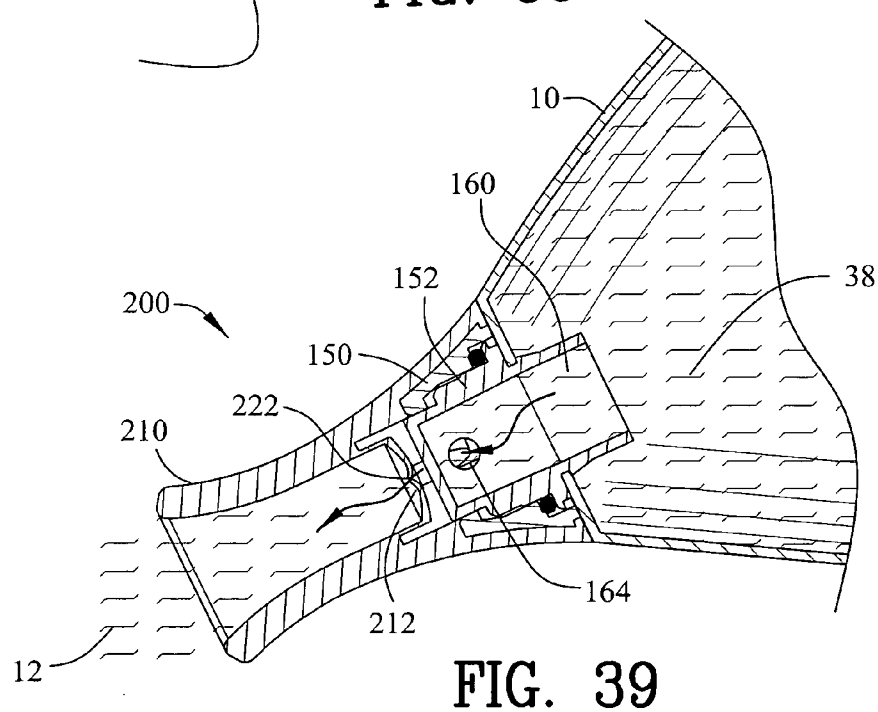
FIG. 39 is an enlarged portion of FIG. 38 illustrating the fluid traversing the port plug valve and a sphincter valve.
Figure 43:
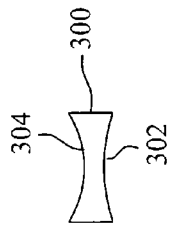
FIG. 43 is a top view of a cage coupling bar.
Figure 45:
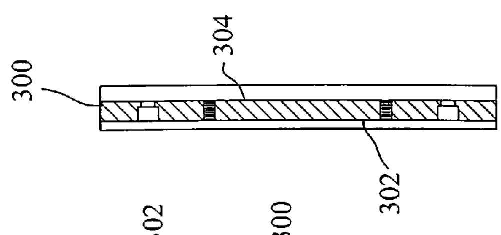
FIG. 45 is a sectional view along line 45-45 in FIG. 44.
Figure 44:
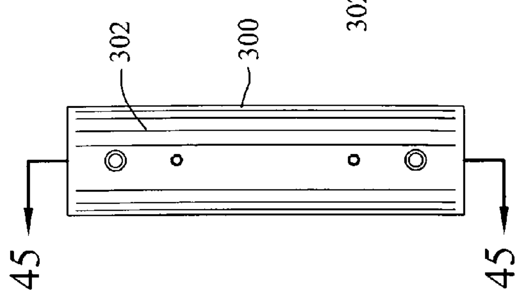
FIG. 44 is a front view of FIG. 43.
Figure 42:
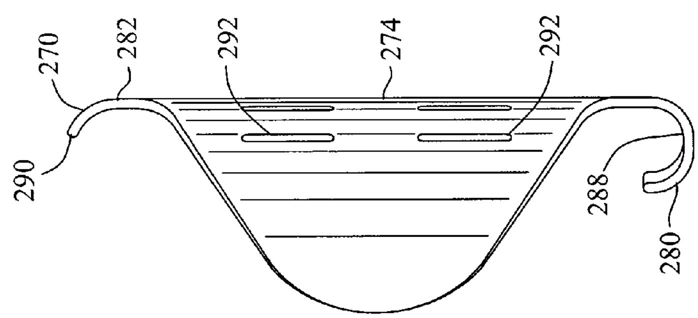
FIG. 42 is a side view of FIG. 40.
Figure 40:
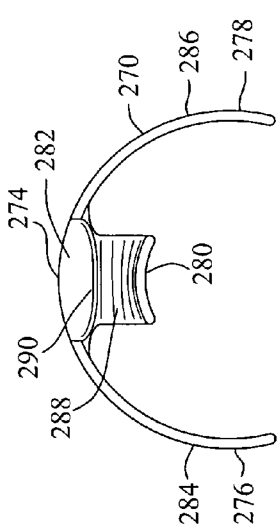
FIG. 40 is a top view of a cage for retaining the container to an object.
Figure 41:
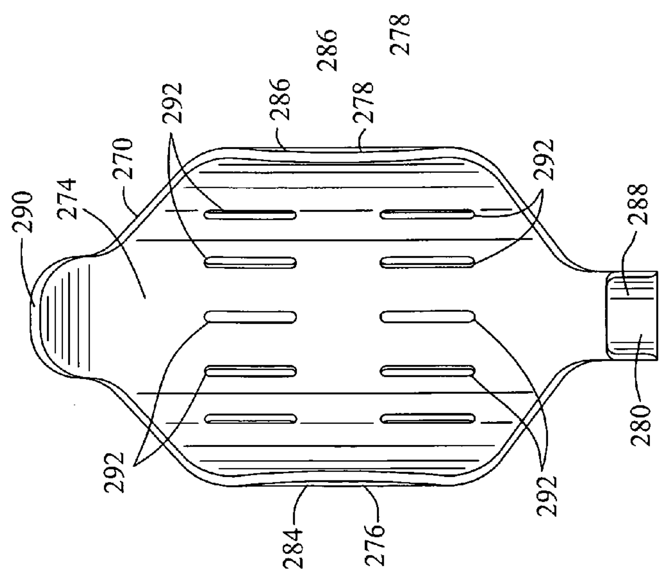
FIG. 41 is a front view of FIG. 40.
Figure 46:
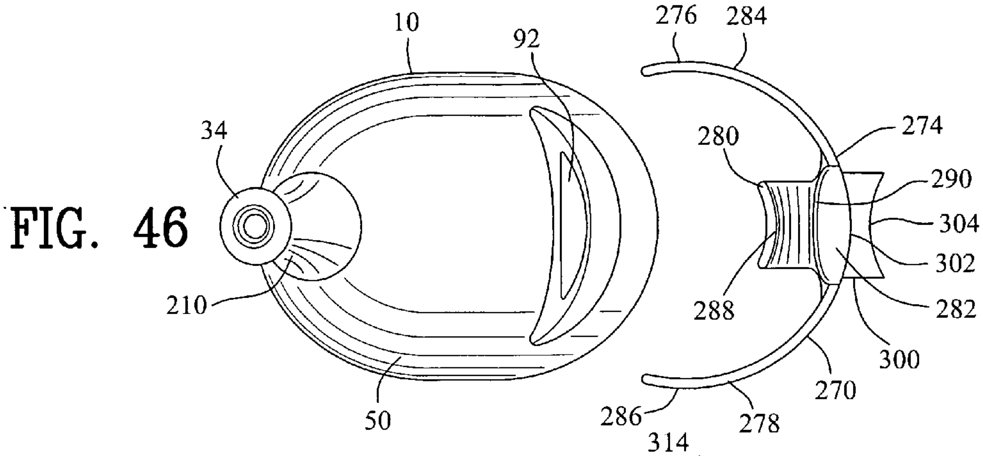
FIG. 46 is a view similar to FIG. 40 illustrating the container positioned adjacent to the cage.
Figure 47:
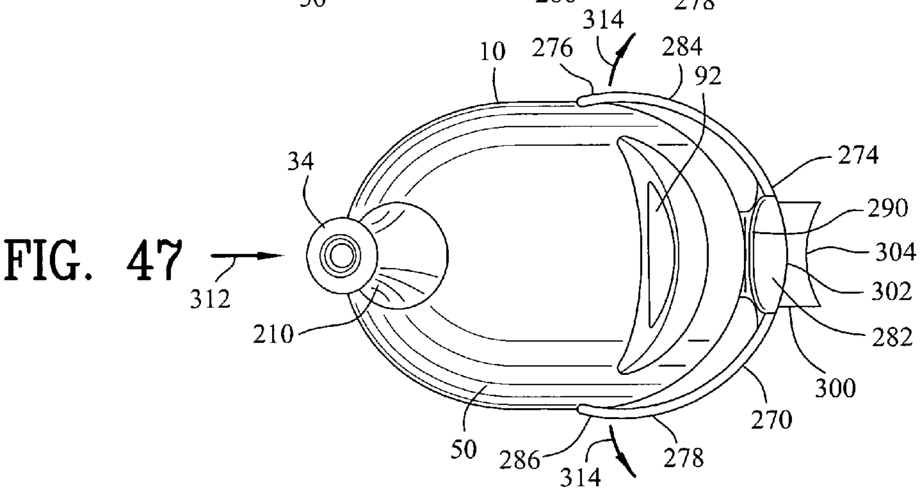
FIG. 47 is a view similar to FIG. 46 illustrating a force applied to the container to cause the container to displace a first arcuate arm and a second arcuate arm.
Figure 48:
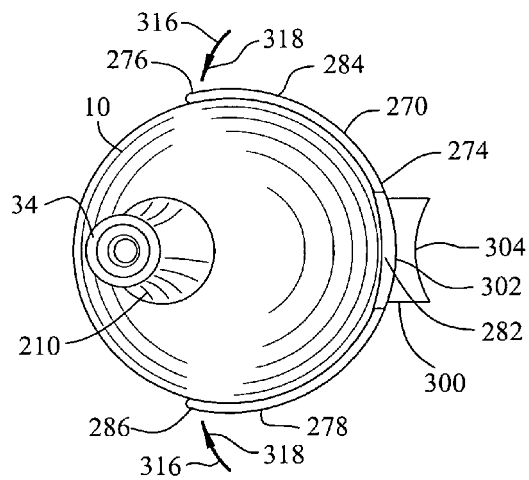
FIG. 48 is a view similar to FIG. 47 illustrating the container fully engaged within the cage wherein the first arcuate arm and the second arcuate arm apply a compressive force the container.
Figure 49:
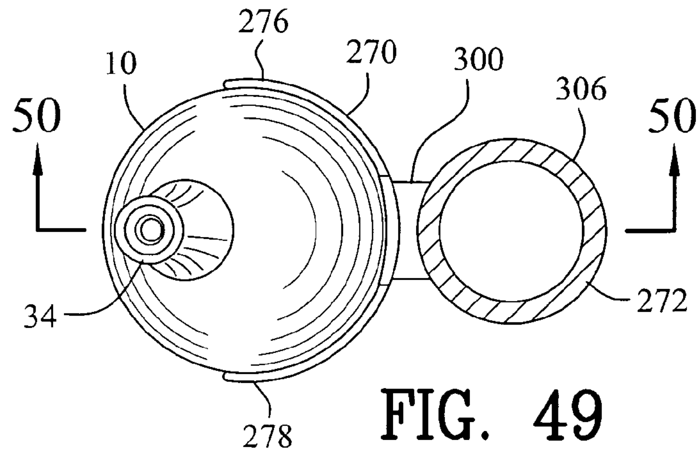
FIG. 49 is a sectional view along line 49-49 in FIG. 34.

The first contoured recess 80 and the second contoured recess 82 may receive a first handling layer 90 and a second handling layer 92 respectively. Similarly, the first handling layer 90 and the second handling layer 92 define an opposing side orientation 84 for facilitating a frictional engaging between the hand 22 of the individual 16 and the deformable body 30. As seen in FIG. 38, the deformable body 30, the first handling layer 90 and the second handling layer 62 deform upon the individual 16 applying a compression force 94 to the first handling layer 90 and the second handling layer 92 for altering the interior chamber 38 between a first volume 96 and a second volume 98.

The construction of the flexible body 30 may include a polymeric material having a transparent or nontransparent property. Preferably, the flexible body 30 is structured from transparent polypropylene having a BPA free construction. The first handling layer 90 and the second handling layer 92 may be over-molded to the flexible body 30 and maybe constructed from a soft silicone.

Figure 1:
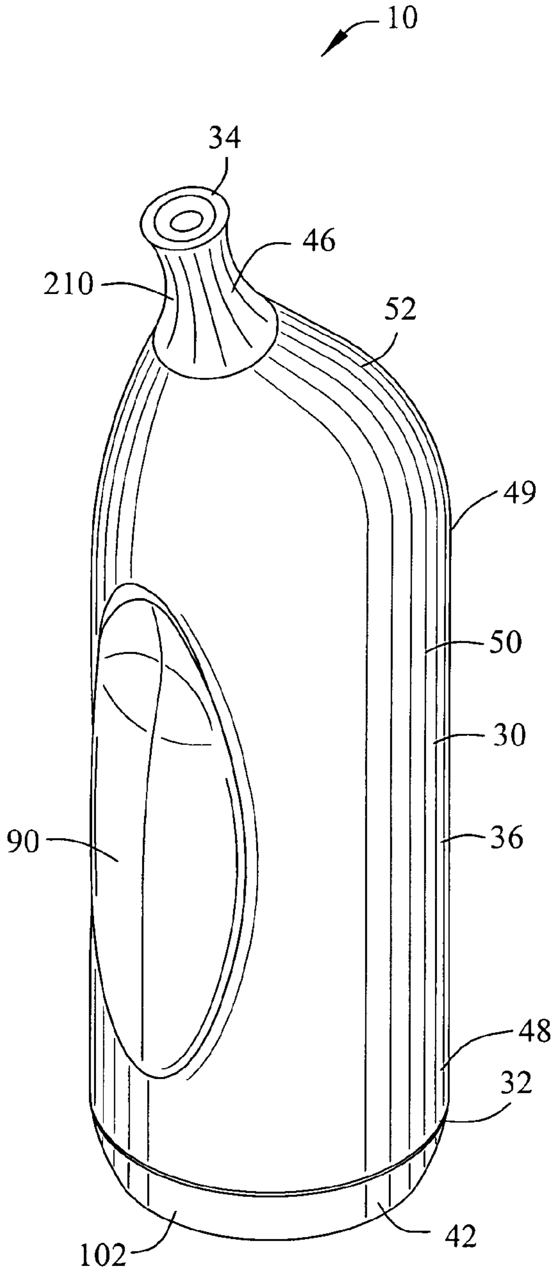
FIG. 1 is an isometric view of a first embodiment of a fluid container of the present invention.
Figure 2:
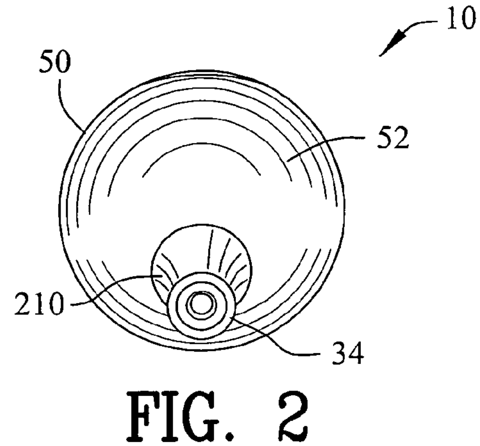
FIG. 2 is a top view of FIG. 1.
Figure 3:
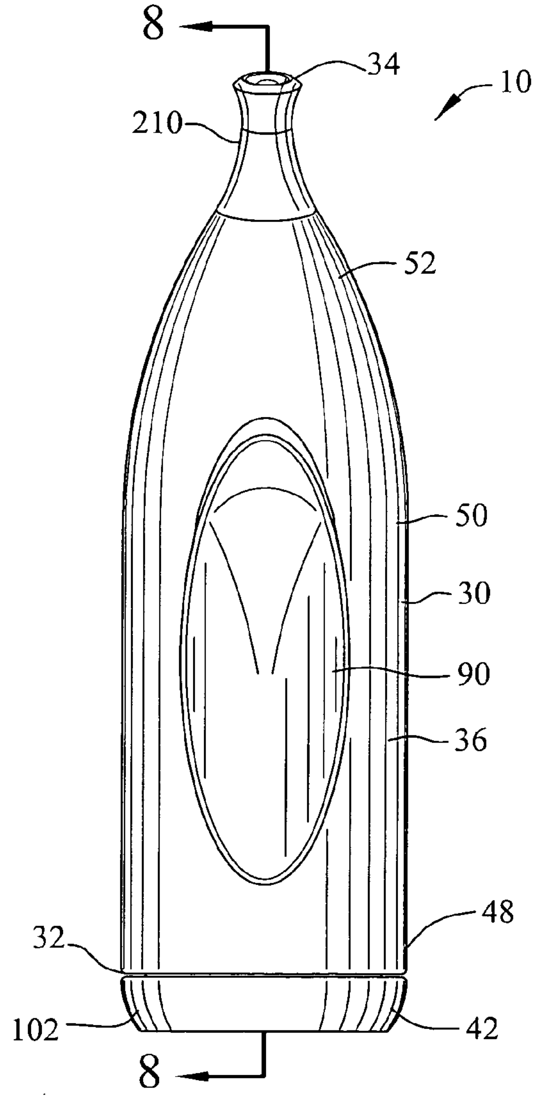
FIG. 3 is a front view of FIG. 1.
Figure 4:
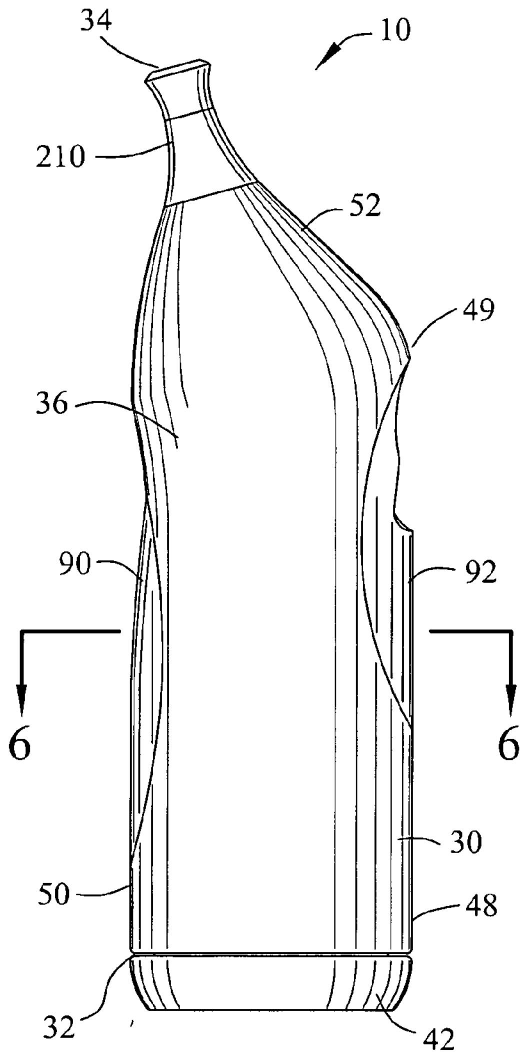
FIG. 4 is a side view of FIG. 1.
Figure 5:
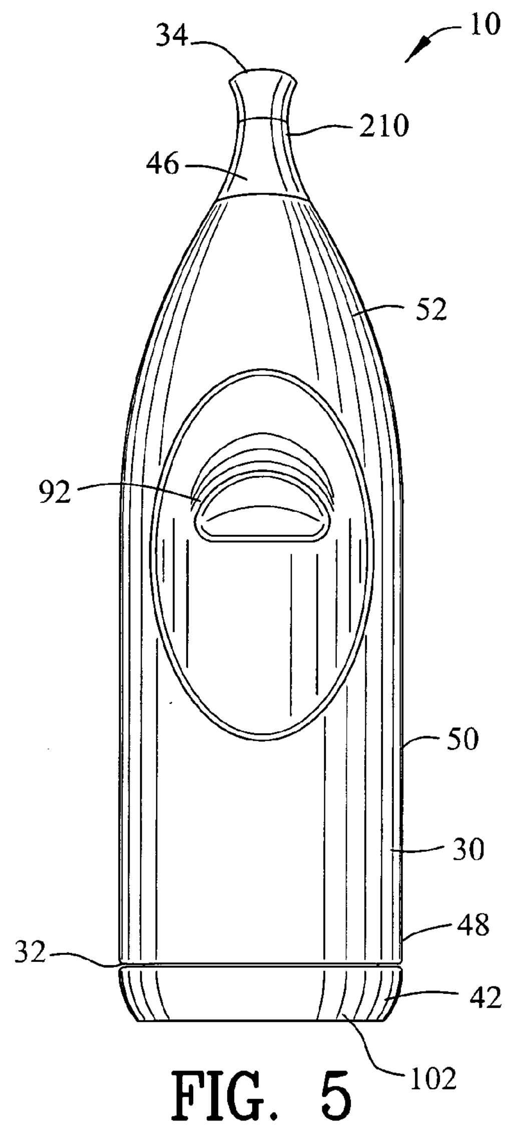
FIG. 5 is a rear view of FIG. 1.
Figure 6:
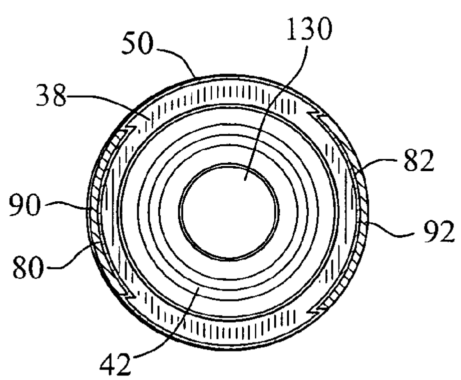
FIG. 6 is a sectional view along line 6-6 in FIG. 4.
Figure 7:
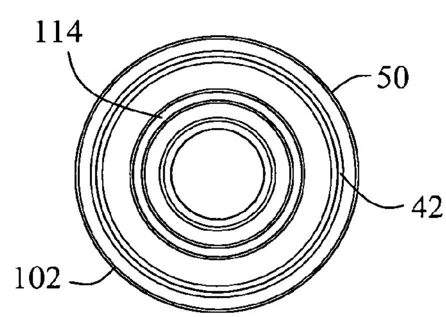
FIG. 7 is a bottom view of FIG. 1.
Figure 8:
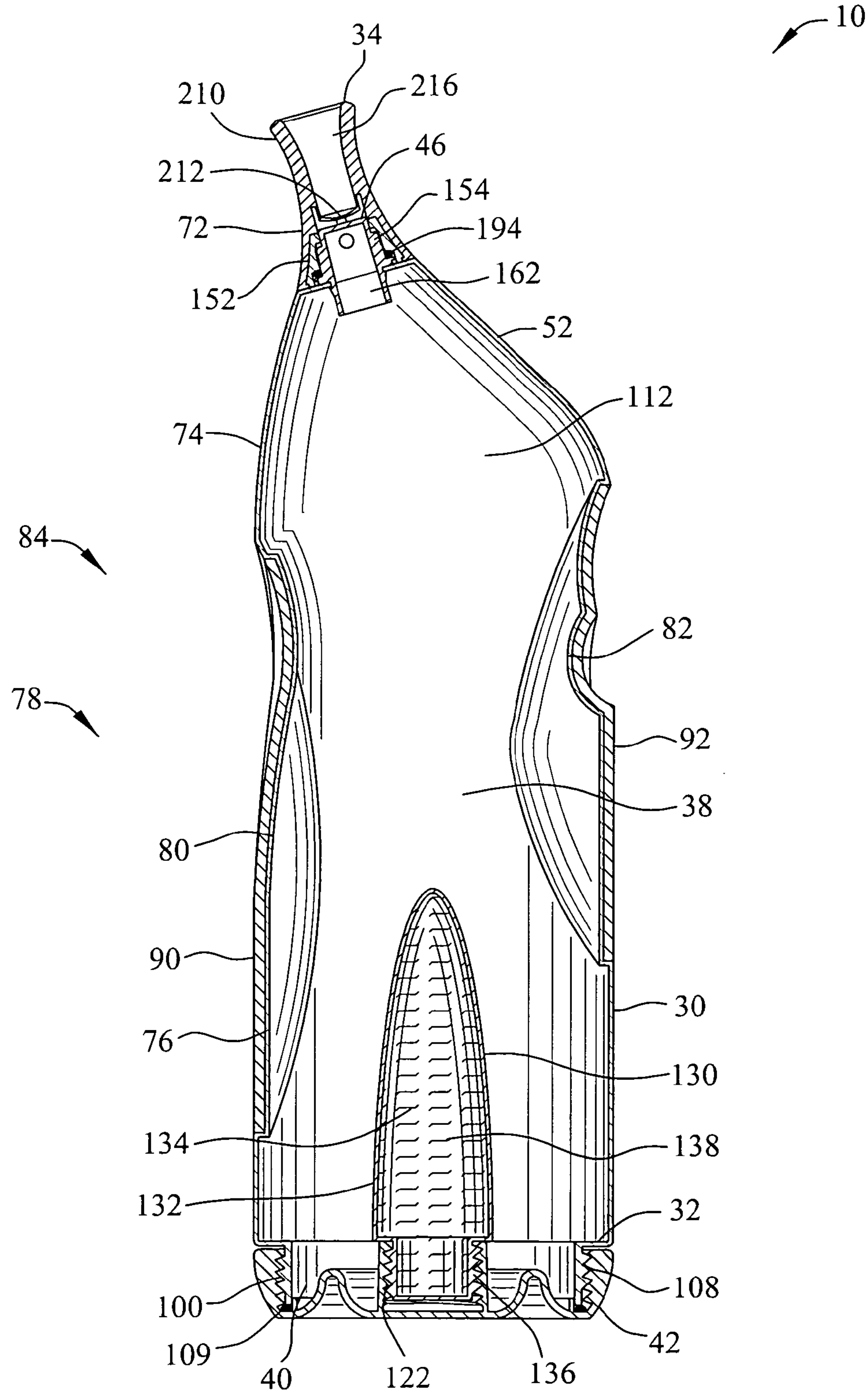
FIG. 8 is a sectional view along line 8-8 in FIG. 3.
Figure 9:
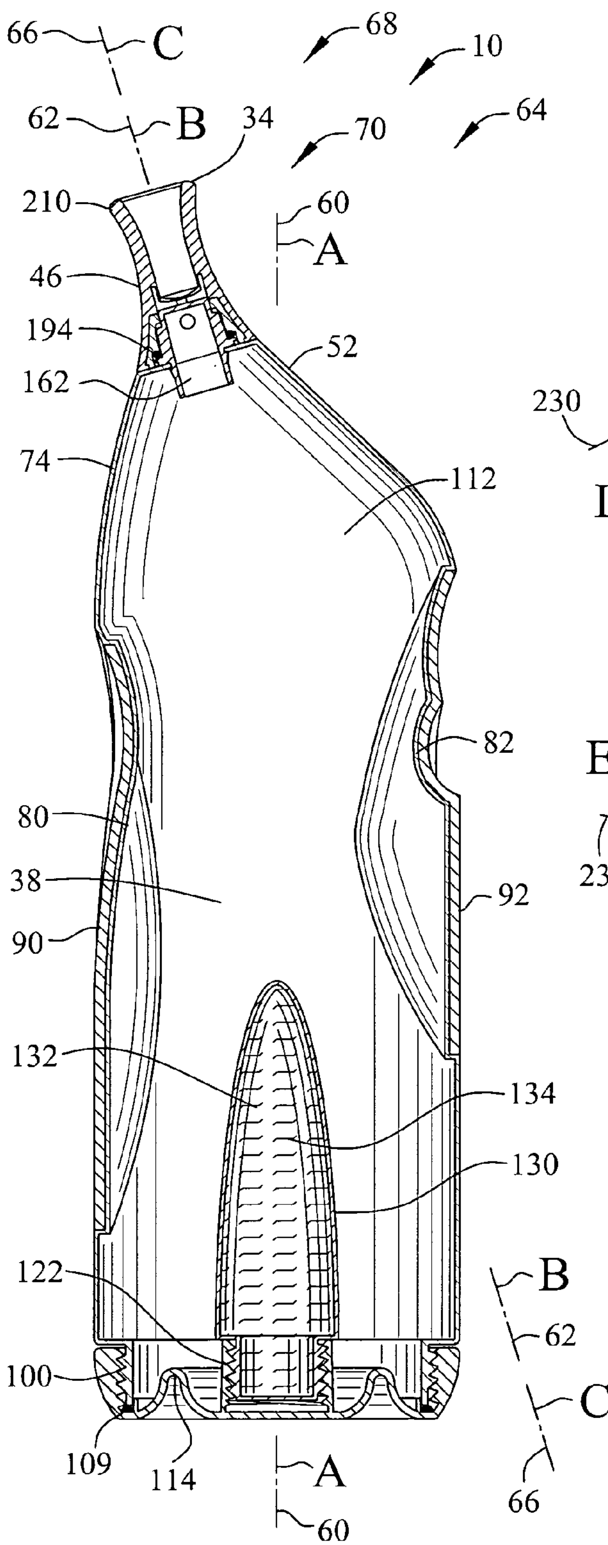
FIG. 9 is a view similar to FIG. 8 illustrating a flexible container having a general axis of symmetry (A), a valve having a general line of symmetry (B), and a generally conical body having a second general line of symmetry (C)
Figure 13:
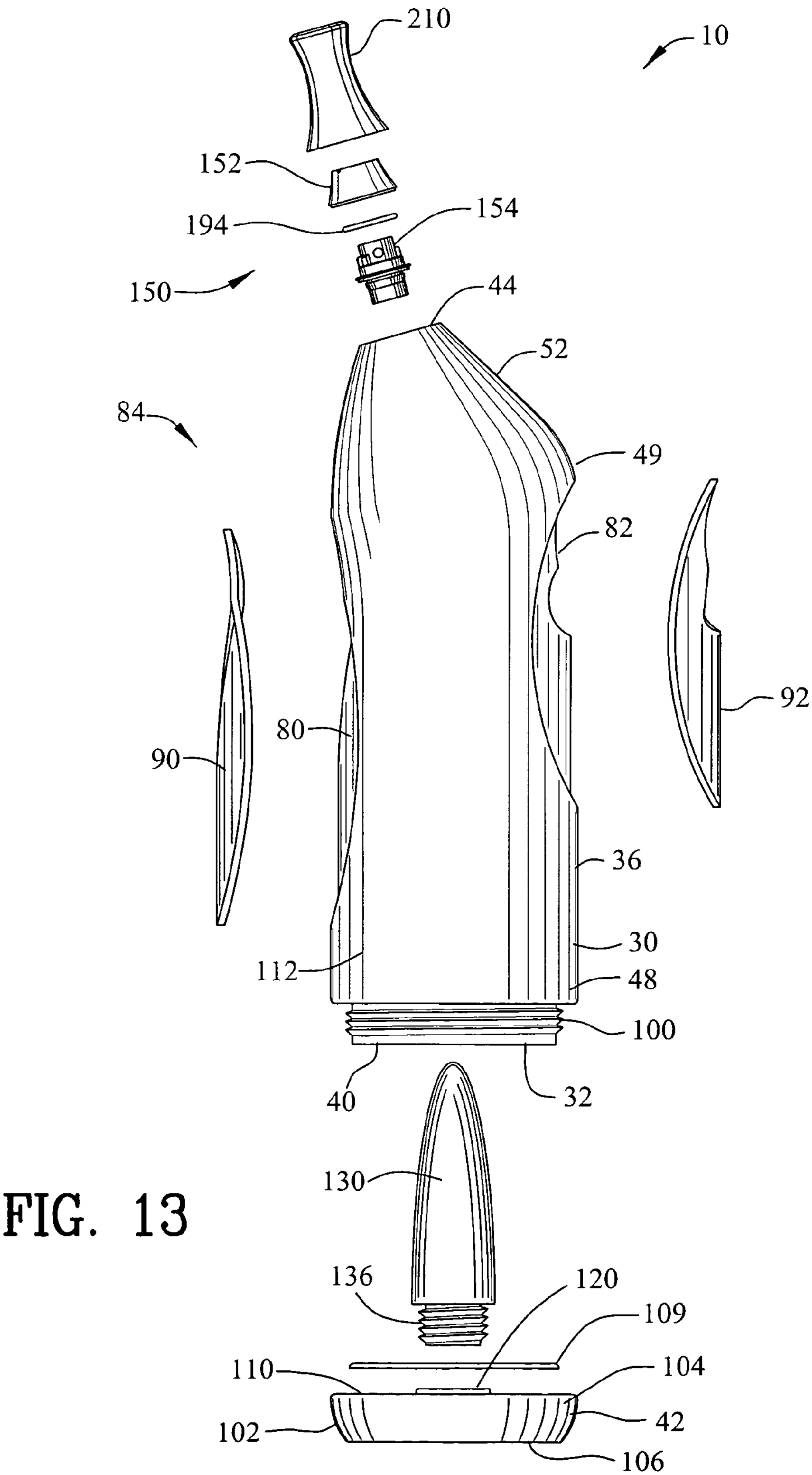
FIG. 13 is an exploded view of FIG. 4.

As best seen in FIGS. 8, 9, 13, the input orifice 40 of the deformable body 30 includes a male threading 100. The input closure 42 includes a cap 102 defining a cylindrical outer wall 104 extending from a closure wall 106. The cylindrical outer wall 104 includes a female threading 108 for threadably engaging the male threading 100 of the input orifice 40. The closure wall 106 abuts the input orifice 40 for sealing the input orifice 40. A cap o-ring 109 may be positioned between closure wall 106 and the input orifice 40 for preventing linkage of the fluid 12. Preferably, the cap 102 has a cap diameter 110 and the flexible body 30 has a body diameter 112 that are equivalent. The equivalent diameters 110 and 112 permit the cap 102 to be easily rotated relative to the flexible body 30 and to permit through cleaning of the interior chamber 38. The closure wall 106 may further include a circular groove 114 that will be discussed in more detail below.

The cap 102 may include a cylindrical inner wall 120 extending from the closure wall 106 for positioning within the interior chamber 38. The cylindrical inner wall 120 includes a second female threading 122.

A thermo core 130 has a core chamber 132 for retaining a thermo fluid 134 and a second male threading 136 for threadably engaging the second female threading 122 of the cylindrical inner wall 120. The thermo core 130 is inserted into the interior chamber 38 upon the cap 102 being threadably engaged with the male threading 100. The thermo fluid 134 may include an alcohol and water gel 138 or other substance that may be inserted within the thermo core 130. The thermo core 130 is capable of being threadably removed from the cap 102 and placed within a cold environment for reducing the temperature of the thermo fluid 134. Thereafter, the thermo core 130 be threadably engaged within the cap 102 for retaining the fluid 12 within the fluid container 10 cold.

Figure 14:
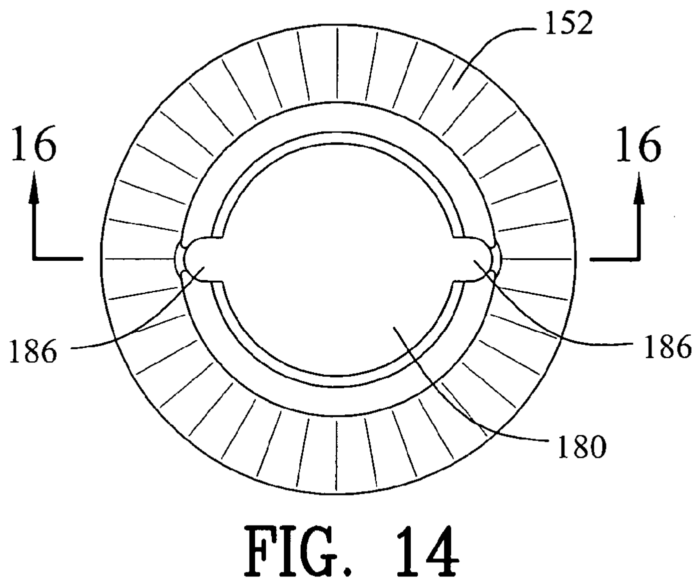
FIG. 14 is a top view of a valve body.
Figure 15:
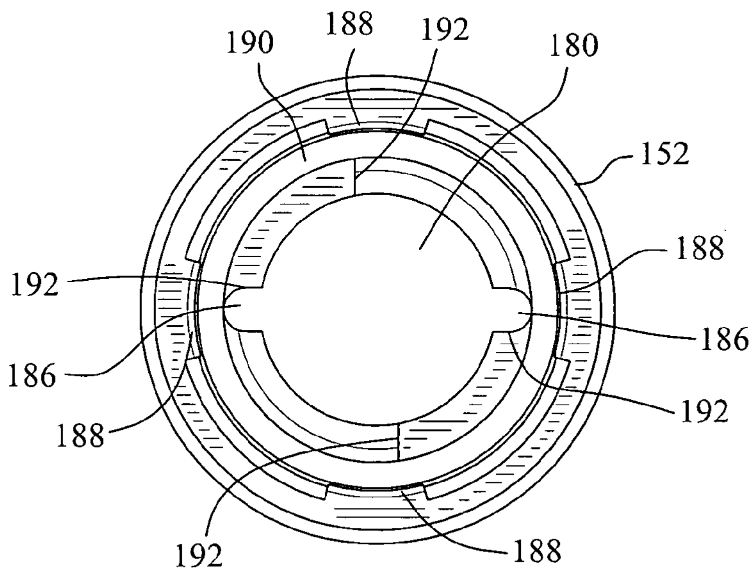
FIG. 15 is a bottom view of FIG. 14.
Figure 16:
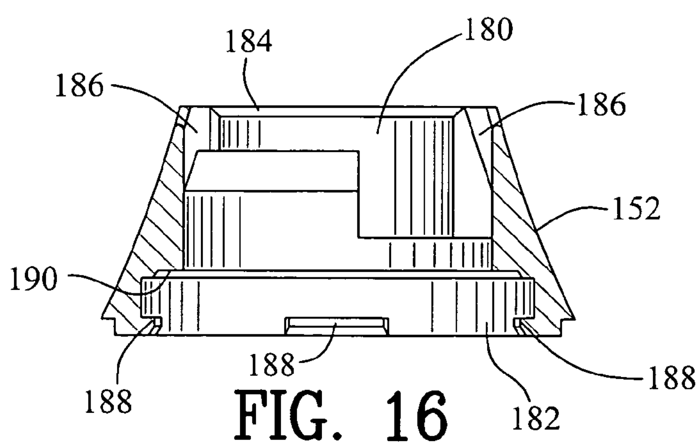
FIG. 16 is a sectional view along line 14-14 in FIG. 14.
Figure 17:
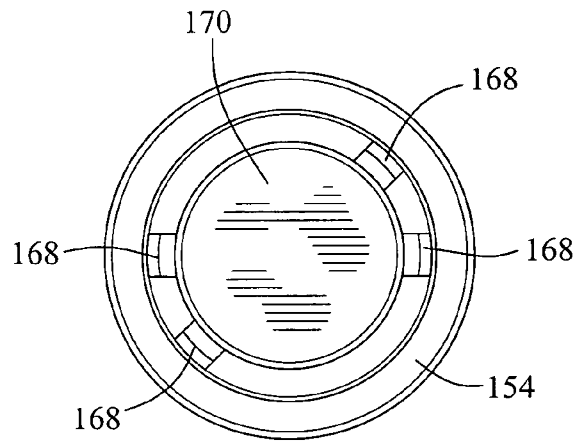
FIG. 17 is a top view of a cylindrical valve plug.
Figure 18:
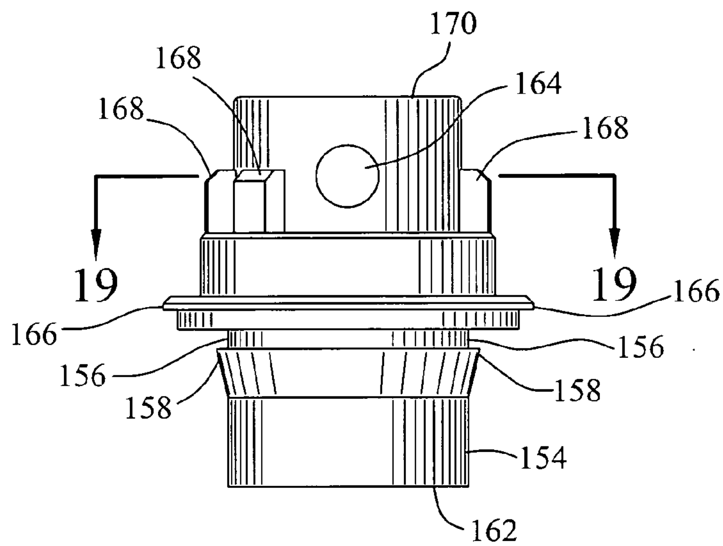
FIG. 18 is a side view of FIG. 17.
Figure 19:
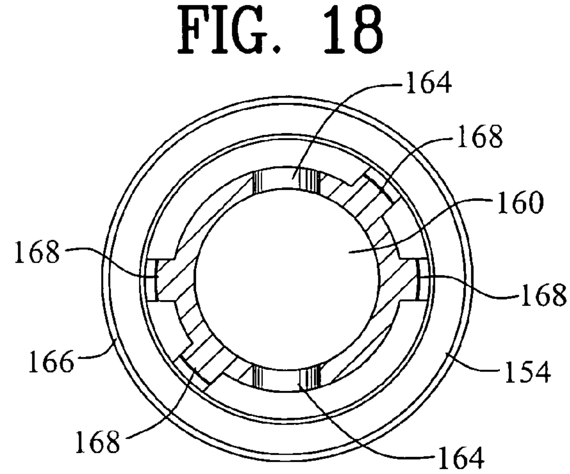
FIG. 19 is a sectional view along line 19-19 in FIG. 18.
Figure 20:
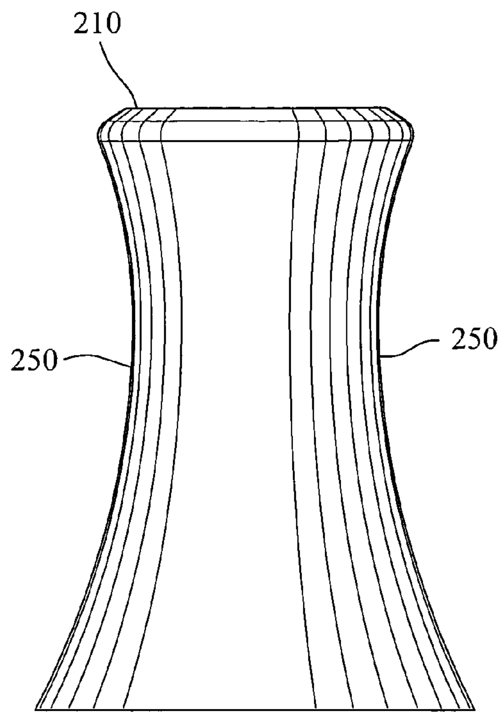
FIG. 20 is a side view of a flexible stem.
Figure 22:
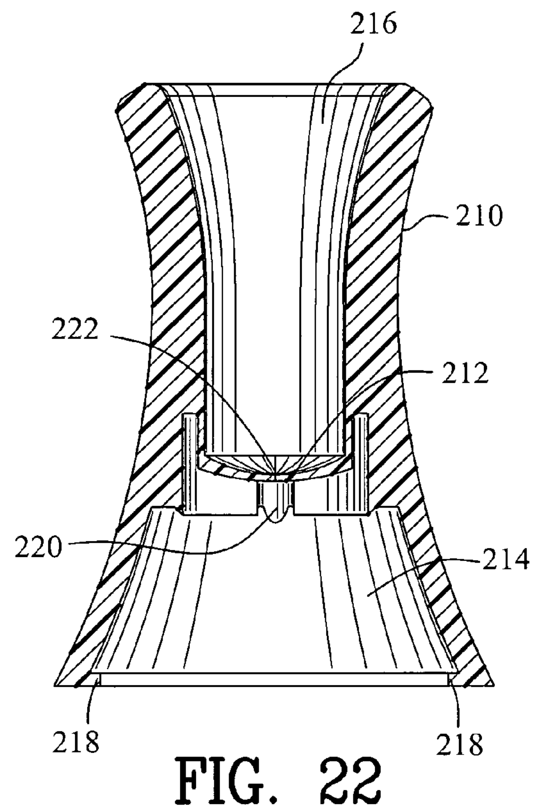
FIG. 22 is a sectional view along line 22-22 in FIG. 21.
Figure 21:
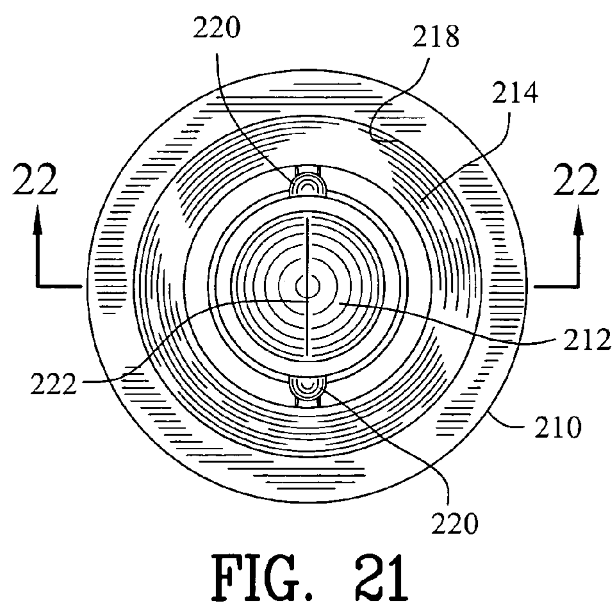
FIG. 21 is a bottom view of FIG. 20.
Figure 27:
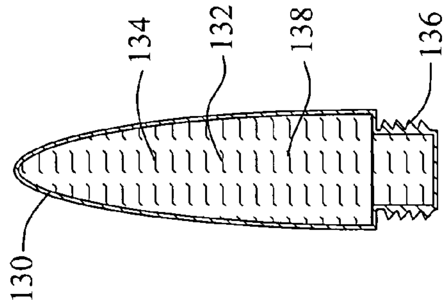
FIG. 27 is a sectional view along line 27-27 in FIG. 25.
Figure 25:
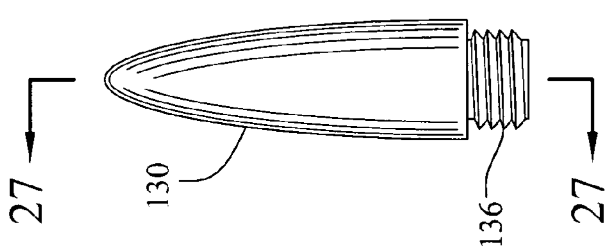
FIG. 25 is a side view of a thermo core.
Figure 26:
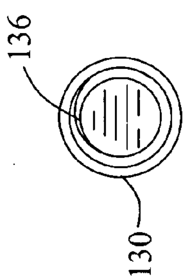
FIG. 26 is a bottom view of FIG. 25.
Figure 23:
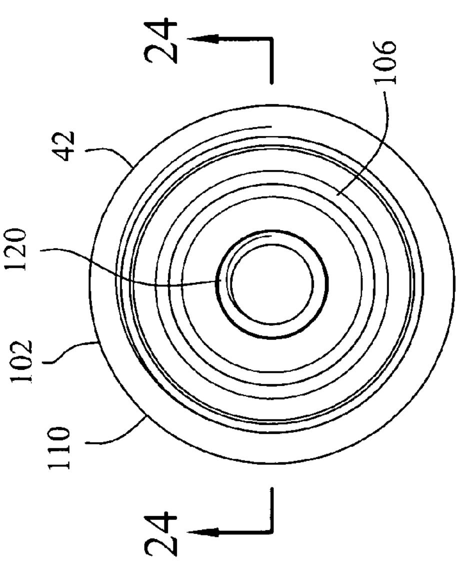
FIG. 23 is a view similar to FIG. 7 illustrating a bottom view of a cap.
Figure 24:
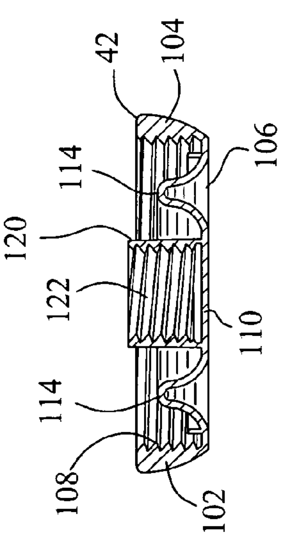
FIG. 24 is a sectional view along line 24-24 in FIG. 23.
Figure 29:
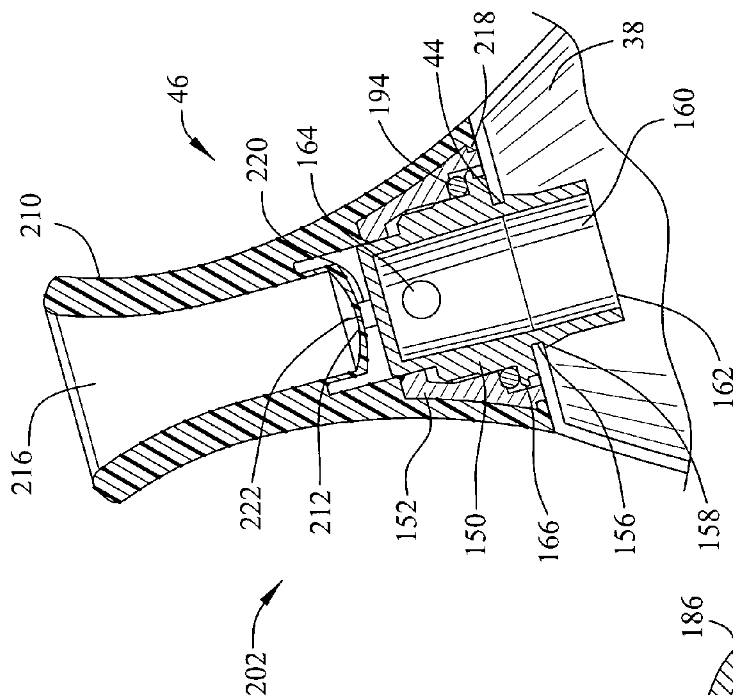
FIG. 29 is an enlarged portion of FIG. 8 illustrating a port plug valve in a closed position.
Figure 30:
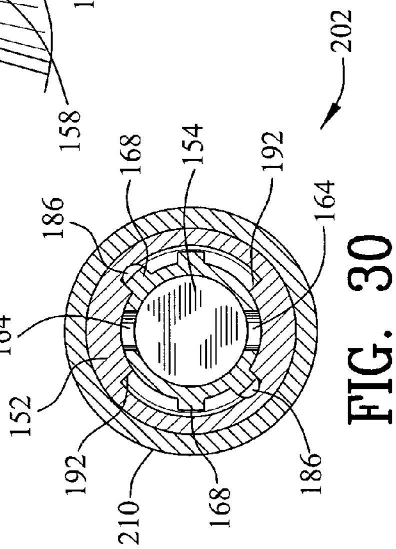
FIG. 30 is a sectional view along line 30-30 in FIG. 28.
Figure 28:
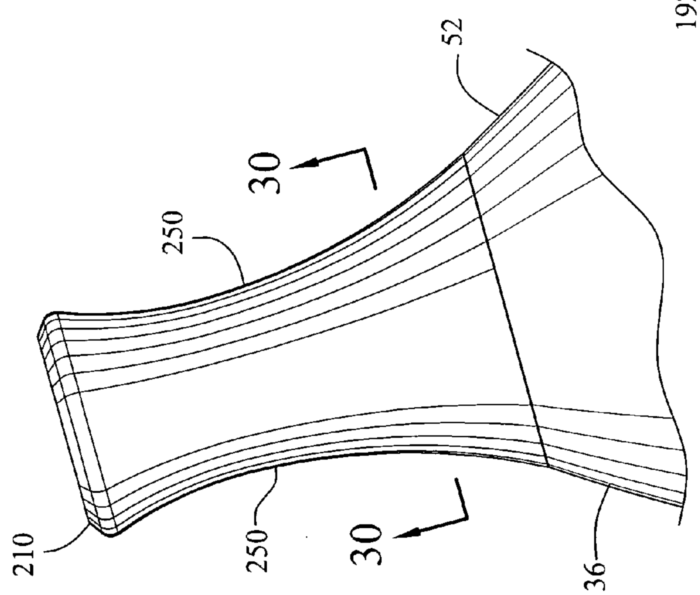
FIG. 28 is an enlarged portion of FIG. 4.
Figure 32:
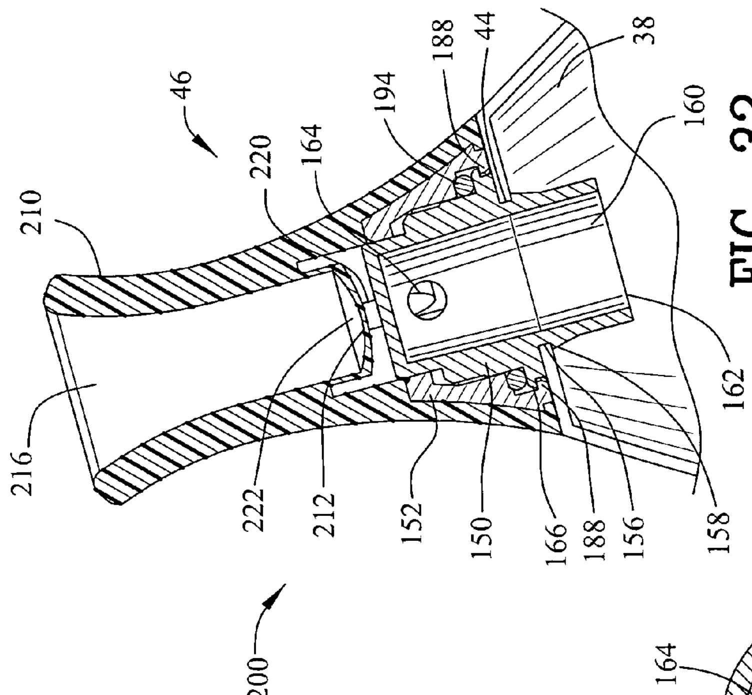
FIG. 32 is a view similar to FIG. 29 illustrating the port plug valve in an open position.
Figure 33:
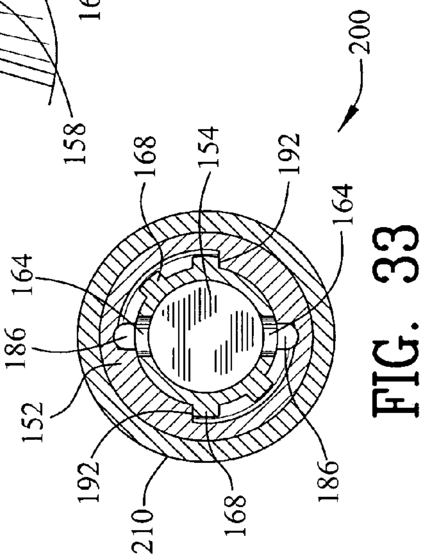
FIG. 33 is a sectional view along line 33-33 in FIG. 31.

As best seen in FIGS. 9-19, 30-32 and 36-39 the valve 46 may include a port plug valve 150. The port plug valve has a valve body 152 shown in FIG. 14-16 rotatably engaging within a cylindrical valve plug 154 shown in FIG. 13-15. The cylindrical valve plug 154 is inserted into the output orifice 44. The cylindrical valve plug 154 includes a plug groove 156 for receiving the output orifice 44. A plug step 158 in positioned past the output orifice 44 for preventing the cylindrical valve plug 154 from withdrawing from the output end 34. The cylindrical valve plug 154 has a plug chamber 160 interposed between a plug input 162 and a one or more plug passage(s) 164 traversing the cylindrical valve plug 154. The cylindrical valve plug 154 further includes a plug shoulder 166, a plurality of plug stops 168 and a plug cover 170.

The valve body 152 has an interior valve bore 180 traversing from an input aperture 182 and an output aperture 184. The valve body 152 includes one or more valve passage(s) 186 within the interior valve bore 180. The valve body 152 further includes a stem lip 188, a valve body shoulder 190, and a plurality of valve body stops 192.

The interior valve bore 180 of the valve body 152 is positioned around the cylindrical valve plug 154. The valve body shoulder 190 of the valve body 152 is impressed over the plug shoulder 166 of the cylindrical valve plug 154 for locking the valve body 152 to the cylindrical valve plug 154. A valve O-ring 194 may be positioned between the plug shoulder 166 and the valve body 152.

As seen in FIGS. 32, 33, 38 and 39, the valve body 152 rotates upon the cylindrical valve plug 154 for aligning the one or more plug passage 164 with the one or more valve passage 186 to permit the fluid 12 through the plug chamber 160 to one or more plug passages 164, to one or more valve passage 186 of the port plug valve 150 defining an open valve 200. As seen in FIGS. 29, 30, 36 and 37, the valve body 152 rotates upon the cylindrical valve plug 154 for separating the one or more plug passage 164 with the one or more valve passage 186 to terminate the fluid 12 through the port plug valve 150 defining a closed valve 202. A first plug stop 168 contacts with a first valve body stop 192 for terminating rotation of the valve body 152 relative to the cylindrical valve plug 154 in the open position 200. A second plug stop 168 contacts with a second valve body stop 192 for terminating rotation of the valve body 152 relative to the cylindrical valve plug 154 in the closed position 202.

As shown in FIGS. 9-13 and 20-22, the valve 46 may further include a flexible stem 210. The flexible stem 210 has a sphincter valve 212 interposed between a valve body cavity 214 and a discharge cavity 216. The flexible stem 210 further includes a lower stem lip 218. The flexible stem 210 is secured to the valve body 152 by having the valve body cavity 214 engaging over the valve body 214. The lower stem lip 218 is inserted into the valve body shoulder 190 for locking the flexible stem 210 to the valve body 152. The valve body cavity 214 includes one or more stem passage(s) 220 within the valve body cavity 214. The one or more stem passage(s) 220 are aligned with the one or more valve passage(s) 186 to permit the fluid 12 to traverse from the port plug valve 150 to the valve body cavity 214.

The sphincter valve 212 normally maintains a constriction 222 as shown in FIGS. 8, 9, 22, 29, 36 and 37 to the fluid 12 being discharged from the flexible stem 210 absent pressurization of the fluid 12 within the deformable body 30. As such, even if the valve body 152 relative to the cylindrical valve plug 154 is the closed position 202, the sphincter valve 212 will resist discharging the any fluid 12 from the flexible stem 210. A compressive force 224 as shown in FIGS. 10-12, 38 and 39, is applied to the deformable body 30 for pressurizing the fluid 212 and to overcome the constriction 222 of the sphincter valve 212 to permit discharge of the fluid 12 from the flexible stem 210.

Figure 10:
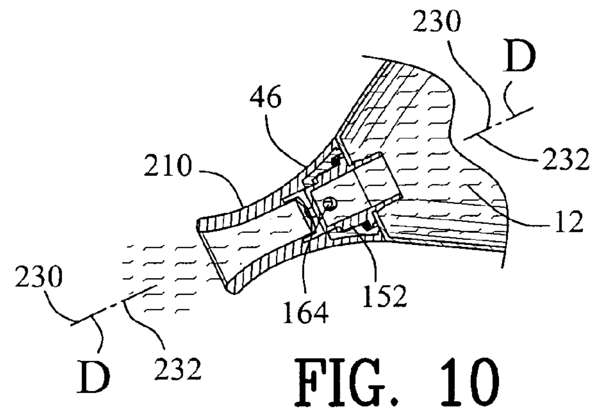
FIG. 10 is an enlarged portion of FIG. 8 illustrating a fluid exiting the fluid container and a flexible stem having a first general vector of symmetry (D)
Figure 11:
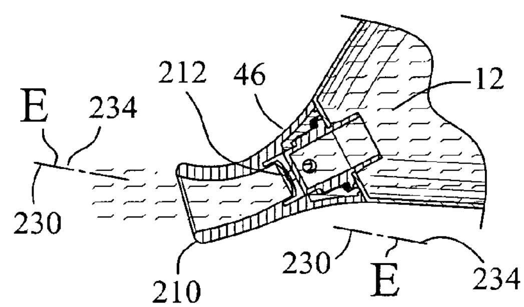
FIG. 11 is a view similar to FIG. 10 illustrating the flexible stem having a second general vector of symmetry (E)
Figure 12:
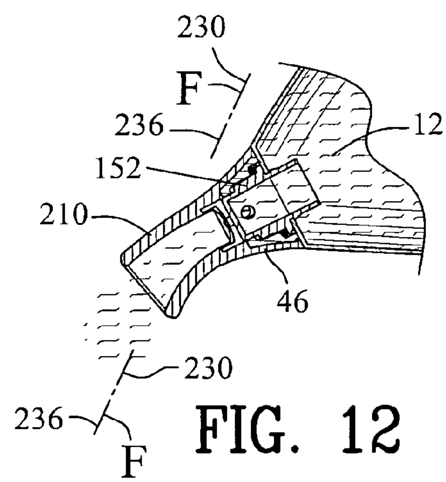
FIG. 12 is a view similar to FIG. 10 illustrating the flexible stem having a third general vector of symmetry (F)
Figure 36:
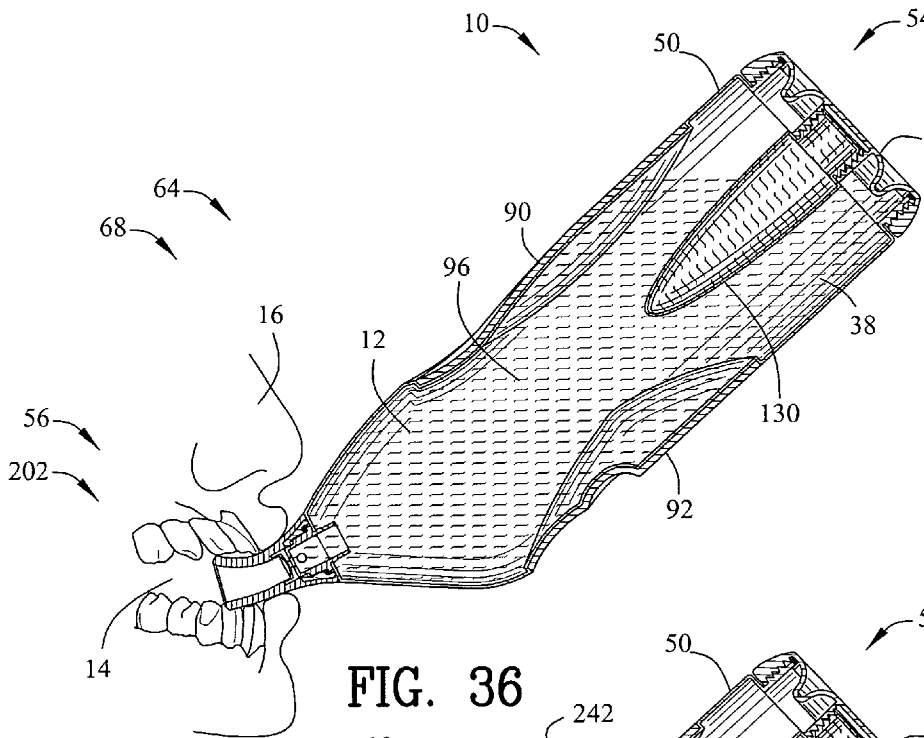
FIG. 36 is a view similar to FIG. 8 illustrating the mount of the individual compressing and bending the flexible stem into the second general vector of symmetry (E) wherein the container is in a general vertical position and a mouth of the individual is in a general horizontal position for permitting the individual's head to remain horizontal while receiving fluid from the container.
Figure 37:
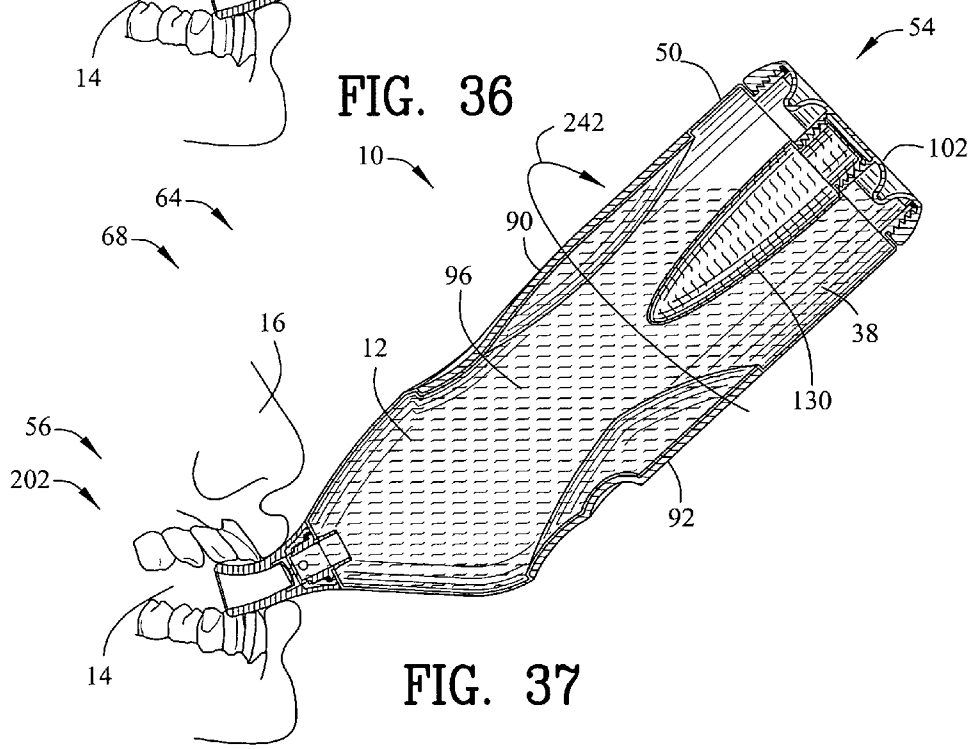
FIG. 37 is a view similar to FIG. 36 illustrating a rotation force applied to the container for rotating the port plug valve.

As seen in FIGS. 10-12, the flexible stem 210 may be bent in a plurality of directions for defining multiple general lines of symmetry 230 including a first stem line of symmetry 232 shown in FIG. 10 labeled "D", a second stem line of symmetry 234 shown in FIG. 11 labeled "E" and a third stem line of symmetry 236 shown in FIG. 12 labeled "F". The flexible stem 210 alters the angular discharge "D", "E" and "F" and numerous other angles of the fluid 12 relative to the deformable body 30. More specifically, as shown in FIGS. 36-38, the flexible stem 210 facilitates directing the fluid 12 from the port plug valve 150 to the mouth 14 of the individual 16 upon the deformable body 30 positioned in a generally vertical position 54 and the mouth 14 of the individual 16 in a generally horizontal position 56 during engaging between the mouth 14 and the valve 46.

Figure 31:
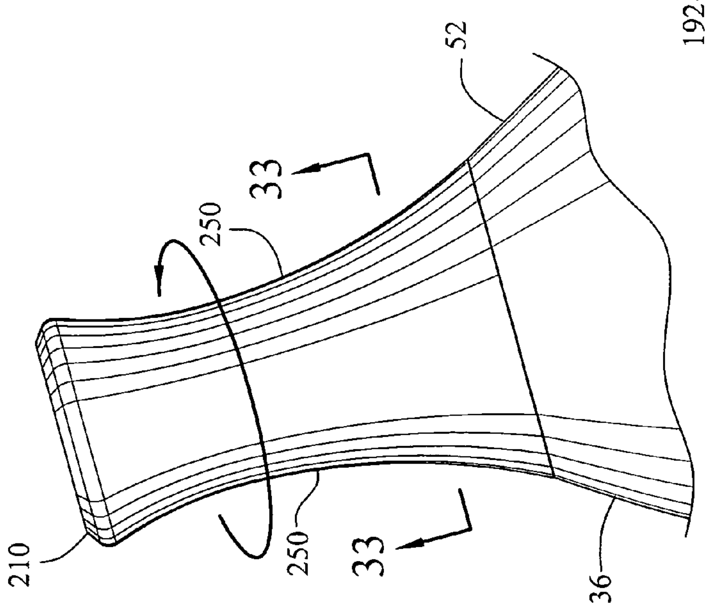
FIG. 31 is a view similar to FIG. 28 illustrating a rotational force applied to the flexible stem for rotating the port plug valve.
Figure 34:
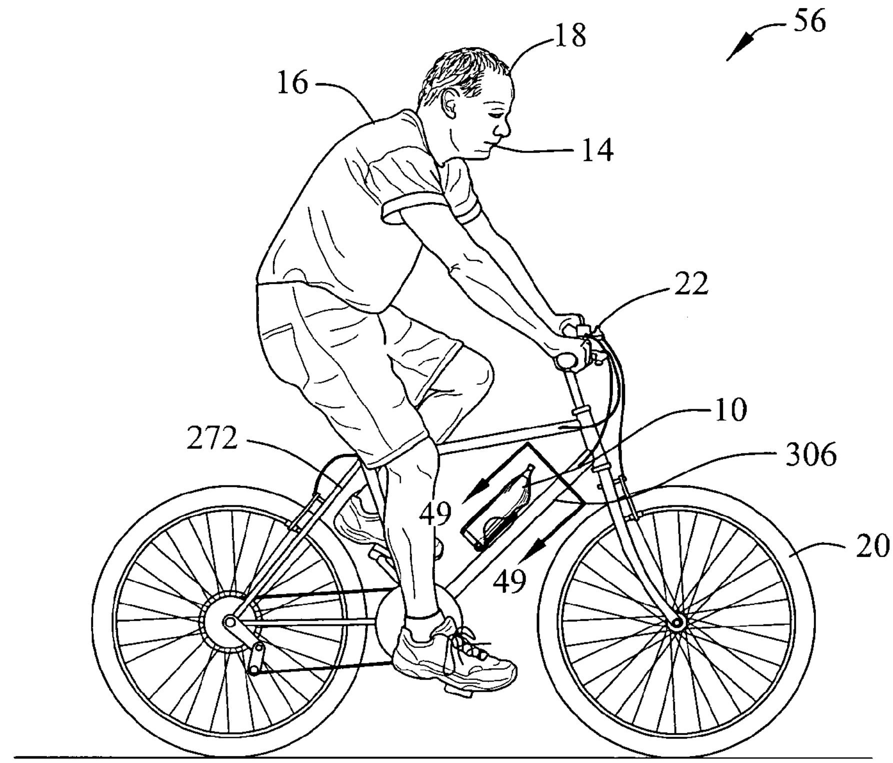
FIG. 34 illustrates the container inserted into a cage located on a bicycle.
Figure 35:
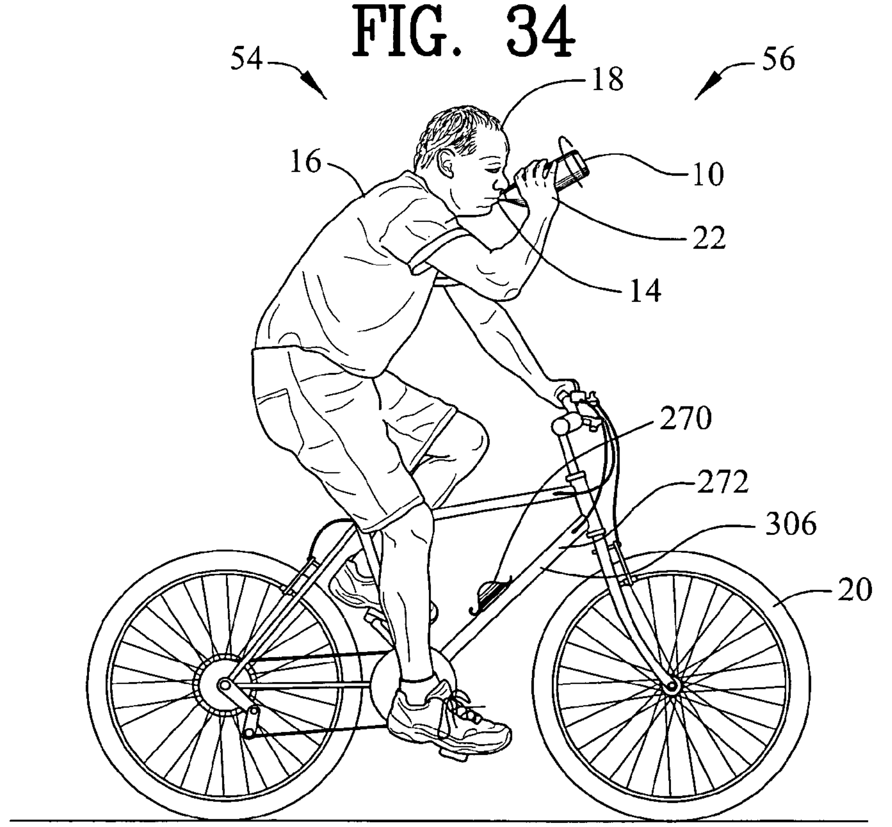
FIG. 35 is a view similar to FIG. 34 illustrating the container removed from the cage and the container is in a general vertical position and a mouth of the individual is in a general horizontal position for permitting the individual's head to remain horizontal while receiving fluid from the container.

The flexible stem 210 may be constructed from silicon or other flexible materials. Preferably, the flexible stem 210 is over-molded to the valve body 152 for further securing the flexible stem 210 to the valve body 152. As such, as seen in FIG. 31 if the hand 22 of the individual 16 grasps the flexible stem 210 and applies a stem rotational force 240, the flexible stem 210 causes the valve body 152 to rotate. In addition, as seen in FIGS. 36-38, if the individual 16 utilizes the mouth 14 to compress against the flexible stem 210 and the hand 22 of the individual 16 grasps the deformable body 30 and applies a body rotational force 242 the flexible stem 210 causes the valve body 152 to rotate.

As best seen in FIGS. 20-21 and 36-39, the flexible stem 210 may include a circular concave structure 250 for improving engagement between the flexible stem 210 and the mouth 14 of the individual 16. In addition, the circular concave structure 250 assists in preventing the flexible stem 210 from kinking upon itself during bending in a plurality of directions for defining multiple general lines of symmetry 230.

FIGS. 34, 35, 40-53 illustrate a cage 270 incorporating the subject invention for engaging with the deformable body 30. The cage 270 may be secured to an object 272. The object may include a bicycle 20 but also may include movable and non-movable objects. The cage 270 includes a concave plate 274 extending between a first side 276, a second side 278, a bottom end 280 and a top end 282. The first side 276 and the second side 278 define a first arcuate arm 284 and a second arcuate arm 286 respectively. The bottom end 280 defines a mounting hook 288 and the top end 282 defines a stabilizing hook 290. The concave plate 274 may include a plurality of elongated grooves 292 for mounting the concave plate 274 in multiple cage height selections 294, a multiple cage vertical angles 296 and a multiple cage horizontal angles relative to the object 272. More specifically, the concave plate 274 may be secured to the object 272 by a mounting plate 300 having a top contour side 302 and a bottom contour side 304 for conforming to a bicycle frame 306. A frame fastener 308 traverses through the mounting plate 300 for securing the bottom contour side 304 to the bicycle frame 306. A plate fastener 310 traversing one of the plurality of elongated grooves 292 for coupling the cage 270 to the mounting plate 300.

Figure 50:
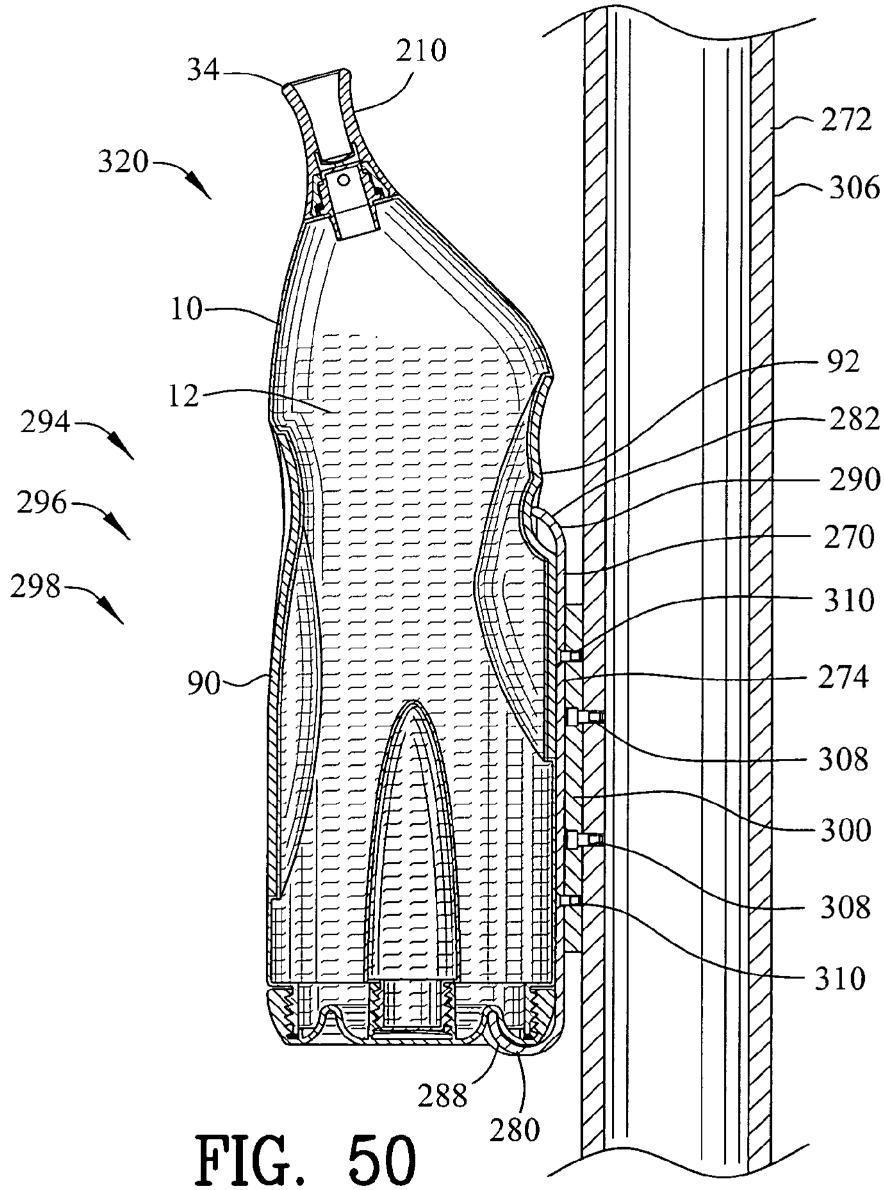
FIG. 50 is a sectional view along line 50-50 in FIG. 49.
Figure 51:
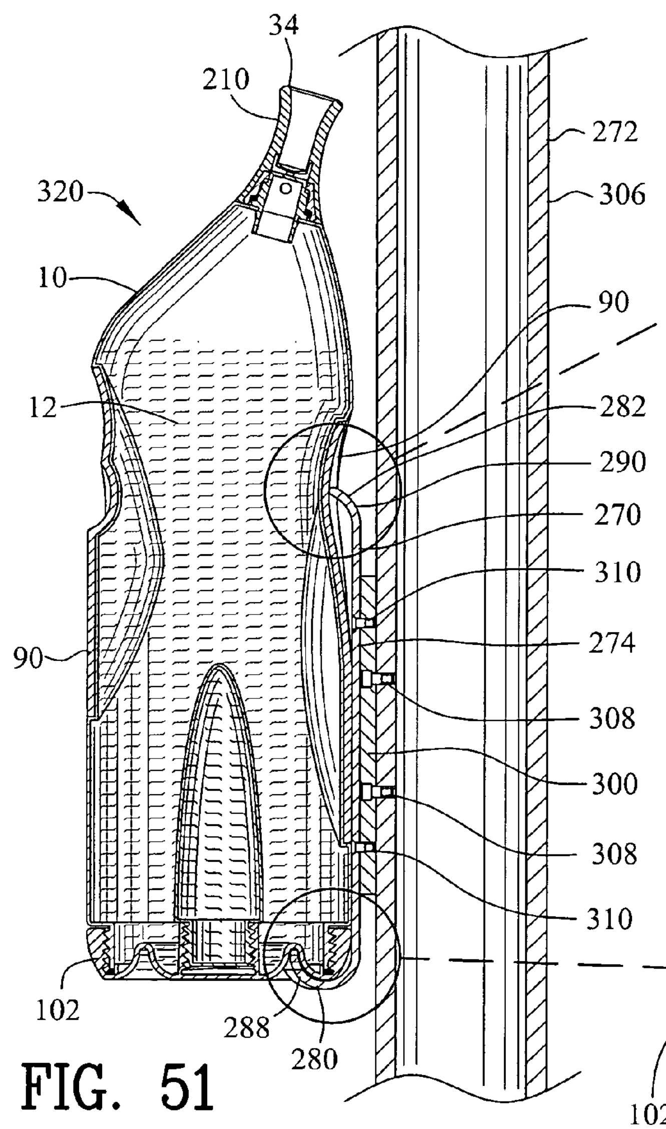
FIG. 51 is a view similar to FIG. 50 illustrating the container rotated one hundred and eighty degrees (180 degrees)
Figure 52:
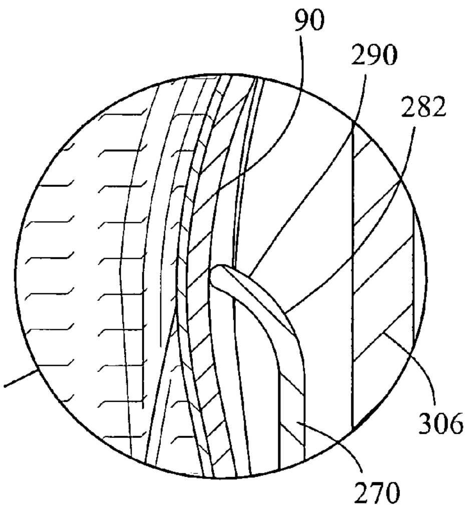
FIG. 52 is an enlarged portion of FIG. 51.
Figure 53:
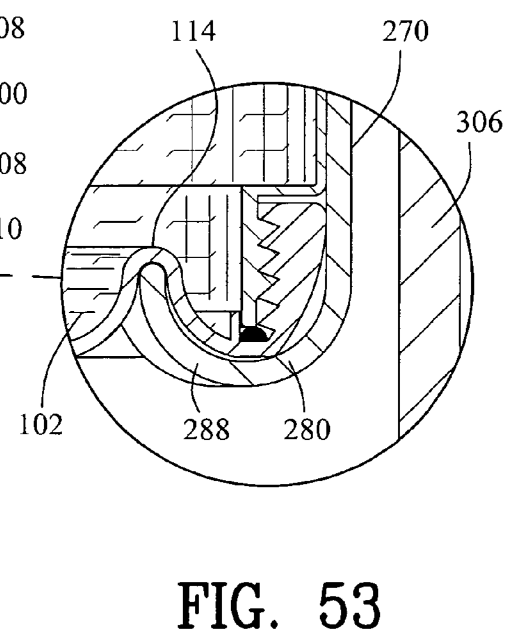
FIG. 53 is an enlarged portion of FIG. 51.
Figure 54:
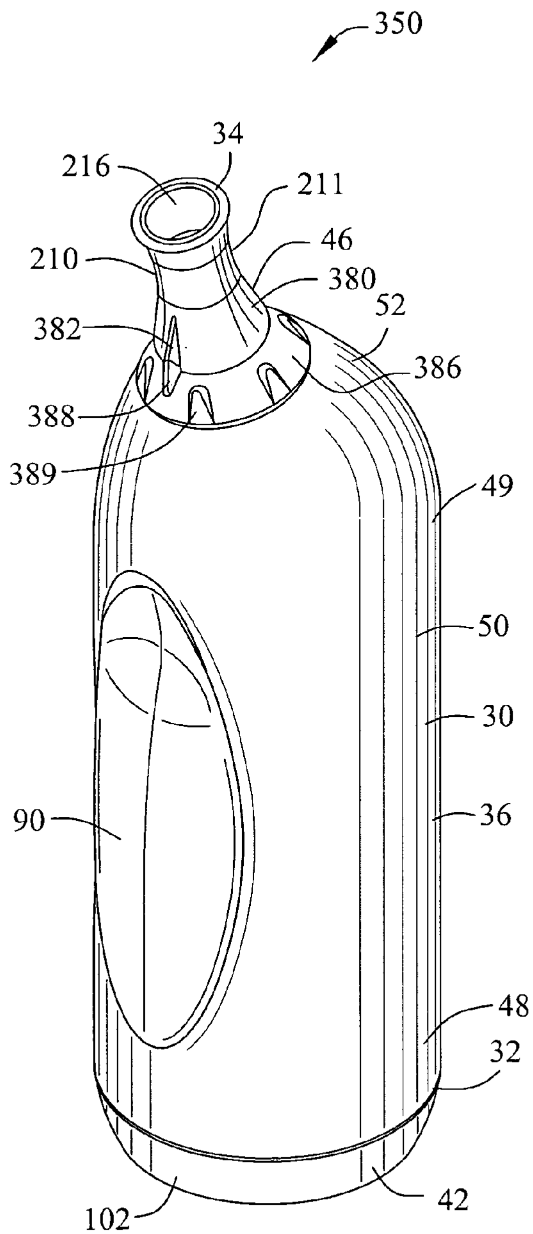
FIG. 54 is an isometric view of a second embodiment of a fluid container of the present invention.
Figure 55:
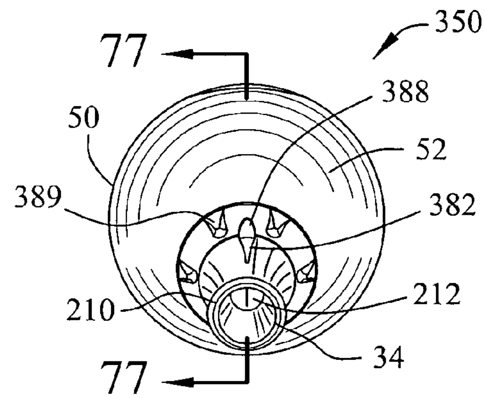
FIG. 55 is a top view of FIG. 54.
Figure 56:
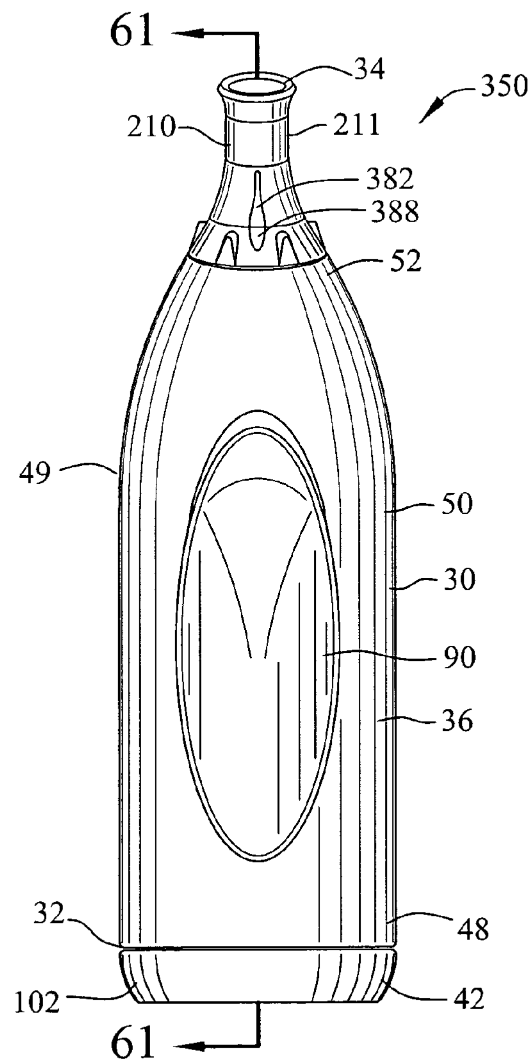
FIG. 56 is a front view of FIG. 54.
Figure 57:
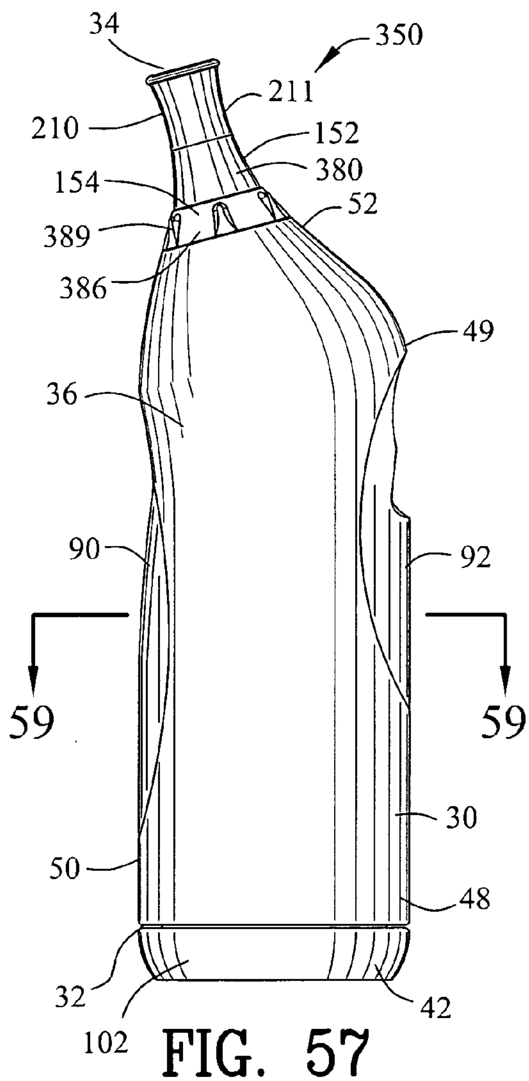
FIG. 57 is a side view of FIG. 54.
Figure 58:
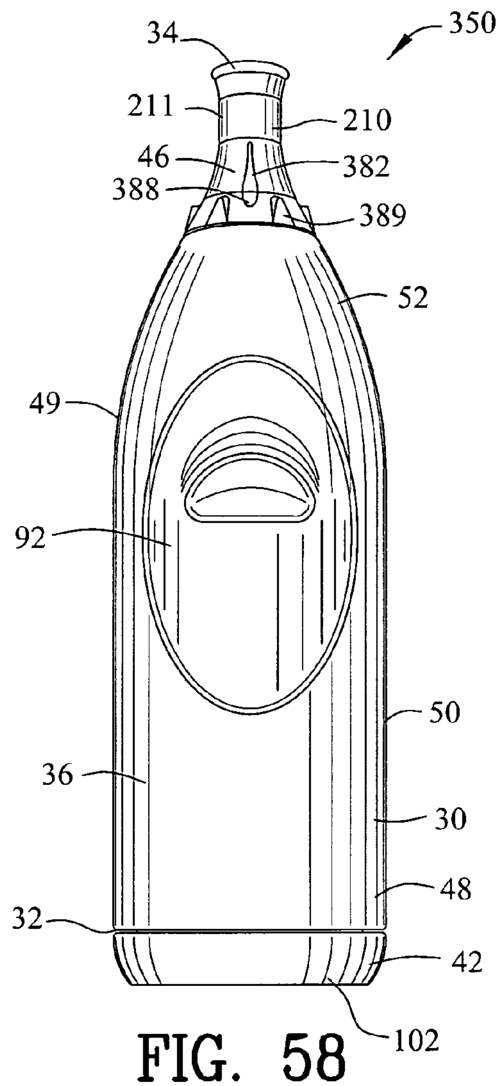
FIG. 58 is a rear view of FIG. 54.
Figure 59:
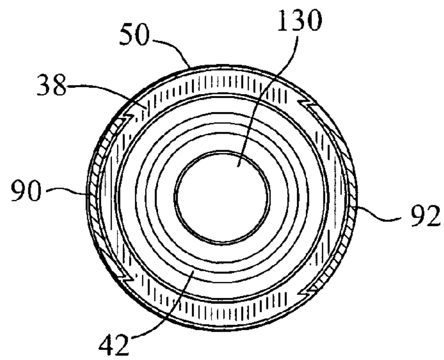
FIG. 59 is a sectional view along line 59-59 in FIG. 57.
Figure 60:
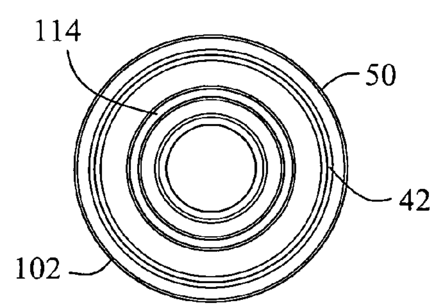
FIG. 60 is a bottom view of FIG. 54.

FIGS. 46-53, illustrate the process in which the concave plate 274 engages with the fluid container 10. An engaging force 312 is applied to the container 10 to cause the container to apply a displace force 314 to the first arcuate arm 284 and the second arcuate arm 286. Upon the container 10 fully abutting the concave plate 274, the first arcuate arm 284 and the second arcuate arm 286 retract against the deformable body 30 due to a pre-tension force 316 within the retracts first arcuate arm 284 and the second arcuate arm 286. The pre-tension force 316 applies a compressive force 318 against the container 10 for resisting removal of the container 10 from the cage 270. To further secure the container 10 to the cage 270, the mounting hook 288 engaging within the circular groove 114 as shown in FIGS. 50 and 53 and the stabilizing hook 290 is compressed into the either the first handling layer 90 or the second handling layer 92. FIGS. 51 and 51 demonstrate that the container 10 may be inserted into the cage 270 in a plurality of angled orientations 320 relative to the cage 270 and still be securely coupled.

FIGS. 54-86 illustrate a second fluid container 350 for retaining and dispensing a fluid 12 into the mouth 14 of an individual 16. The fluid container 350 comprises a deformable body 30 extending from a bottom end 48 and a top end 49 and defining an exterior surface 36 and an interior chamber 38. The bottom end 48 may include an input end 32 and the top end 49 may include an output end 34. The input end 32 has an input orifice 40 for positioning the fluid 12 within the interior chamber 38. An input closure 42 engages the input orifice 40 for sealing the input orifice 40. The output end 34 has an output orifice 44 for positioning the fluid 12 exterior to the interior chamber 38. A valve 46 engages the output orifice 44 for controlling the fluid 12 flowing through the output orifice 44. The deformable body 30 includes a generally cylindrical body portion 50 and a generally conical body portion 52. The generally conical body portion 52 couples the valve 46 to the generally cylindrical body portion 50. The generally conical body portion 52 directs the fluid 12 from the interior chamber 38 to the valve 46 upon the deformable body 30 positioned in a generally vertical position 54 and the mouth 14 of the individual 16 in a generally horizontal position 56 during engaging between the mouth 14 and the valve 46.

As best seen in FIGS. 62 and 36-38, the deformable body 30 defines a general axis of symmetry 60 labeled "A" that extends from the input end 32 to the output end 34. The valve 46 defines a general line of symmetry labeled "B". The general axis of symmetry 60 and the general line of symmetry 62 define a non-parallel orientation 64 for positioning the deformable body 30 in a generally vertical position 54 and the mouth 14 of the individual 16 in a generally horizontal position 56 during engagement between the mouth 14 and the valve 46 of the fluid container 10. Furthermore, the generally conical body portion 52 defines a second general axis of symmetry 66 labeled "C". The second general axis of symmetry 66 and the general line of symmetry 62 define a generally parallel orientation 68 for further positioning the deformable body 30 in a generally vertical position 54 and the mouth 14 of the individual 16 in a generally horizontal position 56 during engaging between the mouth 14 and the valve 46 of the fluid container 10.

Both the general line of symmetry 62 and the second general axis of symmetry 66 form an acute angle 70 with the general axis of symmetry 60. Furthermore, the overall length 72 of the valve 46 and overall length 74 of the generally conical body portion 52 are substantially less than the overall length 76 of the generally cylindrical body portion 50. The acute angle 70 and overall lengths 72, 74 and 76 provide for the generally conical body 52 and the valve 46 extending exclusively above the deformable body 30 for defining a generally elongated cylindrical container 78.

FIGS. 35-39 illustrate the individual 16 positioned upon a bicycle 20. By positioning the deformable body 30 in a generally vertical position 54 and the mouth 14 of the individual 16 in a generally horizontal position 56 during engagement between the mouth 14 and the valve 46 of the fluid container 10, the individual 16 will more easily be able to completely empty the fluid 12 from the fluid container 10. The generally vertical position 54 and generally horizontal position 56 also alleviates the individual 16 from tilting the head 22 backwards in order to consume the fluid 12. The fact that the head 22 of the individual is retained within a horizontal position provides both an improved aerodynamic positioning of the head of the individual who is riding a bicycle and permits the individual to retain a front visual view.

Figure 61:
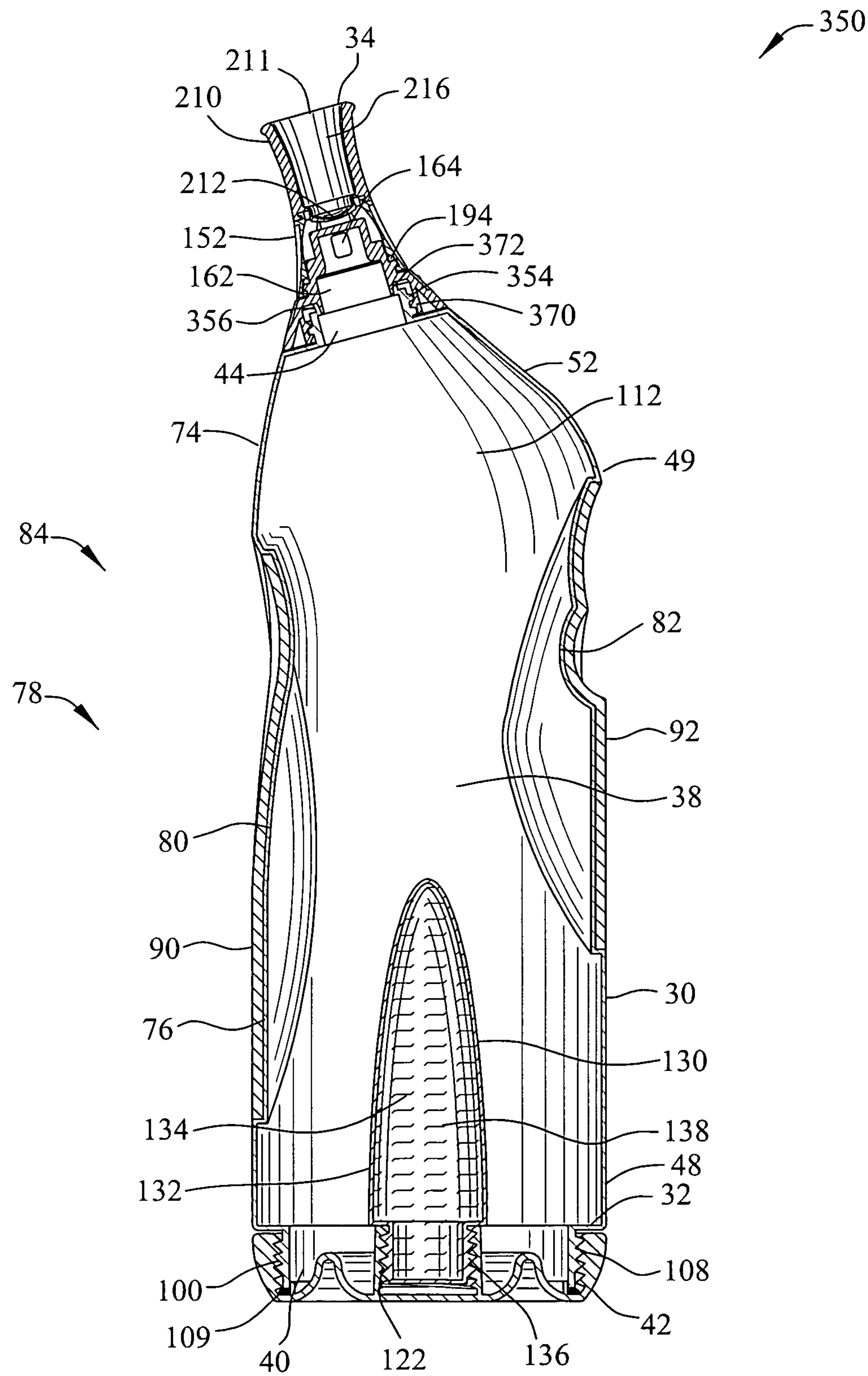
FIG. 61 is a sectional view along line 61-61 in FIG. 56.
Figure 62:
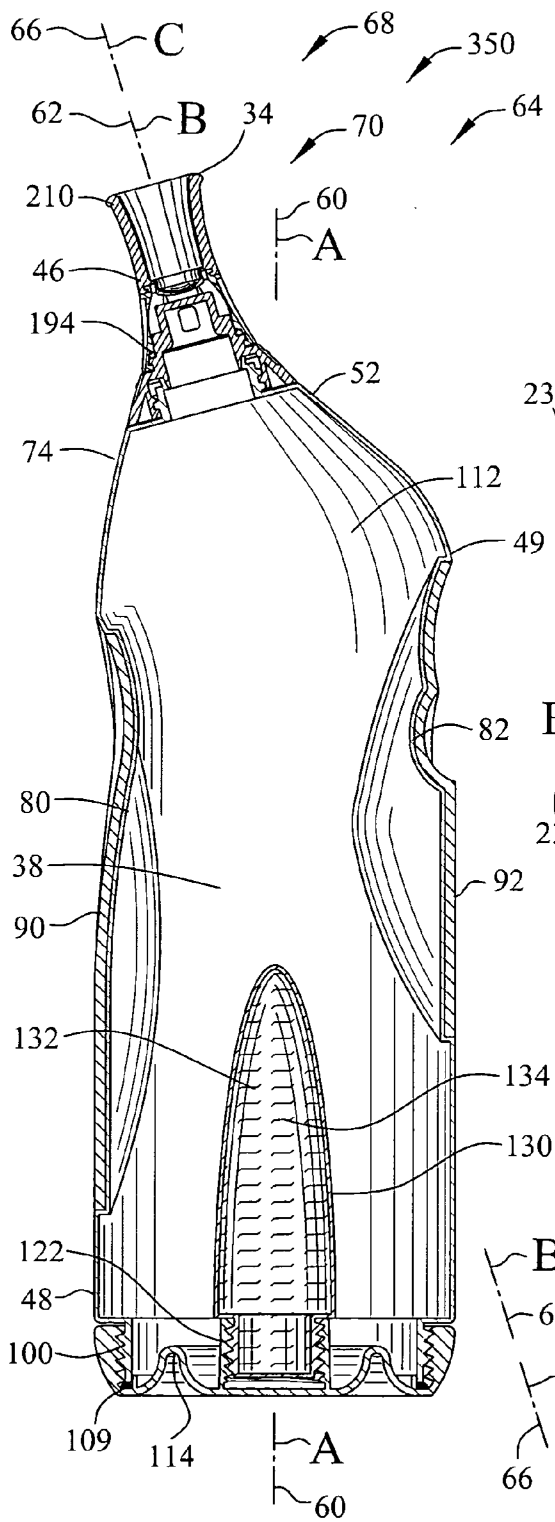
FIG. 62 is a view similar to FIG. 61 illustrating the second embodiment of the flexible container having a general axis of symmetry (A), a valve and a flexible nozzle having a general line of symmetry (B), and a generally conical body having a second general line of symmetry (C)
Figure 66:
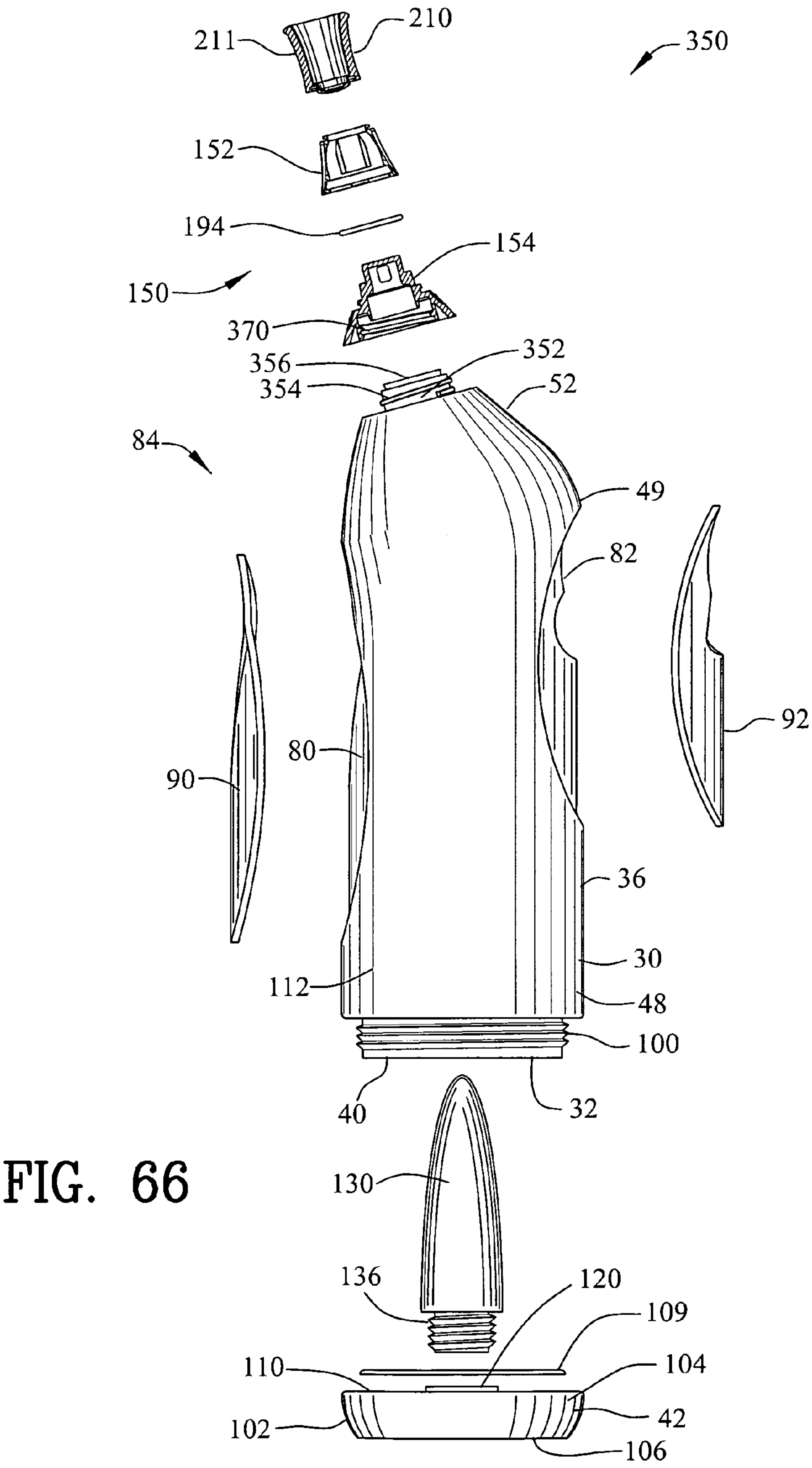
FIG. 66 is an exploded view of FIG. 57.
Figure 67:
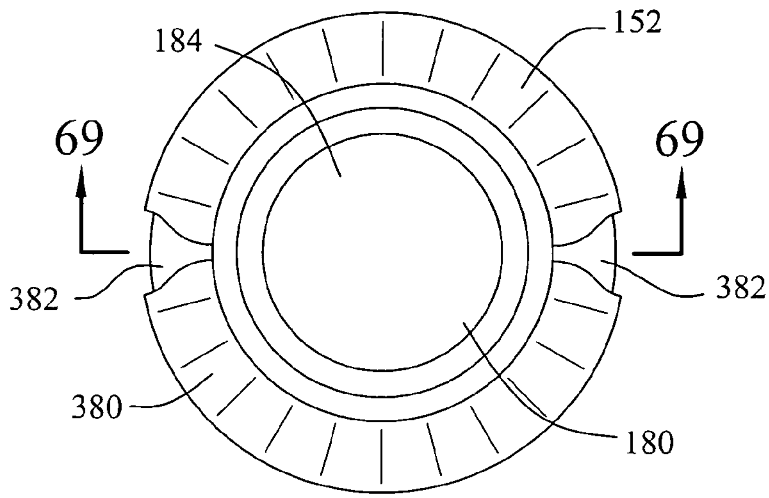
FIG. 67 is a top view of a valve body.
Figure 68:
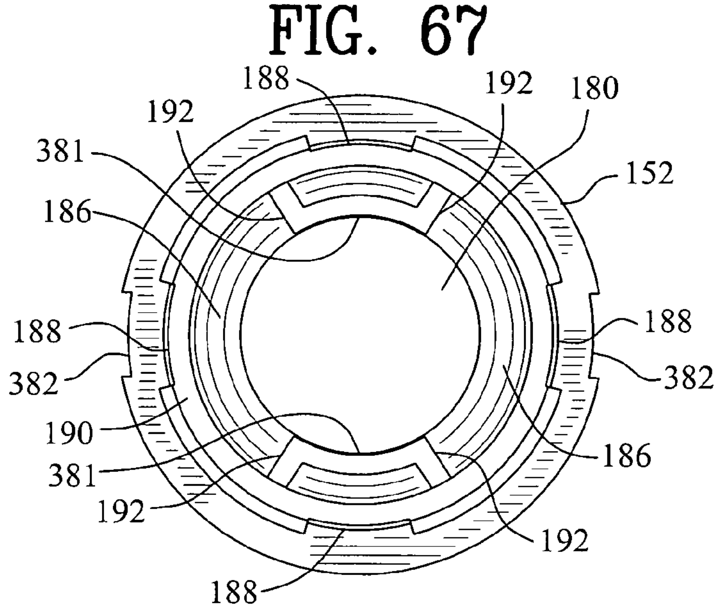
FIG. 68 is a bottom view of FIG. 67.
Figure 69:
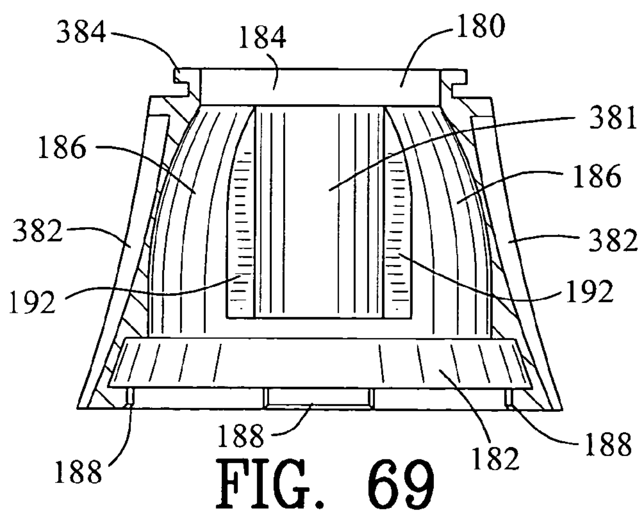
FIG. 69 is a sectional view along line 69-69 in FIG. 67.
Figure 70:
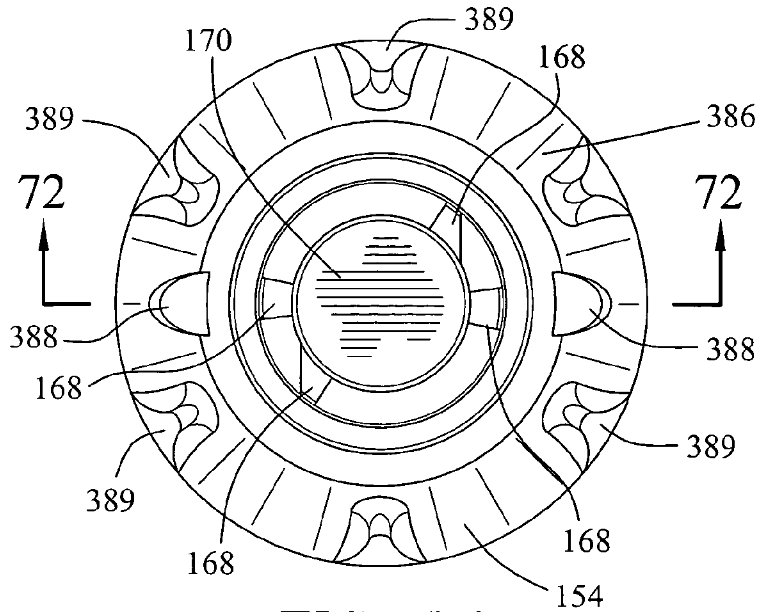
FIG. 70 is a top view of a cylindrical valve plug.
Figure 71:
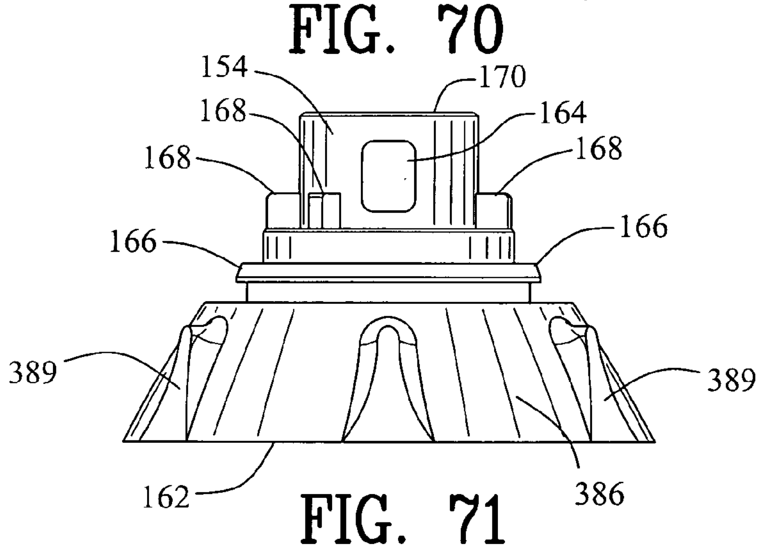
FIG. 71 is a side view of FIG. 70.
Figure 72:
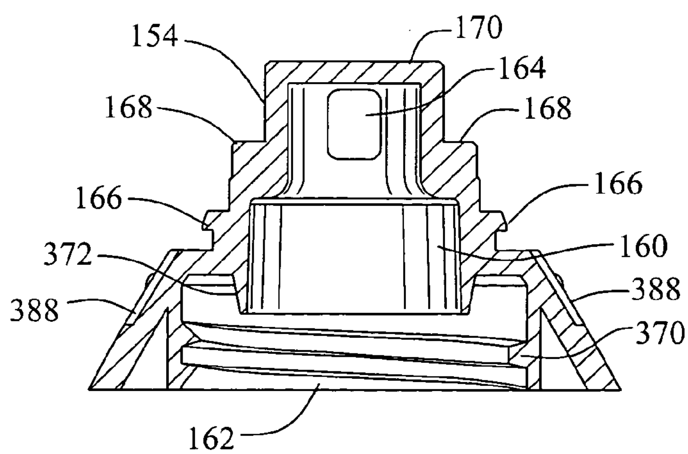
FIG. 72 is a sectional view along line 72-72 in FIG. 70.
Figure 73:
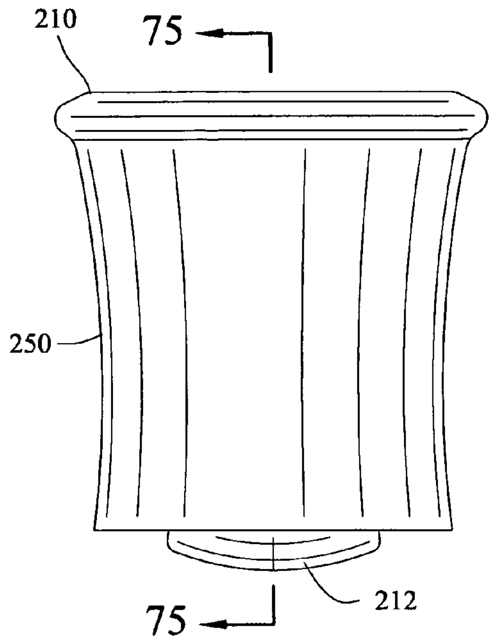
FIG. 73 is a side view of a flexible nozzle.
Figure 75:
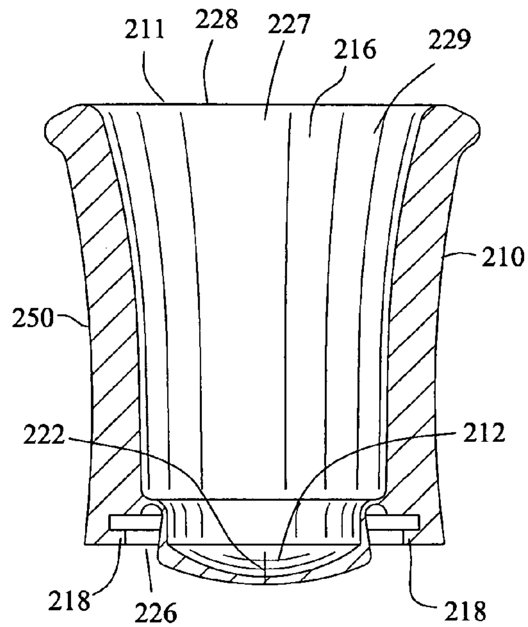
FIG. 75 is a sectional view along line 75-75 in FIG. 73.
Figure 74:
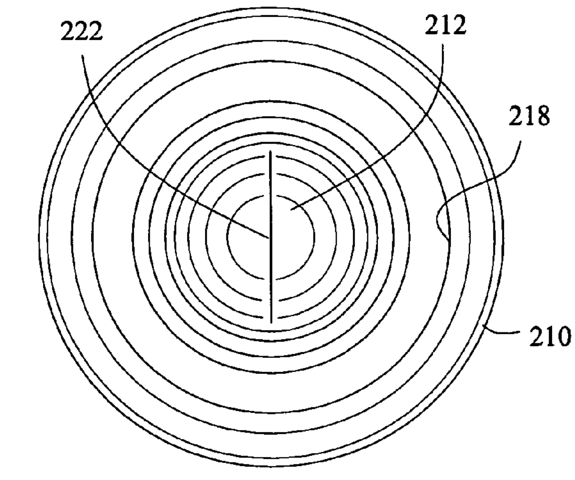
FIG. 74 is a bottom view of FIG. 73.

As seen in FIGS. 61, 62 and 66, the exterior surface 36 of the deformable body 30 may include a first contoured recess 80 and a second contoured recess 82. Preferably, the first contoured recess 80 and the second contoured recess layer 82 define an opposing side orientation 84 for facilitating a conforming engagement between the hand 22 of the individual 16 and the deformable body 30.

The first contoured recess 80 and the second contoured recess 82 may receive a first handling layer 90 and a second handling layer 92 respectively. Similarly, the first handling layer 90 and the second handling layer 92 define an opposing side orientation 84 for facilitating a frictional engaging between the hand 22 of the individual 16 and the deformable body 30. As seen in FIG. 38, the deformable body 30, the first handling layer 90 and the second handling layer 62 deform upon the individual 16 applying a compression force 94 to the first handling layer 90 and the second handling layer 92 for altering the interior chamber 38 between a first volume 96 and a second volume 98.

The construction of the flexible body 30 may include a polymeric material having a transparent or nontransparent property. Preferably, the flexible body 30 is structured from transparent polypropylene having a BPA free construction. The first handling layer 90 and the second handling layer 92 may be over-molded to the flexible body 30 and maybe constructed from a soft silicone.

As best seen in FIGS. 61, 62 and 66, the input orifice 40 of the deformable body 30 includes a male threading 100. The input closure 42 includes a cap 102 defining a cylindrical outer wall 104 extending from a closure wall 106. The cylindrical outer wall 104 includes a female threading 108 for threadably engaging the male threading 100 of the input orifice 40. The closure wall 106 abuts the input orifice 40 for sealing the input orifice 40. A cap o-ring 109 may be positioned between closure wall 106 and the input orifice 40 for preventing linkage of the fluid 12. Preferably, the cap 102 has a cap diameter 110 and the flexible body 30 has a body diameter 112 that are equivalent. The equivalent diameters 110 and 112 permit the cap 102 to be easily rotated relative to the flexible body 30 and to permit through cleaning of the interior chamber 38. The closure wall 106 may further include a circular groove 114 that will be discussed in more detail below.

The cap 102 may include a cylindrical inner wall 120 extending from the closure wall 106 for positioning within the interior chamber 38. The cylindrical inner wall 120 includes a second female threading 122.

A thermo core 130 has a core chamber 132 for retaining a thermo fluid 134 and a second male threading 136 for threadably engaging the second female threading 122 of the cylindrical inner wall 120. The thermo core 130 is inserted into the interior chamber 38 upon the cap 102 being threadably engaged with the male threading 100. The thermo fluid 134 may include an alcohol and water gel 138 or other substance that may be inserted within the thermo core 130. The thermo core 130 is capable of being threadably removed from the cap 102 and placed within a cold environment for reducing the temperature of the thermo fluid 134. Thereafter, the thermo core 130 is threadably engaged within the cap 102 for retaining the fluid 12 within the fluid container 10 cold.

As best seen in FIGS. 61-72, 76-86 and 36-39 the valve 46 may include a port plug valve 150. The port plug valve has a valve body 152 shown in FIG. 67-69 rotatably engaging within a cylindrical valve plug 154 shown in FIG. 70-72. The cylindrical valve plug 154 is inserted into the output orifice 44.

As best seen in FIGS. 61 and 66, the top end 49 of the second fluid container 350 includes a cylindrical neck 352 having plurality of neck threads 354 and a neck plate 356 extending above the cylindrical neck 352. The cylindrical valve plug 154 includes a valve threaded bore 370 for threadably engaging the neck threads 354 and securing threaded surface a receiving the output orifice 44. A neck plate 356 abuts a circular sealing rib 372 of the cylindrical valve plug 154 for preventing fluid from traversing between the fluid container 10 and the cylindrical valve plug 154.

The cylindrical valve plug 154 has a plug chamber 160 interposed between a plug input 162 and a one or more plug passage(s) 164 traversing the cylindrical valve plug 154. The cylindrical valve plug 154 further includes a plug shoulder 166, a plurality of plug stops 168 and a plug cover 170.

The valve body 152 has an interior valve bore 180 traversing from an input aperture 182 and an output aperture 184. The valve body 152 includes one or more valve passage(s) 186 within the interior valve bore 180. The valve body 152 further includes a stem lip 188, a valve body shoulder 190, and a plurality of valve body stops 192.

The interior valve bore 180 of the valve body 152 is positioned around the cylindrical valve plug 154. The valve body shoulder 190 of the valve body 152 is impressed over the plug shoulder 166 of the cylindrical valve plug 154 for locking the valve body 152 to the cylindrical valve plug 154. A valve 0-ring 194 may be positioned between the plug shoulder 166 and the valve body 152.

Figure 77:
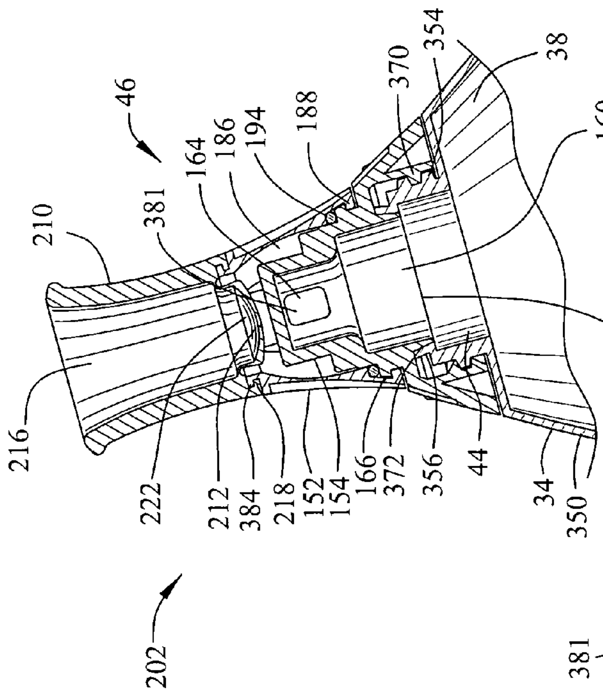
FIG. 77 is an enlarged portion of FIG. 61 illustrating a port plug valve in a closed position.
Figure 78:
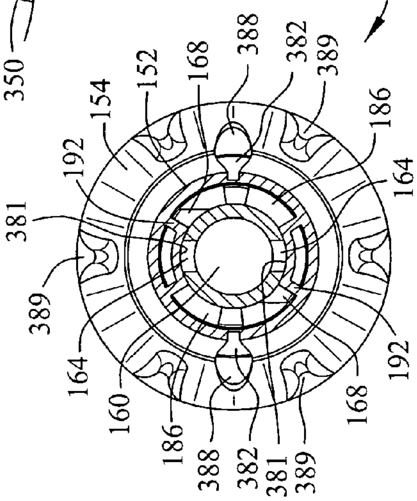
FIG. 78 is a sectional view along line 78-78 in FIG. 76.
Figure 76:
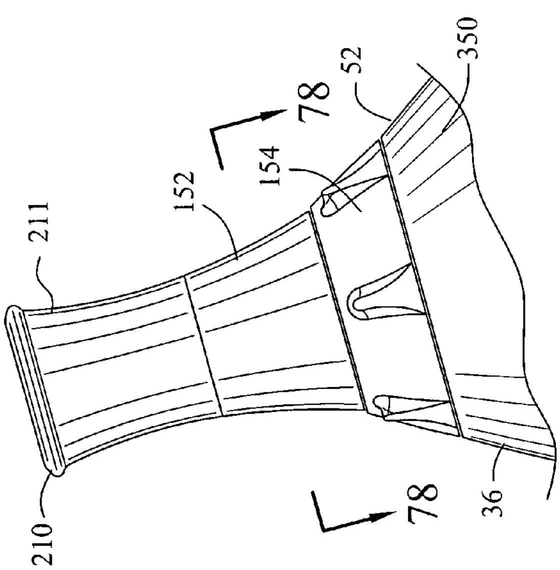
FIG. 76 is an enlarged portion of FIG. 57.
Figure 83:
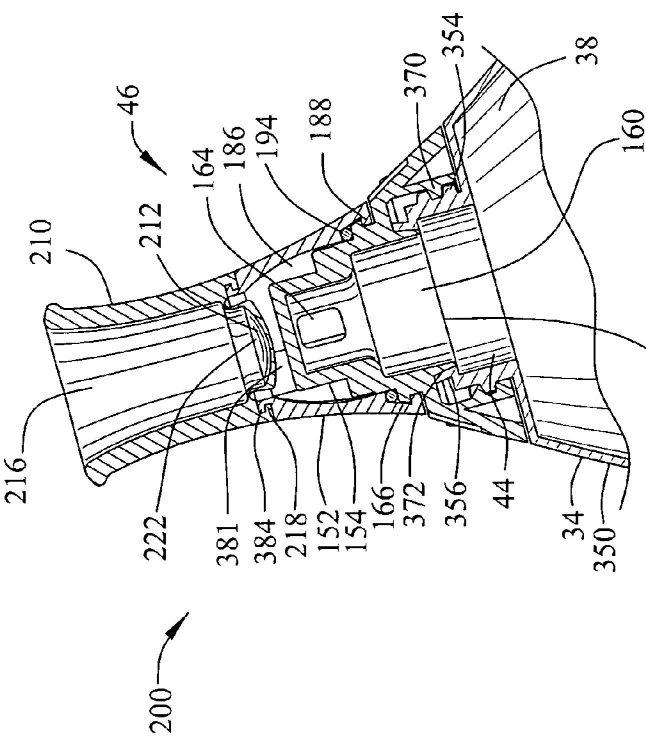
FIG. 83 is a view similar to FIG. 77 illustrating the port plug valve in an open position.
Figure 84:
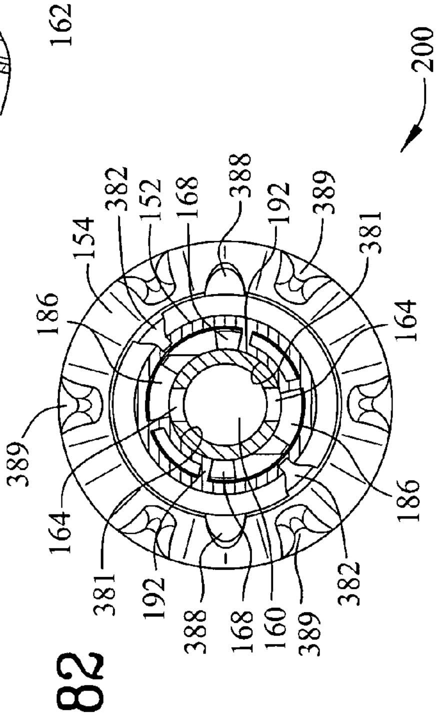
FIG. 84 is a sectional view along line 84-84 in FIG. 82.

As seen in FIGS. 83 and, 84, the valve body 152 rotates upon the cylindrical valve plug 154 for aligning the one or more plug passage 164 with the one or more valve passage 186 to permit the fluid 12 through the plug chamber 160 to one or more plug passages 164, to one or more valve passage 186 of the port plug valve 150 defining an open valve 200. As seen in FIGS. 77 and 78, the valve body 152 rotates upon the cylindrical valve plug 154 for positioning a valve body closure wall 381 over the one or more plug passage 164 to terminate the fluid 12 through the port plug valve 150 defining a closed valve 202. A first plug stop 168 contacts with a first valve body stop 192 for terminating rotation of the valve body 152 relative to the cylindrical valve plug 154 in the open position 200. A second plug stop 168 contacts with a second valve body stop 192 for terminating rotation of the valve body 152 relative to the cylindrical valve plug 154 in the closed position 202.

As shown in FIGS. 54-58, 79-82, the valve body 152 defines a valve body exterior surface 380 including a plurality of first alignment steps 382 and a plurality of first grasping steps 383. Similarly, the cylindrical valve plug 154 defines a cylindrical valve plug exterior surface 386 including a plurality of second alignment steps 388 and a plurality of second grasping steps 389. The plurality of first alignment steps 382 and the plurality of second alignment steps 388 facilitating visually inspection whether the port plug valve 150 is in an open position 200 as shown in FIGS. 79-86 for permitting the fluid through the port plug valve 150 or a closed position 202 as shown in FIGS. 54-58 and 76-78 for terminate the fluid through the port plug valve 150. The plurality of first grasping steps 383 and the plurality of second grasping steps 389 facilitate grasping of the valve body 152 and the cylindrical valve plug 154 respectively for rotating said valve body 152 relative to the cylindrical valve plug 154.

As best seen in FIGS. 61-66 and 73-77, a flexible nozzle 211 is coupled to the valve 46. The flexible nozzle 211 extends from a nozzle input end 226 to a nozzle output end 228 and defines a nozzle interior channel 227 and a nozzle interior wall 229. The flexible nozzle 211 has a sphincter valve 212 coupled within the nozzle interior channel 227 adjacent to the nozzle input end 226. The flexible nozzle 211 further includes a lower stem lip 218. The flexible nozzle 211 is secured to the valve body 152 by having the valve body cavity 214 engaging over the valve body 214. The lower stem lip 218 is inserted into the valve body shoulder 190 for locking the flexible nozzle 211 to the valve body 152.

Figure 85:
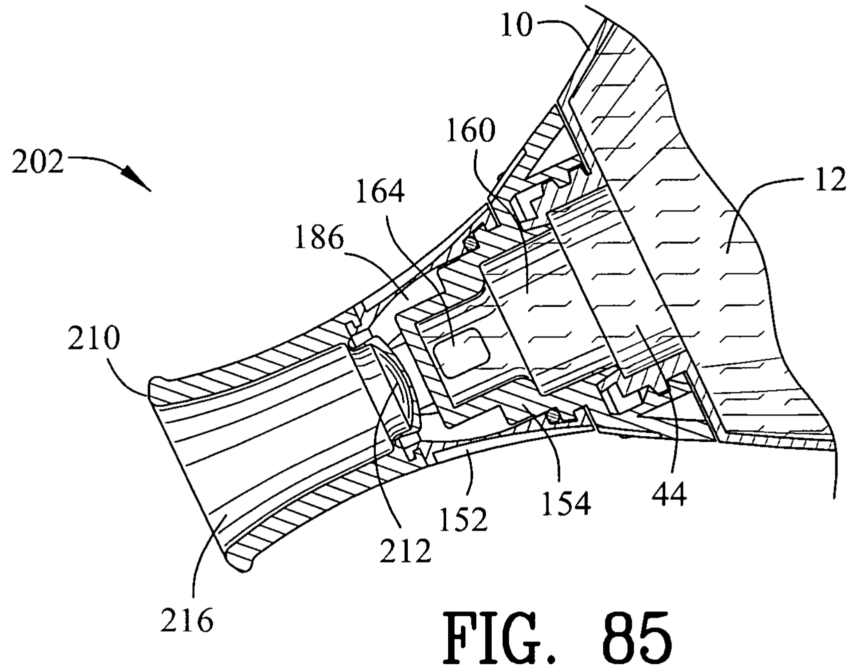
FIG. 85 is a view similar to FIG. 83 illustrating the container in a general vertical position with the port plug valve in an open position and a sphincter valve preventing the fluid from dispensing from the container.
Figure 86:
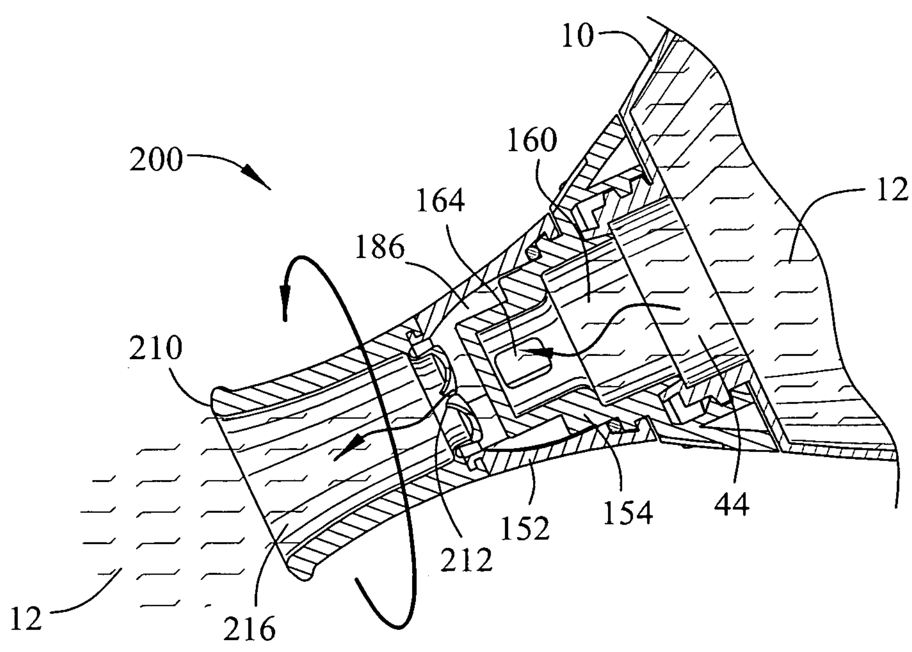
FIG. 86 is a view similar to FIG. 85 illustrating the fluid expanding the sphincter valve for permitting the fluid to be dispensed from the container only upon a compressive force applied to the container.

The sphincter valve 212 normally maintains a constriction 222 as shown in FIG. 85 to the fluid 12 being discharged from the flexible nozzle 211 absent pressurization of the fluid 12 within the deformable body 30. As such, even if the valve body 152 relative to the cylindrical valve plug 154 is the open position 200, the sphincter valve 212 will resist discharging the any fluid 12 from the flexible stem 210. A compressive force 224 as shown in FIGS. 63-65, 86, is applied to the deformable body 30 for pressurizing the fluid 212 and to overcome the constriction 222 of the sphincter valve 212 to permit discharge of the fluid 12 from the flexible stem 210.

Figure 63:
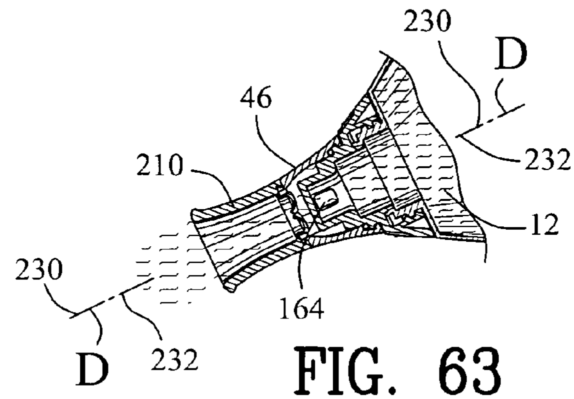
FIG. 63 is an enlarged portion of FIG. 62 illustrating the fluid exiting the fluid container and the flexible nozzle having a first general vector of symmetry (D)
Figure 64:
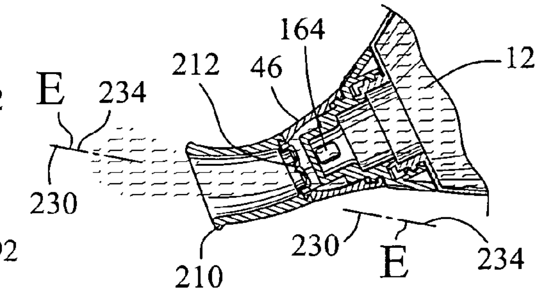
FIG. 64 is a view similar to FIG. 63 illustrating the flexible nozzle having a second general vector of symmetry (E)
Figure 65:
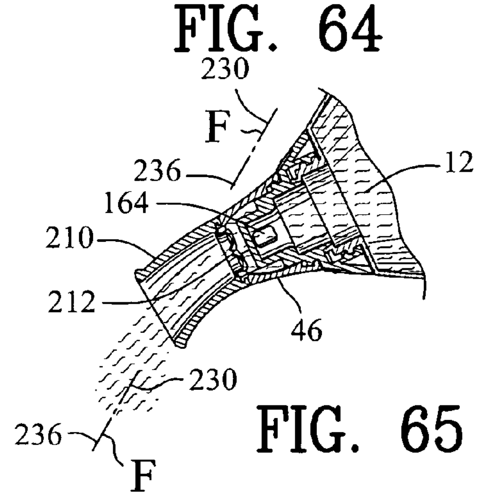
FIG. 65 is a view similar to FIG. 63 illustrating the flexible nozzle having a third general vector of symmetry (F)

As seen in FIGS. 63-65, the flexible nozzle 211 may be bent in a plurality of directions for defining multiple general lines of symmetry 230 including a first stem line of symmetry 232 shown in FIG. 63 labeled “D”, a second stem line of symmetry 234 shown in FIG. 64 labeled “E” and a third stem line of symmetry 236 shown in FIG. 65 labeled “F”. The flexible nozzle 211 alters the angular discharge “D”, “E” and “F” and numerous other angles of the fluid 12 relative to the deformable body 30. More specifically, as shown in FIGS. 36-38 and 63-65, the flexible nozzle 211 facilitates directing the fluid 12 from the port plug valve 150 to the mouth 14 of the individual 16 upon the deformable body 30 positioned in a generally vertical position 54 and the mouth 14 of the individual 16 in a generally horizontal position 56 during engaging between the mouth 14 and the valve 46.

Figure 79:
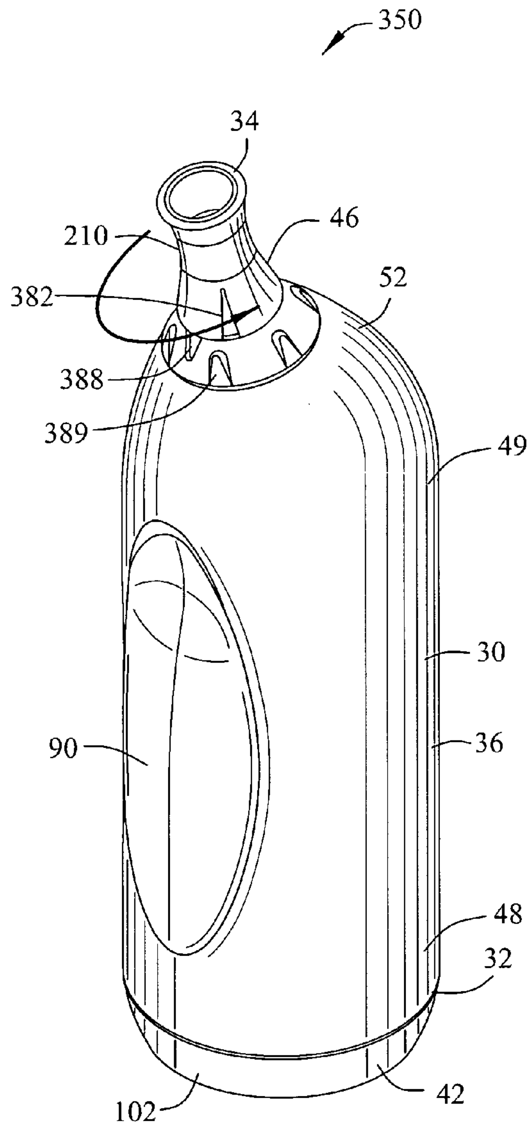
FIG. 79 is a view similar to FIG. 54 illustrating a rotational force applied to the valve body and/or the flexible nozzle for rotating the port plug valve into an open position.
Figure 80:
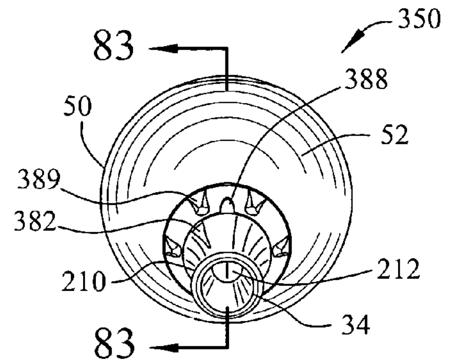
FIG. 80 is a top view of FIG. 79.
Figure 81:
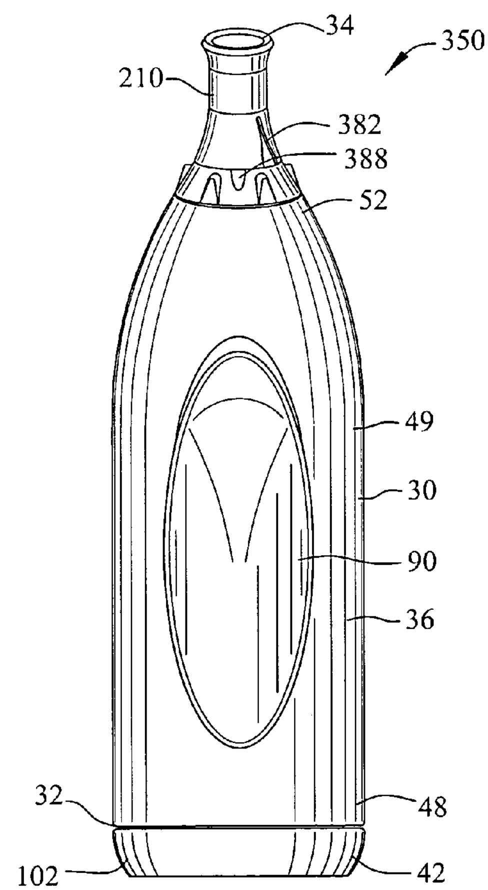
FIG. 81 is a front view of FIG. 79.
Figure 82:
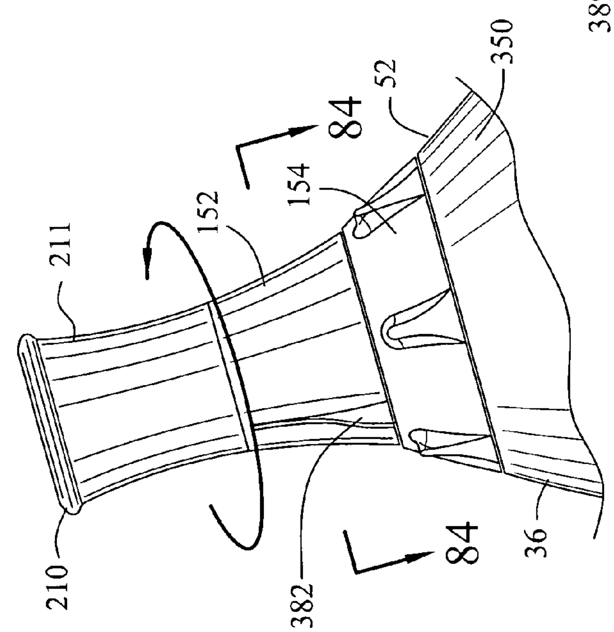
FIG. 82 is a view similar to FIG. 76 illustrating a rotational force applied to the valve body and/or the flexible nozzle for rotating the port plug valve into an open position.

The flexible nozzle 211 may be constructed from silicon or other flexible materials. Preferably, the flexible nozzle 211 is over-molded to the valve body 152 for further securing the flexible nozzle 211 to the valve body 152. As such, as seen in FIGS. 79 and 82 if the hand 22 of the individual 16 grasps the flexible nozzle 211 and applies a nozzle rotational force 240, the flexible nozzle 211 causes the valve body 152 to rotate. In addition, as seen in FIGS. 36-38 and 63-65, if the individual 16 utilizes the mouth 14 to compress against the flexible nozzle 211 and the hand 22 of the individual 16 grasps the deformable body 30 and applies a body rotational force 242 the flexible nozzle 211 causes the valve body 152 to rotate.

As best seen in FIGS. 73-74 and 36-39, the flexible nozzle 211 may include a circular concave structure 250 for improving engagement between the flexible nozzle 211 and the mouth 14 of the individual 16. In addition, the circular concave structure 250 assists in preventing the flexible nozzle 211 from kinking upon itself during bending in a plurality of directions for defining multiple general lines of symmetry 230.

FIGS. 34, 35, 40-53 illustrate a cage 270 incorporating the subject invention for engaging with the second fluid container 350. The cage 270 may be secured to an object 272. The object may include a bicycle 20 but also may include movable and non-movable objects. The cage 270 includes a concave plate 274 extending between a first side 276, a second side 278, a bottom end 280 and a top end 282. The first side 276 and the second side 278 define a first arcuate arm 284 and a second arcuate arm 286 respectively. The bottom end 280 defines a mounting hook 288 and the top end 282 defines a stabilizing hook 290. The concave plate 274 may include a plurality of elongated grooves 292 for mounting the concave plate 274 in multiple cage height selections 294, a multiple cage vertical angles 296 and a multiple cage horizontal angles relative to the object 272. More specifically, the concave plate 274 may be secured to the object 272 by a mounting plate 300 having a top contour side 302 and a bottom contour side 304 for conforming to a bicycle frame 306. A frame fastener 308 traverses through the mounting plate 300 for securing the bottom contour side 304 to the bicycle frame 306. A plate fastener 310 traversing one of the plurality of elongated grooves 292 for coupling the cage 270 to the mounting plate 300.

FIGS. 46-53, illustrate the process in which the concave plate 274 engages with the fluid container 10. An engaging force 312 is applied to the container 10 to cause the container to apply a displace force 314 to the first arcuate arm 284 and the second arcuate arm 286. Upon the container 10 fully abutting the concave plate 274, the first arcuate arm 284 and the second arcuate arm 286 retract against the deformable body 30 due to a pre-tension force 316 within the retracts first arcuate arm 284 and the second arcuate arm 286. The pre-tension force 316 applies a compressive force 318 against the container 10 for resisting removal of the container 10 from the cage 270. To further secure the container 10 to the cage 270, the mounting hook 288 engaging within the circular groove 114 as shown in FIGS. 50 and 53 and the stabilizing hook 290 is compressed into the either the first handling layer 90 or the second handling layer 92. FIGS. 51 and 51 demonstrate that the container 10 may be inserted into the cage 270 in a plurality of angled orientations 320 relative to the cage 270 and still be securely coupled.

FIGS. 87-122 illustrate a third fluid container 390 for retaining and dispensing a fluid 12 into the mouth 14 of an individual 16. The fluid container 390 comprises a deformable body 30 extending from a bottom end 48 and a top end 49 and defining an exterior surface 36 and an interior chamber 38. The bottom end 48 may include an input end 32 and the top end 49 may include an output end 34. The input end 32 has an input orifice 40 for positioning the fluid 12 within the interior chamber 38. An input closure 42 engages the input orifice 40 for sealing the input orifice 40. The output end 34 has an output orifice 44 for positioning the fluid 12 exterior to the interior chamber 38. A valve 46 engages the output orifice 44 for controlling the fluid 12 flowing through the output orifice 44. The deformable body 30 includes a generally cylindrical body portion 50 and a generally conical body portion 52. The generally conical body portion 52 couples the valve 46 to the generally cylindrical body portion 50. The generally conical body portion 52 directs the fluid 12 from the interior chamber 38 to the valve 46 upon the deformable body 30 positioned in a generally vertical position 54 and the mouth 14 of the individual 16 in a generally horizontal position 56 during engaging between the mouth 14 and the valve 46.

As best seen in FIGS. 94 and 36-38, the deformable body 30 defines a general axis of symmetry 60 labeled “A” that extends from the input end 32 to the output end 34. The valve 46 defines a general line of symmetry labeled “B”. The general axis of symmetry 60 and the general line of symmetry 62 define a parallel orientation 392 for positioning the deformable body 30 in a generally vertical position 54 and the mouth 14 of the individual 16 in a generally horizontal position 56 during engagement between the mouth 14 and the valve 46 of the fluid container 10. Furthermore, the generally conical body portion 52 defines a second general axis of symmetry 66 labeled “C”. The second general axis of symmetry 66 and the general line of symmetry 62 define a generally parallel orientation 68 for further positioning the deformable body 30 in a generally vertical position 54 and the mouth 14 of the individual 16 in a generally horizontal position 56 during engaging between the mouth 14 and the valve 46 of the fluid container 10.

Since both the general line of symmetry 62 and the second general axis of symmetry 66 are generally parallel orientation 68 with the general axis of symmetry 60, the generally conical body 52 and the valve 46 extending exclusively above the deformable body 30 for defining a generally elongated cylindrical container 78.

FIGS. 35-39 illustrate the individual 16 positioned upon a bicycle 20. By positioning the deformable body 30 in a generally vertical position 54 and the mouth 14 of the individual 16 in a generally horizontal position 56 during engagement between the mouth 14 and the valve 46 of the fluid container 10, the individual 16 will more easily be able to completely empty the fluid 12 from the fluid container 10. The generally vertical position 54 and generally horizontal position 56 also alleviates the individual 16 from tilting the head 22 backwards in order to consume the fluid 12. The fact that the head 22 of the individual is retained within a horizontal position provides both an improved aerodynamic positioning of the head of the individual who is riding a bicycle and permits the individual to retain a front visual view.

Figure 94:
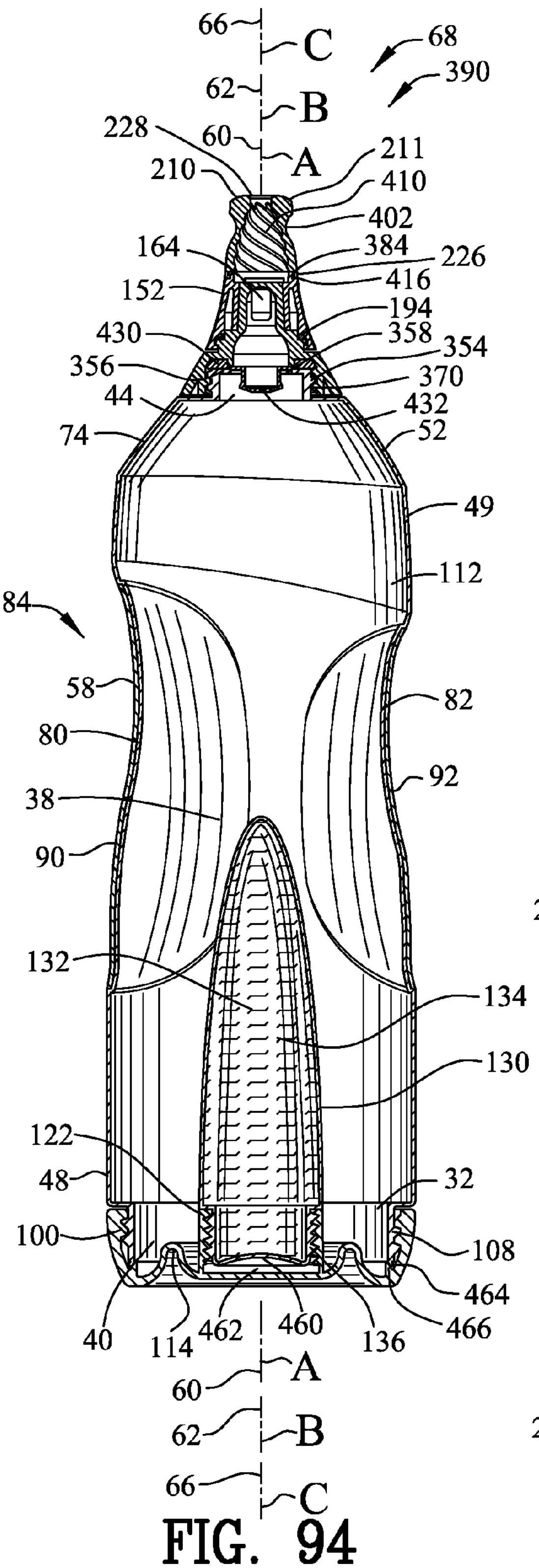
FIG. 94 is a sectional view along line 94-94 in FIG. 89.
Figure 98:
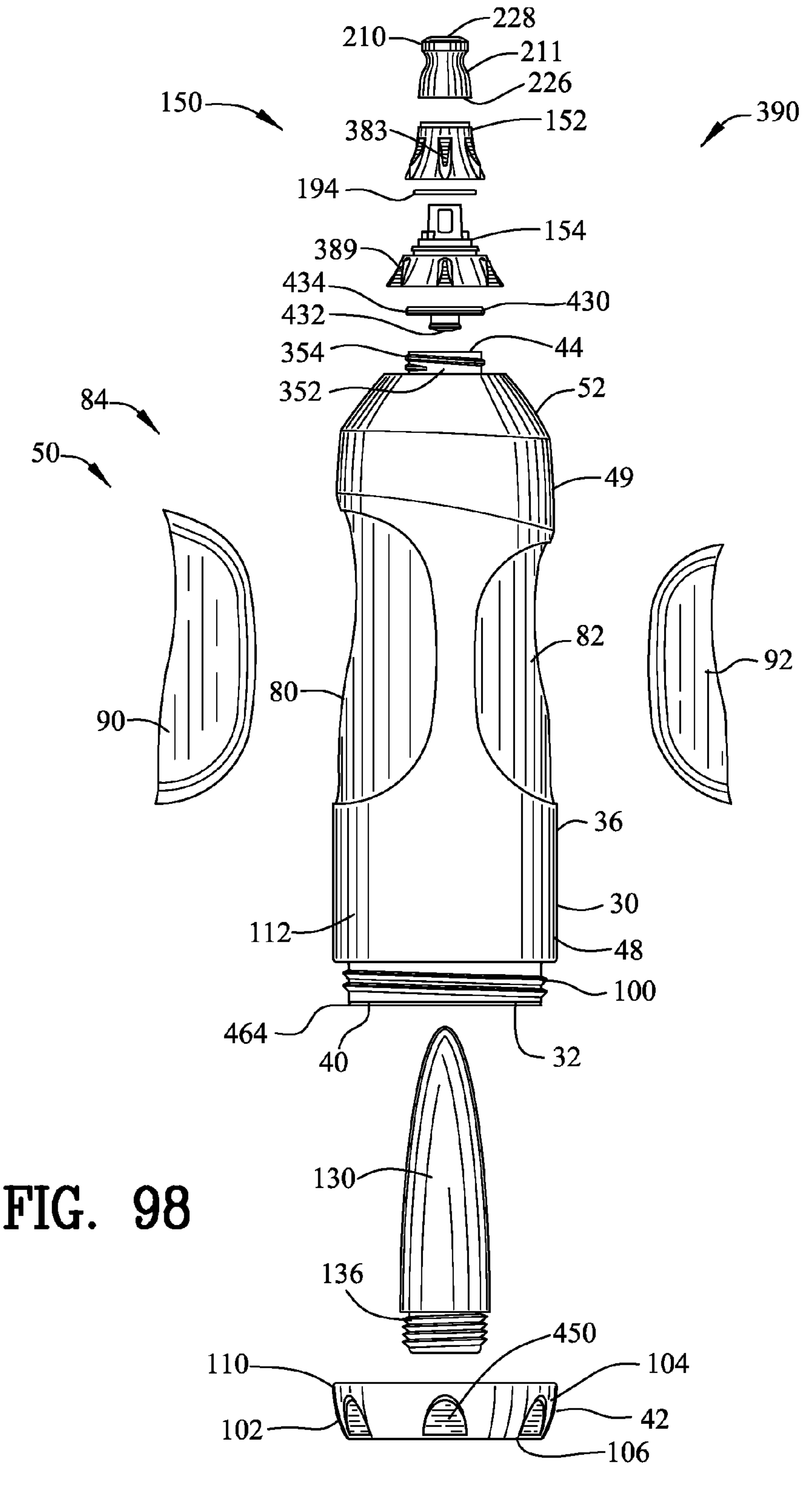
FIG. 98 is an exploded view of FIG. 90.
Figure 99:
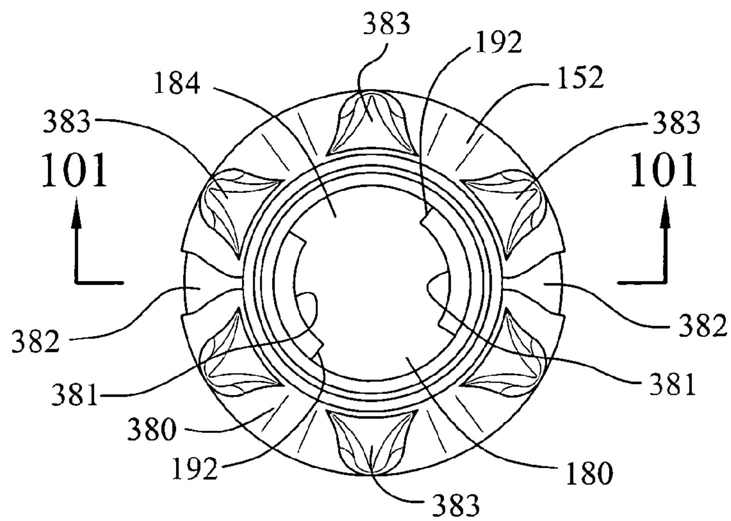
FIG. 99 is a top view of a valve body.
Figure 100:
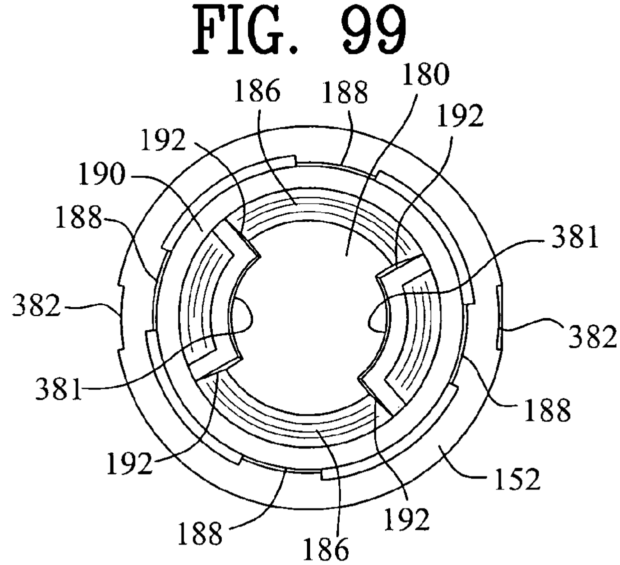
FIG. 100 is a bottom view of FIG. 99.
Figure 101:
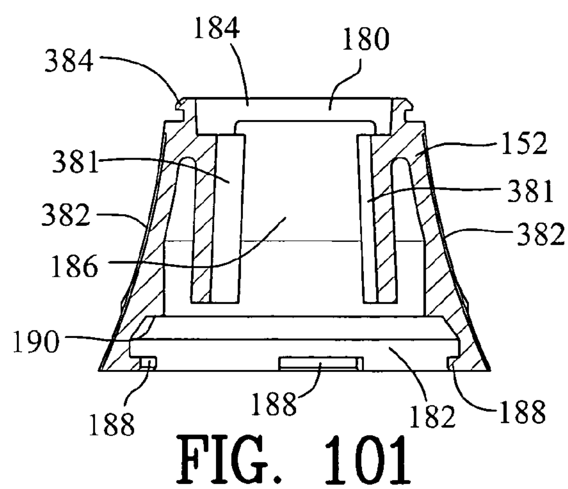
FIG. 101 is a sectional view along line 101-101 in FIG. 99.
Figure 102:
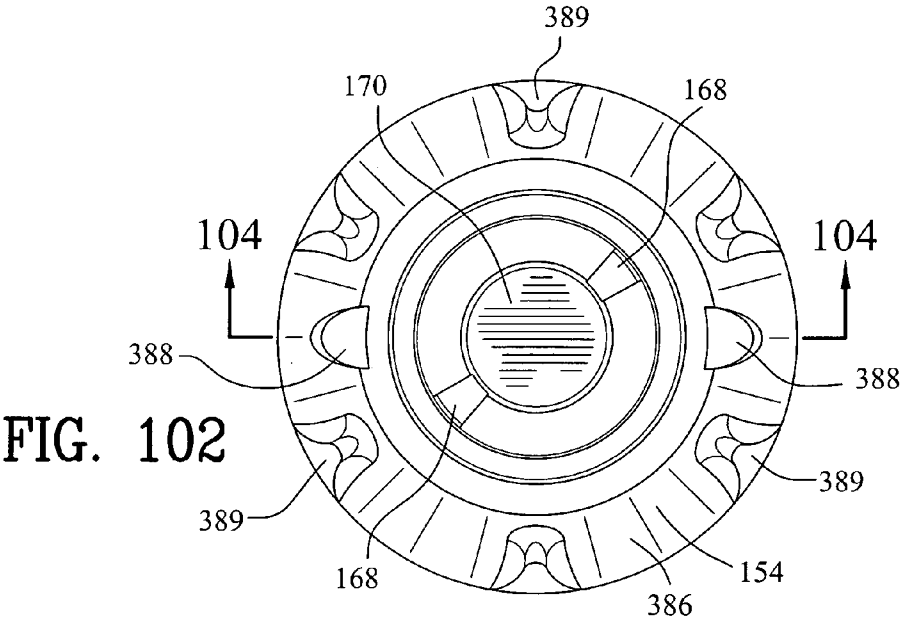
FIG. 102 is a top view of a cylindrical valve plug.
Figure 103:
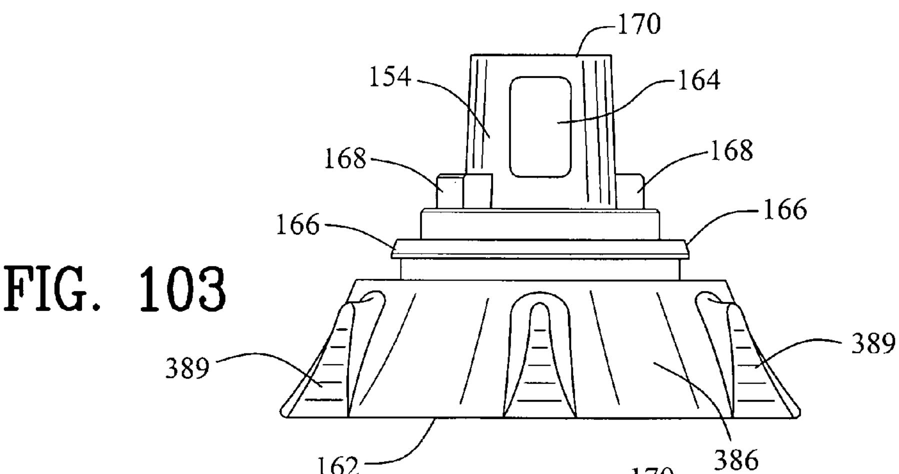
FIG. 103 is a side view of FIG. 102.
Figure 104:
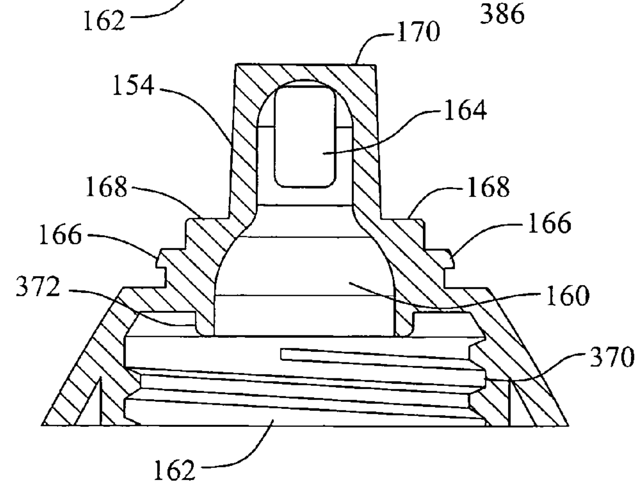
FIG. 104 is a sectional view along line 104-104 in FIG. 102.
Figure 105:
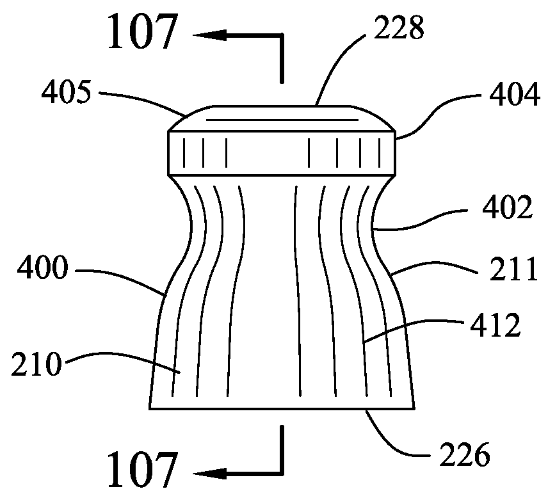
FIG. 105 is a side view of a flexible nozzle.
Figure 106:
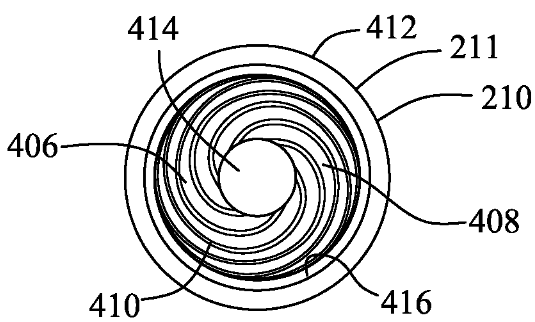
FIG. 106 is a bottom view of FIG. 105.
Figure 107:
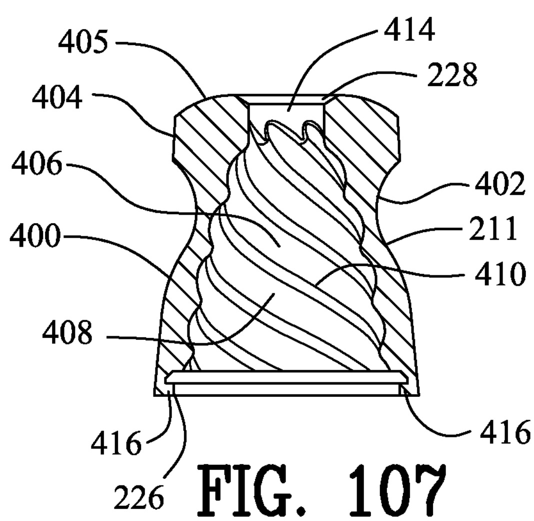
FIG. 107 is a sectional view along line 107-107 in FIG. 105.
Figure 108:
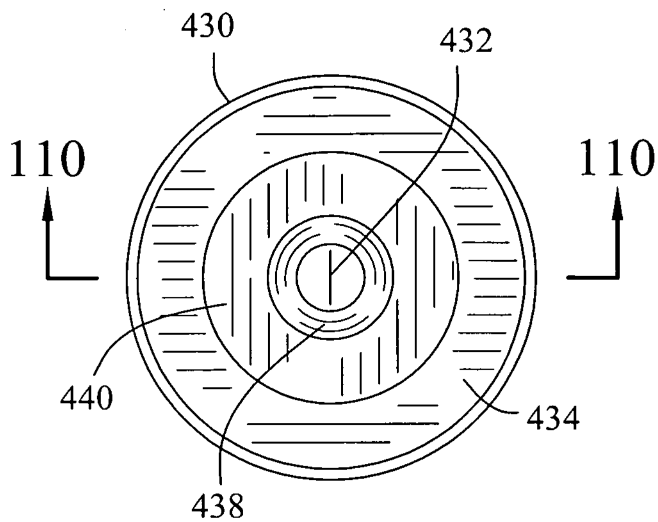
FIG. 108 is a top view of an integral one-piece unit including a sphincter valve and a gasket.
Figure 109:
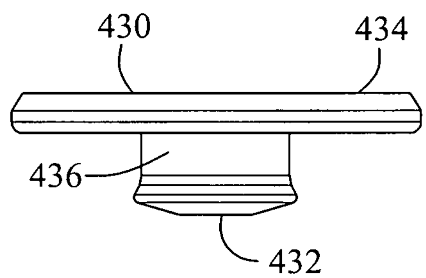
FIG. 109 is a side view of FIG. 108.
Figure 110:
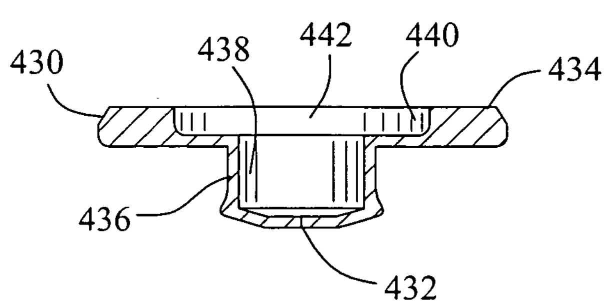
FIG. 110 is an sectional view along line 110-110 in FIG. 108.
Figure 114:
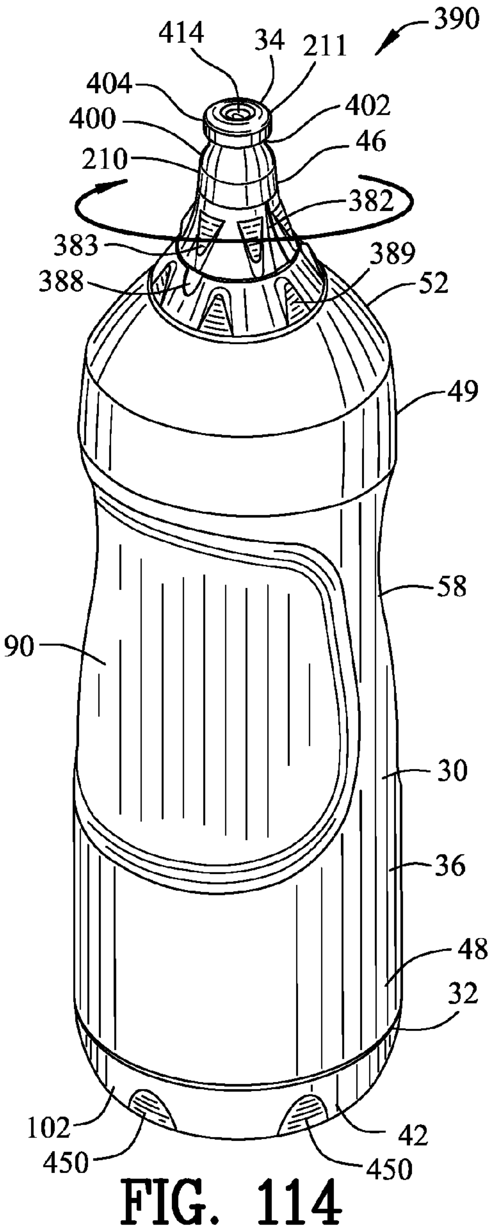
FIG. 114 is a view similar to FIG. 87 illustrating a rotational force applied to the valve body and/or the flexible nozzle for rotating the port plug valve into a closed position.
Figure 115:
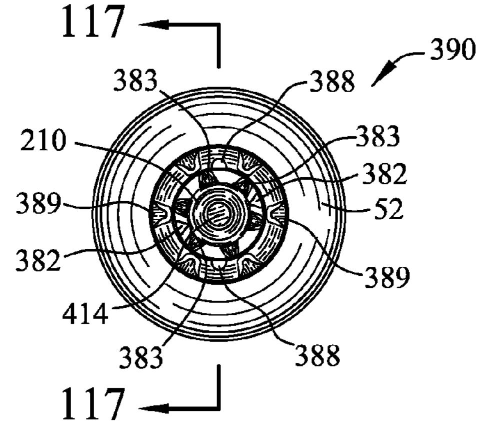
FIG. 115 is a top view of FIG. 114.

As seen in FIGS. 94, 98 and 114, the exterior surface 36 of the deformable body 30 may include a first contoured recess 80 and a second contoured recess 82. Preferably, the first contoured recess 80 and the second contoured recess layer 82 define an opposing side orientation 84 for facilitating a conforming engagement between the hand 22 of the individual 16 and the deformable body 30.

The first contoured recess 80 and the second contoured recess 82 may receive a first handling layer 90 and a second handling layer 92 respectively. Similarly, the first handling layer 90 and the second handling layer 92 define an opposing side orientation 84 for facilitating a frictional engaging between the hand 22 of the individual 16 and the deformable body 30. As seen in FIG. 38, the deformable body 30, the first handling layer 90 and the second handling layer 62 deform upon the individual 16 applying a compression force 94 to the first handling layer 90 and the second handling layer 92 for altering the interior chamber 38 between a first volume 96 and a second volume 98.

As seen in FIGS. 87, 89, 90, 91 and 94, the deformable body 30 defines a generally hourglass shape 58 extending from the bottom end 48 to the top end 49 for preventing the deformable body 30 from slipping out of a hand of an individual. The construction of the flexible body 30 may include a polymeric material having a transparent or nontransparent property. Preferably, the flexible body 30 is structured from transparent polypropylene having a BPA free construction. The first handling layer 90 and the second handling layer 92 may be over-molded to the flexible body 30 and maybe constructed from a soft silicone.

As best seen in FIGS. 94, 98, the input orifice 40 of the deformable body 30 includes a male threading 100. The input closure 42 includes a cap 102 defining a cylindrical outer wall 104 extending from a closure wall 106. The cylindrical outer wall 104 includes a female threading 108 for threadably engaging the male threading 100 of the input orifice 40. The closure wall 106 abuts the input orifice 40 for sealing the input orifice 40.

The input orifice 40 includes a lower container taper seal 464. The cylindrical outer wall 104 includes a cap taper seal 466 for abutting the lower container taper seal 464 upon full engagement between the cap 102 and the male threading 100. The lower container taper seal 464 and cap taper seal 466 seal the cap 102 with the input orifice 40 for preventing fluid from linking from the deformable body 30.

Preferably, the cap 102 has a cap diameter 110 and the flexible body 30 has a body diameter 112 that are equivalent. The equivalent diameters 110 and 112 permit the cap 102 to be easily rotated relative to the flexible body 30 and to permit through cleaning of the interior chamber 38. The closure wall 106 may further include a circular groove 114 that will be discussed in more detail below.

The cap 102 may include a cylindrical inner wall 120 extending from the closure wall 106 for positioning within the interior chamber 38. The cylindrical inner wall 120 includes a second female threading 122.

A thermo core 130 has a core chamber 132 for retaining a thermo fluid 134 and a second male threading 136 for threadably engaging the second female threading 122 of the cylindrical inner wall 120. The thermo core 130 is inserted into the interior chamber 38 upon the cap 102 being threadably engaged with the male threading 100. The thermo fluid 134 may include an alcohol and water gel 138 or other substance that may be inserted within the thermo core 130. The thermo core 130 is capable of being threadably removed from the cap 102 and placed within a cold environment for reducing the temperature of the thermo fluid 134. Thereafter, the thermo core 130 is threadably engaged within the cap 102 for retaining the fluid 12 within the fluid container 10 cold.

The second male threading 136 of the thermo core 130 has a concave cap 460 for sealing said thermo fluid 134 within said core chamber 132 and is positioned within the cylindrical inner wall 120 upon the male threading 136 of said thermo core 130 threadably engaging the female threading 122 of said cylindrical inner wall 120. The length of the second male threading 136 is less than the length of the second female threading 122 of the cylindrical inner wall 120 for the closure wall 106 and the concave cap 460 to define an expansion area 462 there between for receiving the concave cap 460 that has deformed.

As best seen in FIGS. 94-104, 111-120 and 36-39 the valve 46 may include a port plug valve 150. The port plug valve has a valve body 152 shown in FIG. 99-101 rotatably engaging within a cylindrical valve plug 154 shown in FIG. 102-104. The cylindrical valve plug 154 is inserted into the output orifice 44.

As best seen in FIGS. 94-97 and 98, the top end 49 of the third fluid container 390 includes a cylindrical neck 352 having plurality of neck threads 354 and a neck plate 356 extending within the cylindrical neck 352. The cylindrical valve plug 154 includes a valve threaded bore 370 for threadably engaging the neck threads 354 and securing threaded surface a receiving the output orifice 44. A neck plate 356 abuts a circular sealing rib 372 of the cylindrical valve plug 154 for preventing fluid from traversing between the fluid container 10 and the cylindrical valve plug 154.

The cylindrical valve plug 154 has a plug chamber 160 interposed between a plug input 162 and a one or more plug passage(s) 164 traversing the cylindrical valve plug 154. The cylindrical valve plug 154 further includes a plug shoulder 166, a plurality of plug stops 168 and a plug cover 170.

The valve body 152 has an interior valve bore 180 traversing from an input aperture 182 and an output aperture 184. The valve body 152 includes one or more valve passage(s) 186 within the interior valve bore 180. The valve body 152 further includes a stem lip 188, a valve body shoulder 190, and a plurality of valve body stops 192.

The interior valve bore 180 of the valve body 152 is positioned around the cylindrical valve plug 154. The valve body shoulder 190 of the valve body 152 is impressed over the plug shoulder 166 of the cylindrical valve plug 154 for locking the valve body 152 to the cylindrical valve plug 154. A valve O-ring 194 may be positioned between the plug shoulder 166 and the valve body 152.

Figure 112:
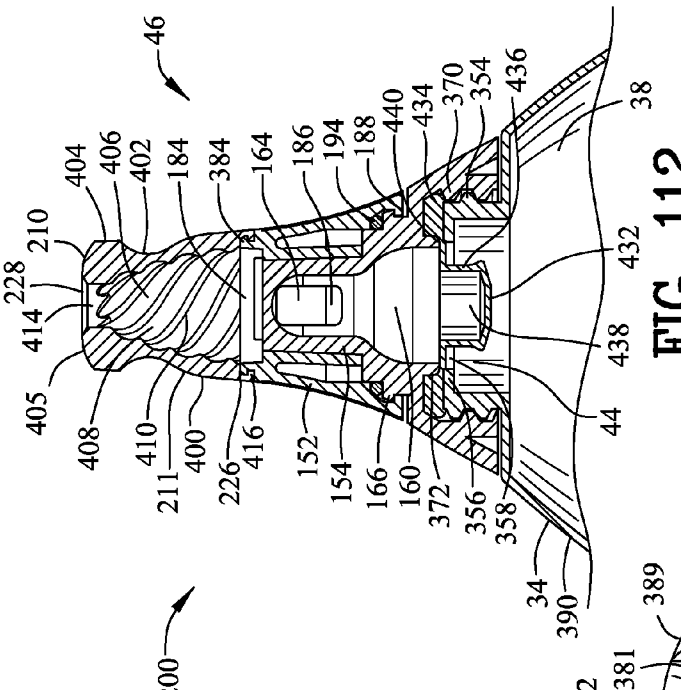
FIG. 112 is an enlarged portion of FIG. 94 illustrating a port plug valve in an open position.
Figure 113:
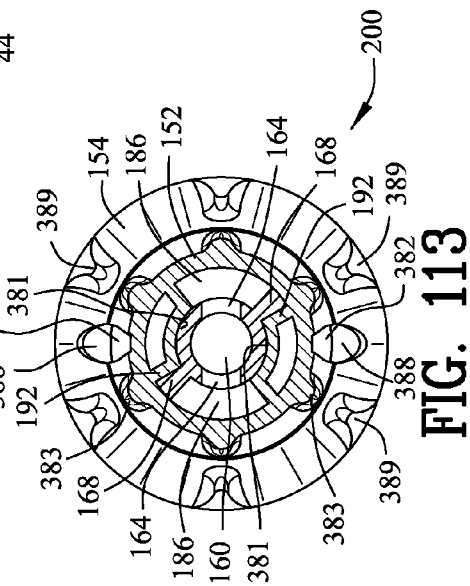
FIG. 113 is a sectional view along line 113-113 in FIG. 111.
Figure 111:
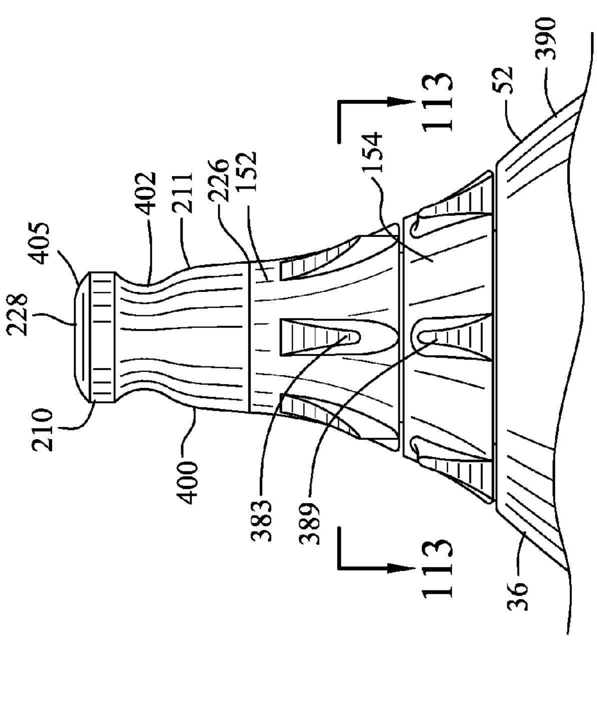
FIG. 111 is an enlarged portion of FIG. 90.
Figure 117:
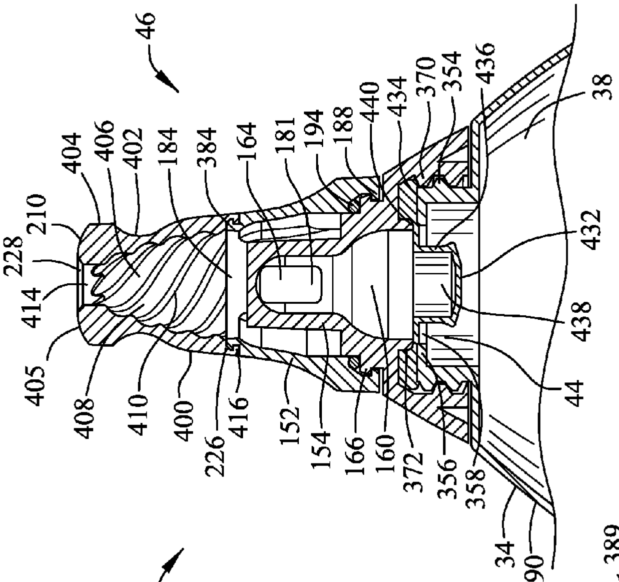
FIG. 117 is a view similar to FIG. 112 illustrating the port plug valve in a closed position.
Figure 118:
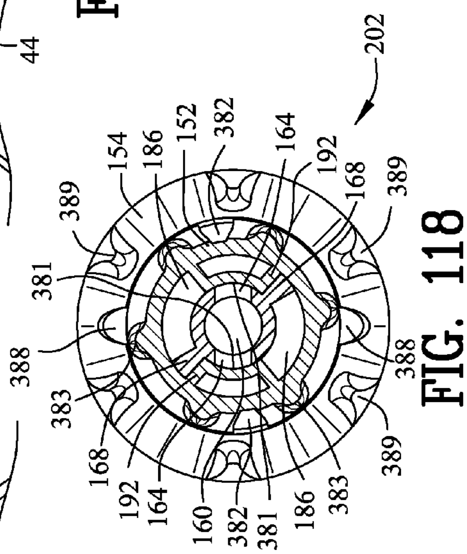
FIG. 118 is a sectional view along line 118-118 in FIG. 116.
Figure 116:
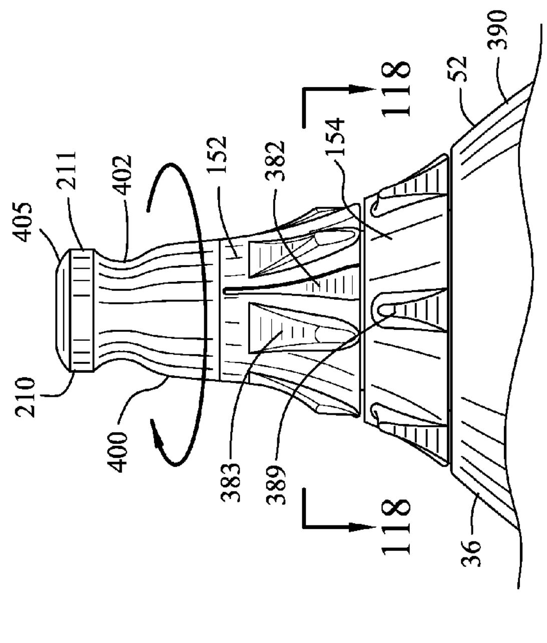
FIG. 116 is a view similar to FIG. 111 illustrating a rotational force applied to the valve body and/or the flexible nozzle for rotating the port plug valve into a closed position.

As seen in FIGS. 111-113, the valve body 152 rotates upon the cylindrical valve plug 154 for aligning the one or more plug passage 164 with the one or more valve passage 186 to permit the fluid 12 through the plug chamber 160 to one or more plug passages 164, to one or more valve passage 186 of the port plug valve 150 defining an open valve 200. As seen in FIGS. 116-118, the valve body 152 rotates upon the cylindrical valve plug 154 for positioning a valve body closure wall 381 over the one or more plug passage 164 to terminate the fluid 12 through the port plug valve 150 defining a closed valve 202. A first plug stop 168 contacts with a first valve body stop 192 for terminating rotation of the valve body 152 relative to the cylindrical valve plug 154 in the open position 200. A second plug stop 168 contacts with a second valve body stop 192 for terminating rotation of the valve body 152 relative to the cylindrical valve plug 154 in the closed position 202.

As shown in FIGS. 87-99, and 102, the valve body 152 defines a valve body exterior surface 380 including a plurality of first alignment steps 382 and a plurality of first grasping steps 383. Similarly, the cylindrical valve plug 154 defines a cylindrical valve plug exterior surface 386 including a plurality of second alignment steps 388 and a plurality of second grasping steps 389. The plurality of first alignment steps 382 and the plurality of second alignment steps 388 facilitating visually inspection whether the port plug valve 150 is in an open position 200 as shown in FIGS. 111-113 for permitting the fluid through the port plug valve 150 or a closed position 202 as shown in FIGS. 116-118 for terminate the fluid through the port plug valve 150. The plurality of first grasping steps 383 and the plurality of second grasping steps 389 facilitate grasping of the valve body 152 and the cylindrical valve plug 154 respectively for rotating said valve body 152 relative to the cylindrical valve plug 154.

As best seen in FIGS. 87-91, 94-97, 105-107 and 119-122, a flexible nozzle 211 is coupled to the valve 46. The flexible nozzle 211 extends from a nozzle input end 226 to a nozzle output end 228 and defines a nozzle interior channel 227 and a nozzle interior wall 229. The flexible nozzle 211 further includes a lower stem lip 218. The flexible nozzle 211 is secured to the valve body 152 by having the valve body cavity 214 engaging over the valve body 214. The lower stem lip 218 is inserted into the valve body shoulder 190 for locking the flexible nozzle 211 to the valve body 152.

The flexible nozzle 211 has a circular taper structure 400 for propelling the fluid in a jet flow upon the fluid exiting the flexible nozzle 211. The exterior of the flexible nozzle 211 may further include a circular groove 402 for grasping and supporting the flexible nozzle 211 with the teeth of the individual as shown in FIG. 122. The interior channel 406 of said flexible nozzle 211 includes a taper channel structure 408 for further propelling the fluid in a jet flow upon the fluid exiting a jet aperture 414 of the flexible nozzle 211. The interior channel wall may further include a plurality of conical channels 410 creating a vortex flow of the fluid within the interior channel 406 and increasing the jet flow upon the fluid exiting the flexible nozzle 211. The flexible nozzle 211 may be constructed from a transparent polymeric material 412 for indicating the cleanliness of said flexible nozzle 211. In addition, the circular taper structure 400 assists in preventing the flexible nozzle 211 from kinking upon itself during bending in a plurality of directions for defining multiple general lines of symmetry 230.

Figure 119:
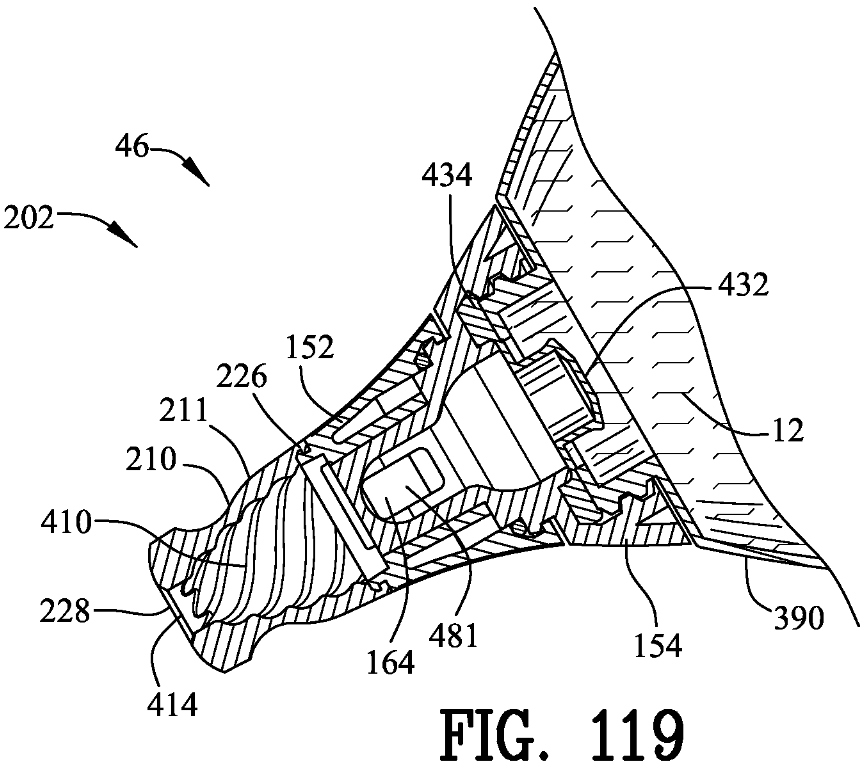
Figure 120:
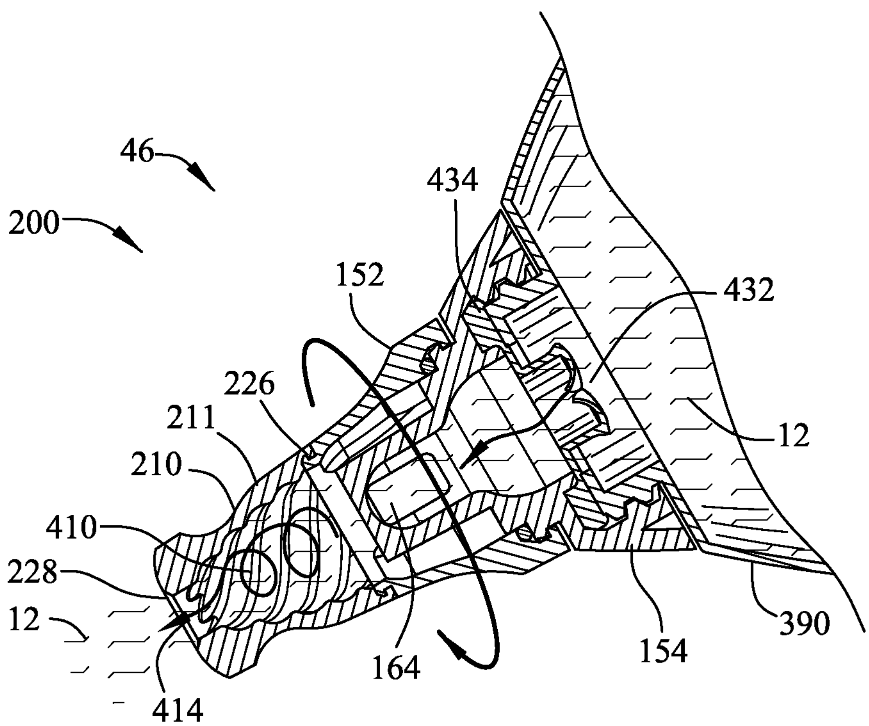

As best shown in FIGS. 94-98, 108-110, 112, 117, 119 and 120, a sphincter valve 432 and gasket 434 are constructed from an integral one-piece unit 430. The sphincter valve 432 includes a sphincter cylindrical body 436 for defining a sphincter chamber 438. The gasket 434 includes a basket bore 440 for defining a gasket chamber 442. The integral one-piece unit 430 is positioned between the valve 46 and the cylindrical neck 352. The gasket 434 is compressed between the neck plate 356 circular sealing rib 372 of the cylindrical valve plug 154 for preventing fluid from traversing between the fluid container 10 and the cylindrical valve plug 154 and retaining the sphincter valve 432 between said top end of said deformable body and said valve. The sphincter valve 432 maintains a constriction 222 as shown in FIG. 119 to the fluid being discharged from the deformable body 30 and into the valve 46 absent pressurization of the fluid within the deformable body 30. As such, even if the valve body 152 relative to the cylindrical valve plug 154 is the open position 200, the sphincter valve 432 will resist discharging the any fluid 12 from the flexible nozzle 211. A compressive force applied to the deformable body 30 pressurizes the fluid and overcomes the constriction of the sphincter valve 432 to permit discharge of the fluid from the deformable body 30 and into the valve 46. Thereafter, the valve 46 controls the fluid flowing through the flexible nozzle 211.

Figure 95:
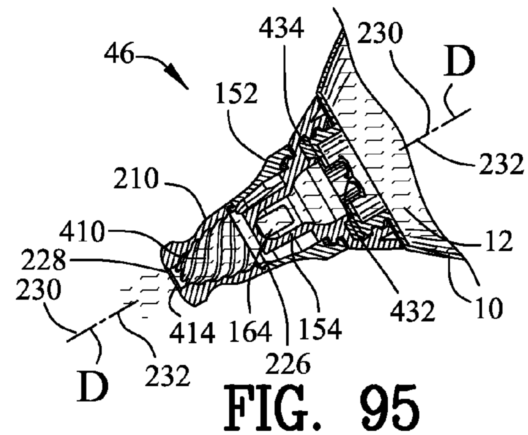
FIG. 95 is an enlarged portion of FIG. 94 illustrating the fluid exiting the fluid container and a flexible nozzle having a first general vector of symmetry (D)

As seen in FIGS. 95-97, the flexible nozzle 211 may be bent in a plurality of directions for defining multiple general lines of symmetry 230 including a first stem line of symmetry 232 shown in FIG. 95 labeled "D", a second stem line of symmetry 234 shown in FIG. 96 labeled "E" and a third stem line of symmetry 236 shown in FIG. 97 labeled "F". The flexible nozzle 211 alters the angular discharge "D", "E" and "F" and numerous other angles of the fluid 12 relative to the deformable body 30. More specifically, as shown in FIGS. 36-38, 63-65 and 121, the flexible nozzle 211 facilitates directing the fluid 12 from the port plug valve 150 to the mouth 14 of the individual 16 upon the deformable body 30 positioned in a generally vertical position 54 and the mouth 14 of the individual 16 in a generally horizontal position 56 during engaging between the mouth 14 and the valve 46.

The flexible nozzle 211 may be constructed from silicon or other flexible materials. Preferably, the flexible nozzle 211 is over-molded to the valve body 152 for further securing the flexible nozzle 211 to the valve body 152. As such, as seen in FIGS. 114 and 166 if the hand 22 of the individual 16 grasps the flexible nozzle 211 and applies a nozzle rotational force 240, the flexible nozzle 211 causes the valve body 152 to rotate. In addition, as seen in FIGS. 36-38 and 63-65, if the individual 16 utilizes the mouth 14 to compress against the flexible nozzle 211 and the hand 22 of the individual 16 grasps the deformable body 30 and applies a body rotational force 242 the flexible nozzle 211 causes the valve body 152 to rotate.

FIGS. 34, 35, 40-53 illustrate a cage 270 incorporating the subject invention for engaging with the third fluid container 390. The cage 270 may be secured to an object 272. The object may include a bicycle 20 but also may include movable and non-movable objects. The cage 270 includes a concave plate 274 extending between a first side 276, a second side 278, a bottom end 280 and a top end 282. The first side 276 and the second side 278 define a first arcuate arm 284 and a second arcuate arm 286 respectively. The bottom end 280 defines a mounting hook 288 and the top end 282 defines a stabilizing hook 290. The concave plate 274 may include a plurality of elongated grooves 292 for mounting the concave plate 274 in multiple cage height selections 294, a multiple cage vertical angles 296 and a multiple cage horizontal angles relative to the object 272. More specifically, the concave plate 274 may be secured to the object 272 by a mounting plate 300 having a top contour side 302 and a bottom contour side 304 for conforming to a bicycle frame 306. A frame fastener 308 traverses through the mounting plate 300 for securing the bottom contour side 304 to the bicycle frame 306. A plate fastener 310 traversing one of the plurality of elongated grooves 292 for coupling the cage 270 to the mounting plate 300.

FIGS. 46-53, illustrate the process in which the concave plate 274 engages with the fluid container 10. An engaging force 312 is applied to the container 10 to cause the container to apply a displace force 314 to the first arcuate arm 284 and the second arcuate arm 286. Upon the container 10 fully abutting the concave plate 274, the first arcuate arm 284 and the second arcuate arm 286 retract against the deformable body 30 due to a pre-tension force 316 within the retracts first arcuate arm 284 and the second arcuate arm 286. The pre-tension force 316 applies a compressive force 318 against the container 10 for resisting removal of the container 10 from the cage 270. To further secure the container 10 to the cage 270, the mounting hook 288 engaging within the circular groove 114 as shown in FIGS. 50 and 53 and the stabilizing hook 290 is compressed into the either the first handling layer 90 or the second handling layer 92. FIGS. 51 and 51 demonstrate that the container 10 may be inserted into the cage 270 in a plurality of angled orientations 320 relative to the cage 270 and still be securely coupled.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A fluid container for retaining and dispensing a fluid into the mouth of an individual, the fluid container, comprising:

a deformable body extending from a bottom end to a top end and defining an exterior surface and an interior chamber;

said top end having an output orifice for positioning the fluid exterior of said interior chamber;

a sphincter valve and a gasket defining an integral one-piece unit engaging over said output orifice;

a valve engaging said output orifice for maintaining said sphincter valve between said top end of said deformable body and said valve and compressing said gasket between said top end of said deformable body and said valve;

a flexible nozzle extending from a nozzle input end and a nozzle output end and defining a nozzle interior channel and an interior channel wall;

said nozzle input end coupled to said valve for receiving the fluid from said valve and for causes said valve to rotate upon a rotation force applied to said flexible nozzle;

said flexible nozzle defining multiple general lines of symmetry for altering an angular discharge of the fluid relative to said deformable body;

said sphincter valve maintaining a constriction to the fluid being discharged from said deformable body and into said valve absent pressurization of the fluid within said deformable body;

said valve includes a port plug valve;

said port plug valve having a valve body rotatably engaging within a cylindrical valve plug;

said cylindrical valve plug engaging said output orifice;

said cylindrical valve plug including a plug chamber interposed between a plug input and a plug passage traversing said cylindrical valve plug;

said valve body including a valve passage within said valve body;

said valve body rotating upon said cylindrical valve plug for aligning said plug passage with said valve passage to permit the fluid through said port plug valve;

said valve body rotating upon said cylindrical valve plug for separating said plug passage with said valve passage to terminate the fluid through said port plug valve;

said deformable body pressurizing the fluid and overcoming said construction of said sphincter valve to permit discharge of the fluid from said deformable body and into said valve when a compressive force is applied to said deformable body; and said valve controlling the fluid flowing through said flexible nozzle.

2. The fluid container for retaining and dispensing a fluid as set forth in claim 1, wherein said bottom end of said deformable body having an input orifice for positioning the fluid within said interior chamber;

an input closure engaging said input orifice for sealing said input orifice;

said deformable body defining a general axis asymmetry;

said valve defining a general line of symmetry;

said general axis of symmetry and said general line of symmetry defining a parallel orientation;

said deformable body includes a generally cylindrical body portion and a generally conical body portion;

said generally conical body portion coupling said valve to said generally cylindrical body portion; and said flexible nozzle and said generally conical body portion directing the fluid from said interior chamber to said valve upon said deformable body in a generally vertical position and the mouth of the individual in a generally horizontal position during engaging between the mouth of the individual and said valve.

3. The fluid container for retaining and dispensing a fluid as set forth in claim 1, wherein said deformable body includes a generally cylindrical body portion and a generally conical body portion;

said generally conical body portion defining a second general axis of symmetry; and said second general axis of symmetry and said general line of symmetry defining a generally parallel orientation for further positioning said deformable body in a generally vertical position and the mouth of the individual in a generally horizontal position during engaging between the mouth of the individual and said valve.

4. The fluid container for retaining and dispensing a fluid as set forth in claim 1, wherein said deformable body defines a generally hourglass shape extending from said bottom end to said top end for preventing said deformable body from slipping out of a hand of an individual;

said exterior surface of said deformable body includes a first contoured recess and a second contoured recess;

said first contoured recess and said second contoured recess defining an opposing side orientation for facilitating a conforming engagement between the individual and said deformable body;

said first contoured recess and said second contoured recess receiving a first handling layer and a second handling layer respectively;

said first handling layer and said second handling layer defining an opposing side orientation for facilitating a frictional engagement between a hand a the individual and said deformable body; and said deformable body, said first handling layer and said second handling layer deforming upon the individual applying a compression force to said first handling layer and said second handling layer for altering the interior chamber between a first volume and a second volume.

5. The fluid container for retaining and dispensing a fluid as set forth in claim 1, wherein said bottom end of said deformable body having an input orifice for positioning the fluid within said interior chamber;

an input closure engaging said input orifice for sealing said input orifice;

said input orifice includes a male threading;

said input closure including a cap defining a cylindrical outer wall extending from a closure wall;

said cylindrical outer wall including a female threading for threadably engaging said male threading of said input orifice;

said closure wall abutting said input orifice for sealing said input orifice;

a cylindrical inner wall extending from said closure wall for positioning within said interior chamber;

said cylindrical inner wall including a female threading;

a thermo core having a core chamber for retaining a thermo fluid and a male threading for threadably engaging said female threading of said cylindrical inner wall;

said thermo core maintaining a temperature of the fluid within the interior chamber of said deformable body;

said male threading having a concave cap for sealing said thermo fluid within said core chamber and positioned within said cylindrical inner wall upon said male threading of said thermo core threadably engaging said female threading of said cylindrical inner wall; and said closure wall and said concave cap defining an expansion area there between for receiving said concave cap that has deformed.

6. The fluid container for retaining and dispensing a fluid as set forth in claim 1, wherein said flexible nozzle having a circular taper structure for propelling the fluid in a jet flow; and said flexible nozzle having a circular groove for grasping and supporting said flexible nozzle with the teeth of the individual.

7. The fluid container for retaining and dispensing a fluid as set forth in claim 1, wherein said interior channel of said flexible nozzle includes a taper channel structure for propelling the fluid in a jet flow;

said interior channel wall includes a plurality of conical channels for creating a vortex flow of the fluid within said interior channel and increasing said et flow; and said flexible nozzle constructed from a transparent polymeric material for indicating the cleanliness of said flexible nozzle.

8. The fluid container for retaining and dispensing a fluid as set forth in claim 1, wherein said valve body defining a valve body exterior surface;

said cylindrical valve plug defining a cylindrical valve plug exterior surface;

said valve body exterior surface including a plurality of first alignment steps and a plurality of first grasping steps;

said cylindrical valve plug exterior surface including a plurality of second alignment steps and a plurality of second grasping steps;

said plurality of first alignment steps and said plurality of second alignment steps facilitating a visual inspection whether said port plug valve is in an open position for permitting the fluid through said port plug valve or a closed position for terminate the fluid through said port plug valve; and said plurality of first grasping steps and said plurality of second grasping steps facilitating grasping of said valve body and said cylindrical valve plug respectively for rotating said valve body relative to said cylindrical valve plug.

* * * * *